(12) United States Patent
Pancholi et al.

(10) Patent No.: US 11,549,709 B2
(45) Date of Patent: Jan. 10, 2023

(54) QUANTITATIVE MONTHLY VISUAL INDICATOR TO DETERMINE DATA AVAILABILITY FOR UTILITY RATES

(71) Applicant: Johnson Controls Tyco IP Holdings LLP, Milwaukee, WI (US)

(72) Inventors: Payal Rajendra Pancholi, Navi Mumbai (IN); Vinay Deelip Varne, Pune (IN); Apoorva Gupta, Mumbai (IN); Abhishek Gupta, Pune (IN); Mahesh Balkisan Mutyal, Pune (IN); Manohar Madhukar Kulkarni, Pune (IN)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 689 days.

(21) Appl. No.: 16/457,616

(22) Filed: Jun. 28, 2019

(65) Prior Publication Data

US 2020/0003442 A1    Jan. 2, 2020

(30) Foreign Application Priority Data

Jun. 29, 2018    (IN) .............................. 201811024249

(51) Int. Cl.
| F24F 11/46 | (2018.01) |
| G06Q 50/06 | (2012.01) |
| H02J 3/00 | (2006.01) |
| F24F 140/60 | (2018.01) |

(52) U.S. Cl.
CPC .............. *F24F 11/46* (2018.01); *G06Q 50/06* (2013.01); *H02J 3/00* (2013.01); *F24F 2140/60* (2018.01); *H02J 3/003* (2020.01)

(58) Field of Classification Search
CPC ...... F24F 11/46; F24F 2140/60; G06Q 50/06; H02J 3/00; H02J 3/003
See application file for complete search history.

(56) References Cited

U.S. PATENT DOCUMENTS

| 9,002,761 B2 * | 4/2015 | Montalvo ............... H02J 3/144 327/518 |
| 2004/0117330 A1 * | 6/2004 | Ehlers ................ G06Q 30/0601 705/412 |
| 2007/0043478 A1 * | 2/2007 | Ehlers ..................... F24F 11/30 700/276 |

(Continued)

*Primary Examiner* — Ziaul Karim
(74) *Attorney, Agent, or Firm* — Foley & Lardner LLP

(57) ABSTRACT

A system for allocating resources across equipment that operate to serve one or more loads of a building. The system includes one or more memory devices storing instructions that cause one or more processors to receive operational data defining at least one of planned loads to be served by the equipment or utility rates for one or more time steps within a simulation period, determine whether the operational data define the planned loads or the utility rates for each time step within the simulation period, and in response to a determination that the operational data do not define the planned loads or the utility rates for each time step within the simulation period, identify one or more time steps for which the planned loads or the utility rates are not defined and initiate an action to define the planned loads or the utility rates for the identified time steps.

20 Claims, 44 Drawing Sheets

(56) References Cited

U.S. PATENT DOCUMENTS

2015/0316907 A1* 11/2015 Elbsat .................... G06Q 10/06
  700/275
2015/0355650 A1* 12/2015 Friedrich ............... G05B 15/02
  700/276
2017/0104345 A1    4/2017 Wenzel et al.

* cited by examiner

| Data Set Effective From Jan-16 | | | | | | Hence all Seasons should fall between January 2016 and December 2016 | | | | | | Step 1 > Select Effective From |
|---|---|---|---|---|---|---|---|---|---|---|---|---|
| 2016 Leap Year | Available Hours in 2016 | | | | | 8784 | | | | | | Step 2 > Check available hours in a Year |
| 744 | 696 | 744 | 720 | 744 | 720 | 744 | 744 | 720 | 744 | 720 | 744 | |
| Step 3 > Available hours in a year>0, check if there are available hours in a season, accordingly allow to add Season and create slots | | | | | | | | | | | | |

| Season 1 | Jan | Feb | Ma | Apr | May | Jun | Jul | Aug | Sep | Oct | Nov | Dec |
|---|---|---|---|---|---|---|---|---|---|---|---|---|
| Available Hrs> | 744 | 696 | 744 | 720 | 744 | 720 | 744 | 744 | 720 | 744 | 720 | 744 |

| Slot Name | kWh Rate | kW Rate | Available Hours of Day | Start Time | End Time | Time Consumed | Time Left | Mon | Tue | Wed | Thu | Fri | Sat | Sun | Holiday |
|---|---|---|---|---|---|---|---|---|---|---|---|---|---|---|---|
| Slot 1 | 0.005 | 0.0004 | 0:00 | 10:00 | 13:00 | 3:00 | 21:00 | X | X | X | X | X | X | X | 3:00 |
| Slot 1 | 0.005 | 0.0004 | 0:00 | 80:00 | 13:00 | 5:00 | 19:00 | X | X | 5:00 | 5:00 | 5:00 | 5:00 | 5:00 | X |
| Slot 1 | 0.006 | 0.0004 | 0:00 | 13:00 | 18:00 | 5:00 | 19:00 | X | X | 5:00 | 5:00 | 5:00 | 5:00 | 5:00 | 5:00 |
| Slot 1 | 0.005 | 0.0004 | 0:00 | 18:00 | 23:00 | 5:00 | 19:00 | X | X | 5:00 | 5:00 | 5:00 | 5:00 | 5:00 | 5:00 |
| Slot 1 | 0.005 | 0.0004 | 0:00 | 1:00 | 6:00 | 5:00 | 19:00 | 5:00 | 5:00 | 5:00 | 5:00 | 5:00 | 5:00 | 5:00 | 5:00 |
| Slot 1 | 0.005 | 0.0004 | 0:00 | 6:00 | 8:00 | 2:00 | 22:00 | 2:00 | 2:00 | 2:00 | 2:00 | 2:00 | 2:00 | 2:00 | 2:00 |
| Slot 1 | 0.008 | 0.0003 | 0:00 | 8:00 | 10:00 | 2:00 | 22:00 | 2:00 | 2:00 | X | X | X | X | X | 2:00 |
| Slot 1 | 0.007 | 0.0004 | 0:00 | 23:00 | 1:00 | 2:00 | 22:00 | 2:00 | 2:00 | 2:00 | 2:00 | 2:00 | 2:00 | 2:00 | 2:00 |
| Slot 1 | 0.007 | 0.0004 | 0:00 | 10:00 | 23:00 | 13:00 | 11:00 | 13:00 | 13:00 | | | | | X | 2:00 |
| | | | | | | 0:00 | 0:00 | 0:00 | 0:00 | 0:00 | 0:00 | 0:00 | 0:00 | 0:00 | 0:00 |

FIG. 42

| Season 2 | Jan | Feb | Mar | Apr | May | Jun | Jul | Aug | Sep | Oct | Nov | Dec |
|---|---|---|---|---|---|---|---|---|---|---|---|---|
| Available Hrs> | | | | 8:00 | 8:00 | | 744 | 744 | 720 | 744 | 720 | 744 |
| Slot Name | kWh Rate | kW Rate | Available Hours of Day | Start Time | End Time | Time Consumed | Time Left | Mon | Tue | Wed | Thu | Fri | Sat | Sun | Holiday |
| Slot 1 | 0.005 | 0.0004 | 0:00 | 10:00 | 13:00 | 3:00 | 21:00 | X | X | X | X | X | X | X | 3:00 |
| Slot 2 | 0.005 | 0.0004 | 0:00 | 8:00 | 13:00 | 5:00 | 19:00 | X | X | X | 5:00 | 5:00 | 5:00 | 5:00 | X |
| Slot 3 | 0.006 | 0.0004 | 0:00 | 13:00 | 18:00 | 5:00 | 19:00 | X | X | X | 5:00 | 5:00 | 5:00 | 5:00 | 5:00 |
| Slot 4 | 0.005 | 0.0004 | 0:00 | 18:00 | 23:00 | 5:00 | 19:00 | X | X | 5:00 | 5:00 | 5:00 | 5:00 | 5:00 | 5:00 |
| Slot 5 | 0.005 | 0.0004 | 0:00 | 1:00 | 6:00 | 5:00 | 19:00 | 5:00 | 0:00 | 5:00 | 5:00 | 5:00 | 5:00 | 5:00 | 5:00 |
| Slot 6 | 0.005 | 0.0004 | 0:00 | 6:00 | 8:00 | 2:00 | 22:00 | 2:00 | 0:00 | 2:00 | 2:00 | 2:00 | 2:00 | 2:00 | 2:00 |
| Slot 7 | 0.008 | 0.0003 | 0:00 | 8:00 | 10:00 | 2:00 | 22:00 | 2:00 | 0:00 | X | X | X | X | X | X |
| Slot 8 | 0.007 | 0.0004 | 0:00 | 23:00 | 1:00 | 2:00 | 22:00 | 2:00 | 0:00 | X | X | X | X | X | 2:00 |
| Slot 9 | 0.007 | 0.0004 | 0:00 | 10:00 | 23:00 | 13:00 | 11:00 | 13:00 | 0:00 | FALSE | 0:00 | 0:00 | 0:00 | 0:00 | 0:00 |

Season 2> 0.0080  Highest Consumed Electricity Rate 0.0050  Lowest Consumed Electricity Rate Hours available in April, May, June  8:00

FIG. 43

QUANTITATIVE MONTHLY VISUAL INDICATOR TO DETERMINE DATA AVAILABILITY FOR UTILITY RATES

CROSS-REFERENCE TO RELATED PATENT APPLICATIONS

This application claims the benefit of and priority to Indian Provisional Patent Application No. 201811024249 filed Jun. 29, 2018, the entirety of which is incorporated by reference herein.

BACKGROUND

The present disclosure relates generally to a central plant or central energy facility that serves the energy loads of a building or campus. The present disclosure relates more particularly to systems and methods for viewing utility consumption data corresponding to a central plant or central energy facility.

A central plant typically include multiple subplants that serve different types of energy loads. For example, a central plant can include a chiller subplant that serves cooling loads, a heater subplant that serves heating loads, and/or an electricity subplant configured to serve electric loads. A central plant purchases resources from utilities to run the subplants to meet the loads.

Utility usage can be an important aspect in determining total utility cost for a particular central plant. As one example, energy consumption rates can change depending upon the load type, season, year, plant location, etc. To determine a total utility cost for a specified time frame, utility consumption data must generally be known for that time frame.

SUMMARY

One implementation of the present disclosure is a system for allocating resources across equipment that operate to serve one or more loads of a building. The system includes one or more memory devices storing instructions that, when executed by one or more processors, cause the one or more processors to receive operational data defining at least one of planned loads to be served by the equipment or utility rates for one or more time steps within a simulation period, determine whether the operational data define the planned loads or the utility rates for each time step within the simulation period, in response to a determination that the operational data do not define the planned loads or the utility rates for each time step within the simulation period, identify one or more time steps for which the planned loads or the utility rates are not defined and initiate an action to define the planned loads or the utility rates for the identified time steps.

In some embodiments the simulation period includes a first subset of time for which the equipment is operating, and a second subset of time for which the equipment is not operating. Also, the sum of the first subset of time and the second subset of time is equal to simulation period.

In some embodiments the system includes a data verification component configured to verify that data exists for the entirety of the first subset of time and the second subset of time.

In some embodiments the system includes a central energy plant in communication with the system.

In some embodiments the central energy plant includes one or more heating systems, one or more cooling systems, and one or more power systems.

In some embodiments the operational data is validated based on historical data including loads previously applied to the equipment and past utility rates.

In some embodiments the availability of operational data is verified by calculating a total number of time steps within the simulation period and matching the operational data to the total number of time steps within the simulation period.

In some embodiments the planned loads and the utility rates are received from a user device, wherein a user has provided the planned loads and the utility rates as an input.

In some embodiments the operational data includes utility rates corresponding to planned loads to be applied to the equipment of the building.

In some embodiments the utility rates correspond to utilities required by the equipment for the execution of the planned loads.

Another implementation of the present disclosure is a method of allocating resources across equipment that operate to serve one or more loads of a building. The method includes receiving operational data defining at least one of planned loads to be served by the equipment or utility rates for one or more time steps within a simulation period, determining whether the operational data define the planned loads or the utility rates for each time step within the simulation period, and identifying, in response to a determination that the operational data do not define the planned loads or the utility rates for each time step within the simulation period, one or more time steps for which the planned loads or the utility rates are not defined and initiating an action to define the planned loads or the utility rates for the identified time steps.

In some embodiments the time period of the simulation includes a first subset of time for which the building equipment is operating, and a second subset of time for which the building equipment is not operating. Also, the sum of the first subset of time and the second subset of time is equal to the total time of the time period.

In some embodiments the method includes a data verification component configured to verify that data exists for the entirety of the first subset of time and the second subset of time.

In some embodiments the central energy plant includes one or more heating systems, one or more cooling systems, and one or more power systems.

In some embodiments the operational data is validated based on historical data including loads previously applied to the equipment and past utility rates.

In some embodiments the availability of operational data is verified by calculating a total number of time steps within the simulation period and matching the operational data to the total number of time steps within the time period.

In some embodiments the planned loads and the utility rates are received from a user device, wherein a user has provided the planned loads and the utility rates as an input.

In some embodiments the operational data includes of utility rates corresponding to planned loads to be applied to the equipment.

In some embodiments the utility rates correspond to utilities required by the equipment for the execution of the planned loads.

Another implementation of the present disclosure is one or more non-transitory computer-readable media storing instructions that, when executed by one or more processors, cause the one or more processors to perform operations. The operations include receiving operational data defining at least one of planned loads to be served by equipment or utility rates for one or more time steps within a simulation period, determining whether the operational data define the planned loads or the utility rates for each time step within the simulation period, and identifying, in response to a determination that the operational data do not define the planned loads or the utility rates for each time step within the simulation period, one or more time steps for which the planned loads or the utility rates are not defined and initiating an action to define the planned loads or the utility rates for the identified time steps.

BRIEF DESCRIPTION OF THE DRAWINGS

FIG. 9 is a user interface associated with the planning tool of FIG. 8, according to an exemplary embodiment.

FIG. 11 is another user interface associated with the planning tool of FIG. 8, according to an exemplary embodiment.

Figure 14:
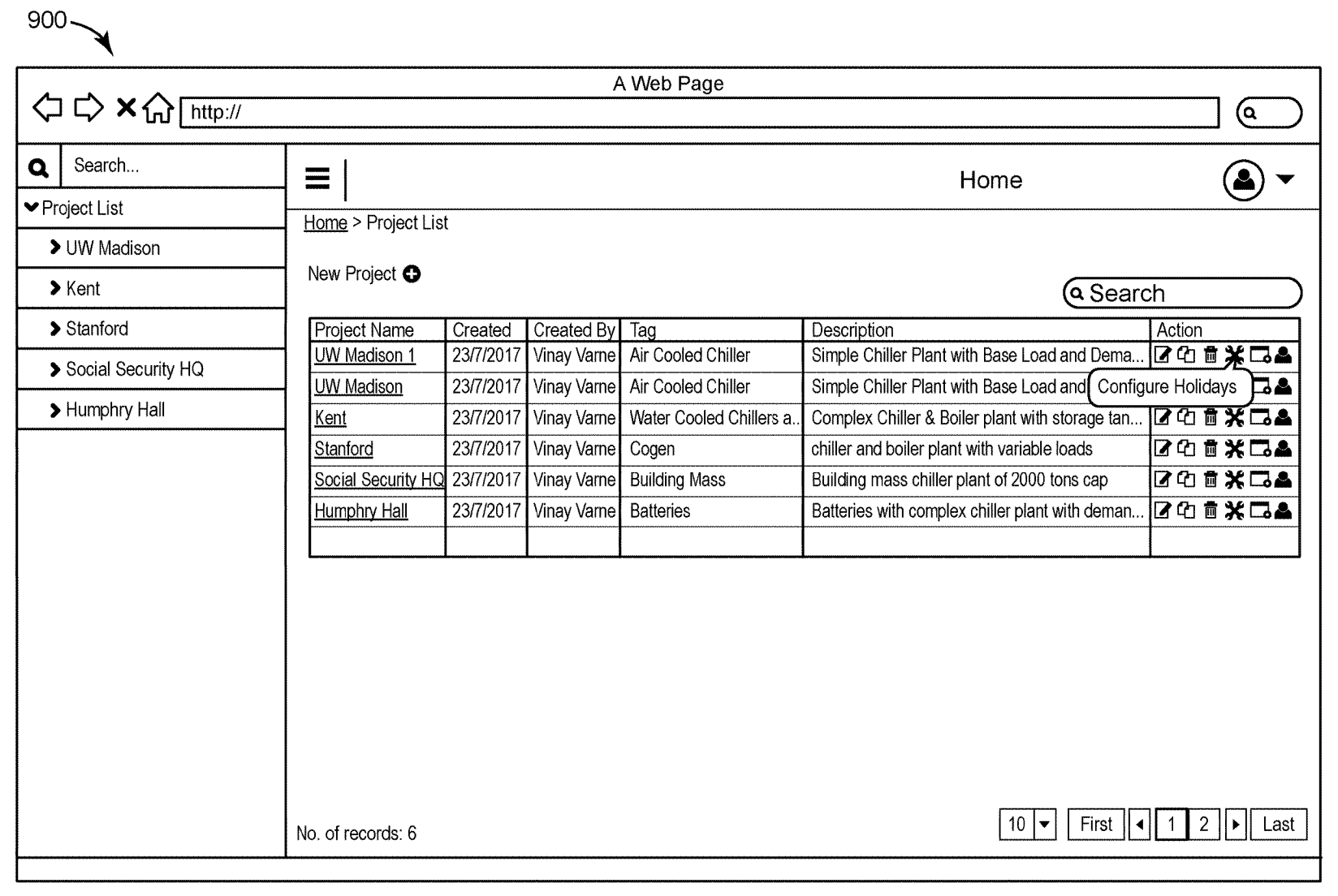

FIG. 14 is another user interface associated with the planning tool of FIG. 8, according to an exemplary embodiment.

FIG. 16 is another user interface associated with the planning tool of FIG. 8, according to an exemplary embodiment.

FIG. 21 is another user interface associated with the planning tool of FIG. 8, according to an exemplary embodiment.

FIG. 23 is another user interface associated with the planning tool of FIG. 8, according to an exemplary embodiment.

FIG. 24 is another user interface associated with the planning tool of FIG. 8, according to an exemplary embodiment.

FIG. 26 is another user interface associated with the planning tool of FIG. 8, according to an exemplary embodiment.

FIG. 27 is another user interface associated with the planning tool of FIG. 8, according to an exemplary embodiment.

FIG. 28 is another user interface associated with the planning tool of FIG. 8, according to an exemplary embodiment.

FIG. 29 is another user interface associated with the planning tool of FIG. 8, according to an exemplary embodiment.

FIG. 30 is another user interface associated with the planning tool of FIG. 8, according to an exemplary embodiment.

FIG. 31 is another user interface associated with the planning tool of FIG. 8, according to an exemplary embodiment.

FIG. 32 is another user interface associated with the planning tool of FIG. 8, according to an exemplary embodiment.

FIG. 34 is another user interface associated with the planning tool of FIG. 8, according to an exemplary embodiment.

FIG. 38 is another user interface associated with the planning tool of FIG. 8, according to an exemplary embodiment.

FIG. 42 is an example logic implementation associated with the planning tool of FIG. 8, according to an exemplary embodiment.

FIG. 43 is another example logic implementation associated with the planning tool of FIG. 8, according to an exemplary embodiment.

DETAILED DESCRIPTION

Overview

Figure 1:
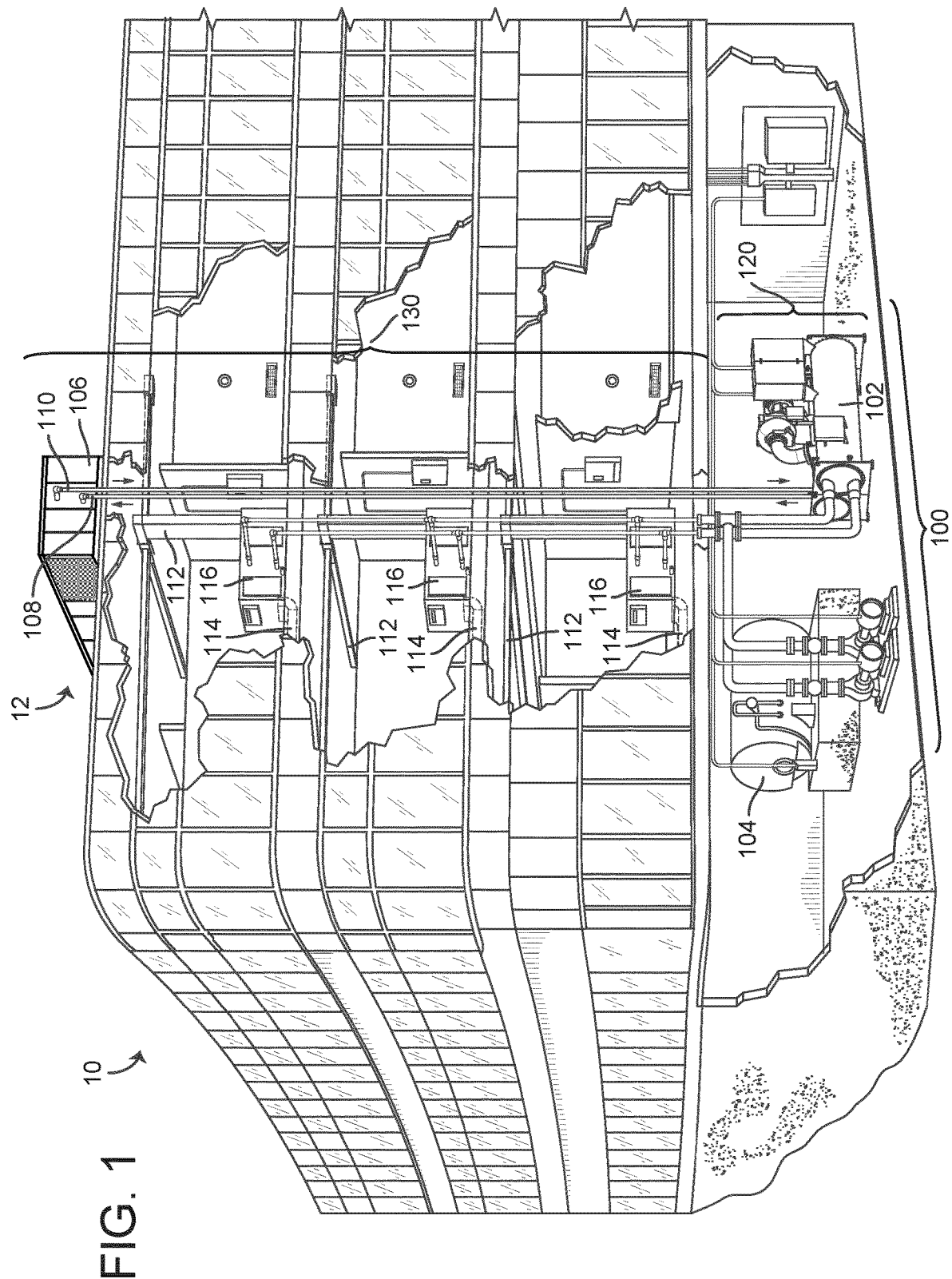
FIG. 1 is a drawing of a building equipped with a building management system (BMS) and a HVAC system, according to some embodiments.

Referring generally to the FIGURES, a planning tool that can be used to facilitate the design of a central plant is shown, according to various embodiments. The planning tool includes an intuitive user interface designed to assist the user in properly configuring and monitoring a central plant model. The interface includes graphics, symbols, colors, and visual feedback, for example. The planning tool can include a set of rules associated with different types of resources, subplants, storage, and sinks that can be included in the central model. The rules may define required and optional inputs and outputs, for example. The user interface of the planning tool facilitates efficient and feasible central plant design.

In some embodiments, the planning tool can be a cloud-based SaaS application. The planning tool can facilitate the design of a central energy plant that includes heating, cooling and power systems. In some embodiments, the planning tool can analyze an energy plant performance and determine an optimized cost. The optimized cost can be used to configure the plant at a corresponding customer site.

In some embodiments, the analysis within the planning tool can be achieved by simulating the required energy plant performance details that will satisfy a specific user-defined environment. The environment information can include weather at the customer site, building load at the customer site, plant performance parameters and/or utility service rates. In some embodiments, these environment details can be combined and sent to an external integrated simulation engine service A3S (Application as a Service). The A3S can execute an algorithm on the received environmental details for a specific simulation time (as defined by a user), and can provide the results to the planning tool. In some embodiments, the simulation results can include energy usage, load, and/or performance details for the received data and specified simulation time.

Energy usage can be an important value of the simulation results, as the planning tool can apply logic to determine a total energy cost. The determined cost can serve as the basis of comparison between various client site models in order to derive the best fit model.

In some embodiments, the analysis described herein can help determine which energy supplier to use based on up-to-date hourly utility rates. Further, it can help to determine which time of year (or season) the building load is minimized and/or maximized.

Conventional methods for inputting utility consumption data include manual upload and input options. Specifically, in some embodiments, the planning tool used a "template upload" option to manually enter hourly rates and data. However, manual data entry does not account for seasonal utility rates.

Conventional methods of determining the consumption cost for the period, can include multiplying the hourly consumption rate and demand rate with the appropriate consumption readings. However, this method makes it difficult to determine how the mentioned dependents (e.g., season, year, plant location) are related, and whether data for all the seasons was even captured. It can be even more difficult to confirm that there were no user mistakes (e.g., incorrect values, incorrect calculations) while recording the hour by hour rate. Entering hourly utility rates for an entire year can involve about 8760 separate data entries. The conventional manual entry can be a tedious activity. Capturing hourly data that is both accurate and efficiently recorded can be difficult via manual entry.

In some embodiments, the present disclosure includes a time-based visual indication. The time-based visual indication can represent quantitative data, and can assist a user in validating the completeness of recorded utility usage data. The planning tool can provide the time-based visual indication via a user interface.

In some embodiments, the present disclosure includes a user-friendly environment in the planning tool to ensure that utility rates are provided for each season. In some embodiments, the present disclosure includes systems and methods for efficiently defining utility rates for working days and holidays. The planning tool can include visual indicators based on complete and incomplete utility data.

Building Management System and HVAC System

Referring now to FIGS. 1-4, an exemplary building management system (BMS) and HVAC system in which the systems and methods of the present disclosure can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination thereof. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Figure 2:
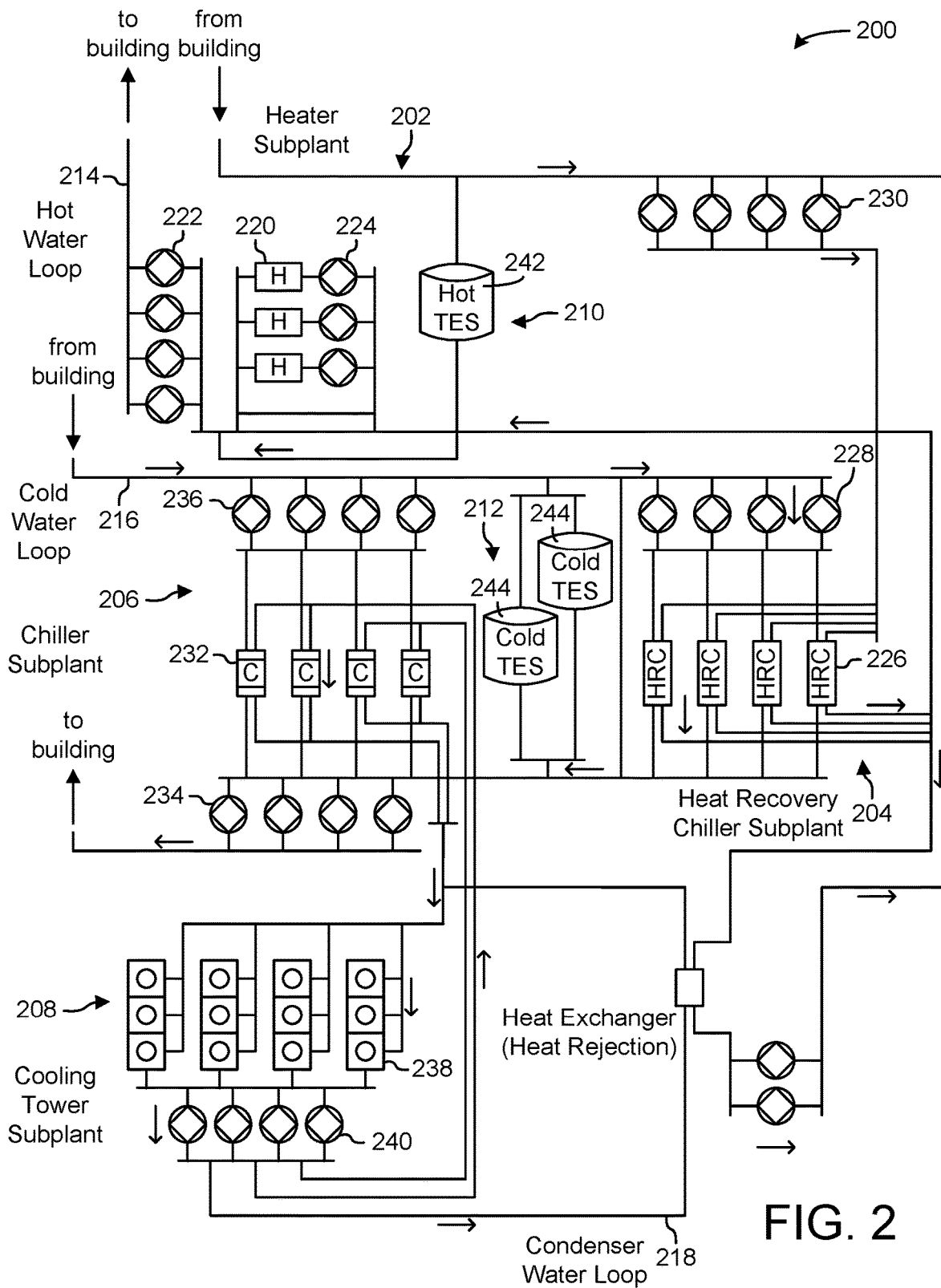
FIG. 2 is a schematic of a waterside system which can be used as part of the HVAC system of FIG. 1, according to some embodiments.

Referring now to FIG. 2, a block diagram of a central plant 200 is shown, according to an exemplary embodiment. In various embodiments, central plant 200 can supplement or replace waterside system 120 in HVAC system 100 or can be implemented separate from HVAC system 100. When implemented in HVAC system 100, central plant 200 can include a subset of the HVAC devices in HVAC system 100 (e.g., boiler 104, chiller 102, pumps, valves, etc.) and can operate to supply a heated or chilled fluid to AHU 106. The HVAC devices of central plant 200 can be located within building 10 (e.g., as components of waterside system 120) or at an offsite location such as a central plant.

In FIG. 2, central plant 200 is shown as a waterside system having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to central plant 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in central plant 200 (e.g., pumps 222, 224, 228, 230, 234, 236, and/or 240) or pipelines in central plant 200 include an isolation valve associated therewith. Isolation valves can be integrated with the pumps or positioned upstream or downstream of the pumps to control the fluid flows in central plant 200. In various embodiments, central plant 200 can include more, fewer, or different types of devices and/or subplants based on the particular configuration of central plant 200 and the types of loads served by central plant 200.

Figure 3:
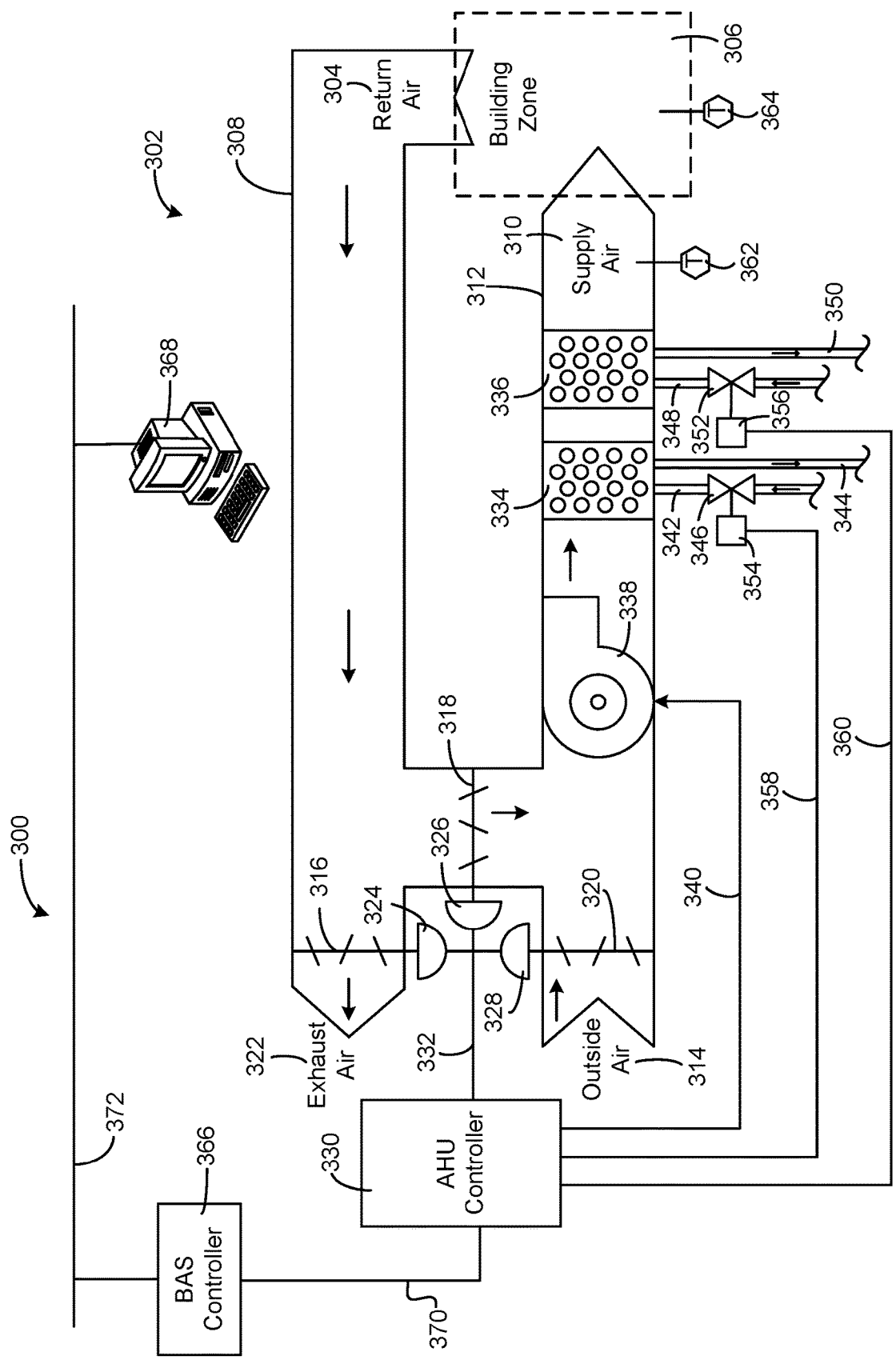
FIG. 3 is a block diagram of an airside system which can be used as part of the HVAC system of FIG. 1, according to some embodiments.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by central plant 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from central plant 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from central plant 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of thereof.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, central plant 200, HVAC system 100, and/or other controllable systems that serve building 10. BMS controller 366 can communicate with multiple downstream building systems or subsystems (e.g., HVAC system 100, a security system, a lighting system, central plant 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
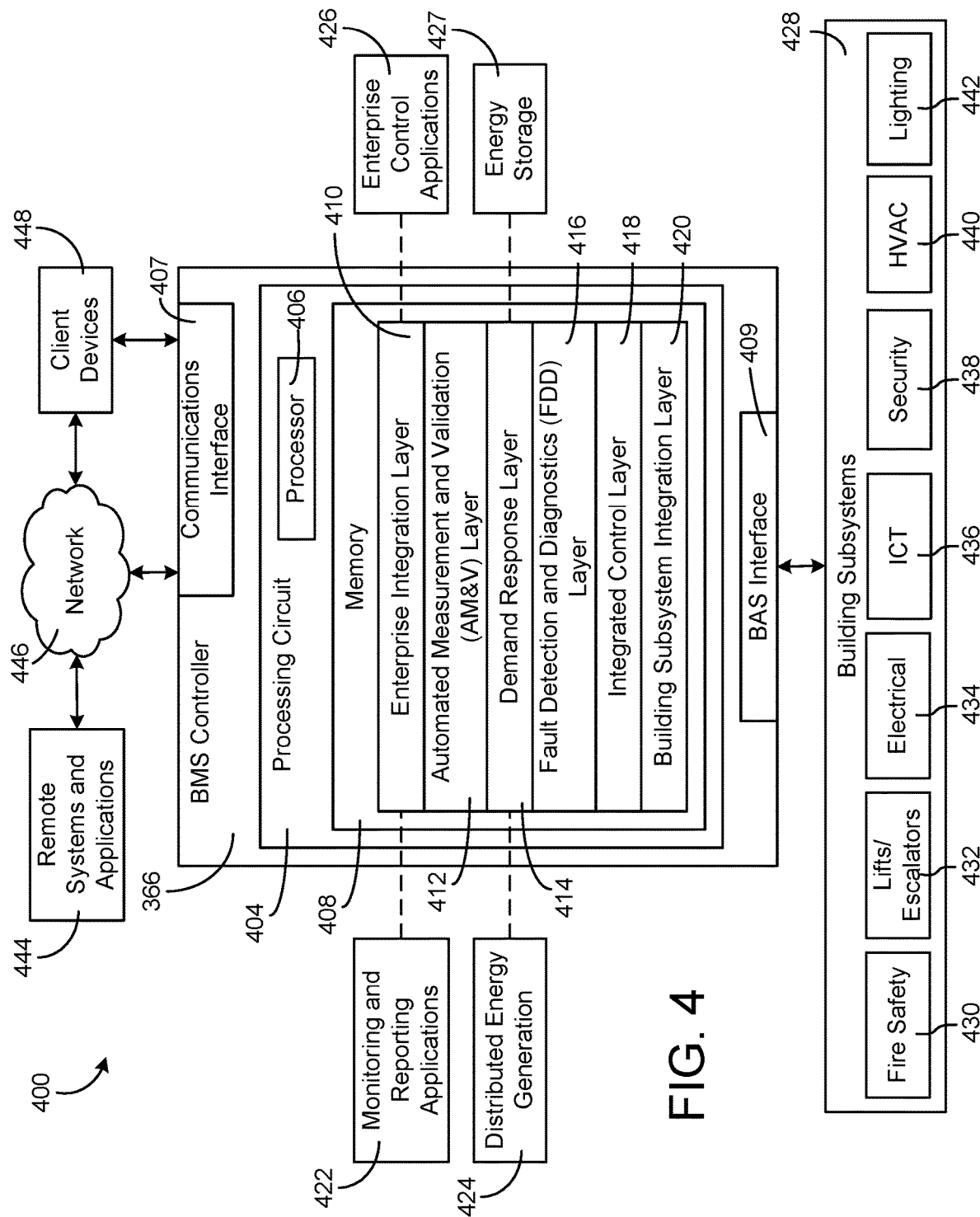
FIG. 4 is a block diagram of a BMS which can be used in the building of FIG. 1, according to some embodiments.

Referring now to FIG. 4, a block diagram of a building management system (BMS) 400 is shown, according to an exemplary embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include central plant 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both the communications interface 407 and the BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand set-point before returning to a normally scheduled set-point, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the set-point for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include set-point or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its set-point. These processes can be examined by FDD layer 416 to expose when the system begins to degrade in performance and alert a user to repair the fault before it becomes more severe.

Asset Allocation System

Figure 5:
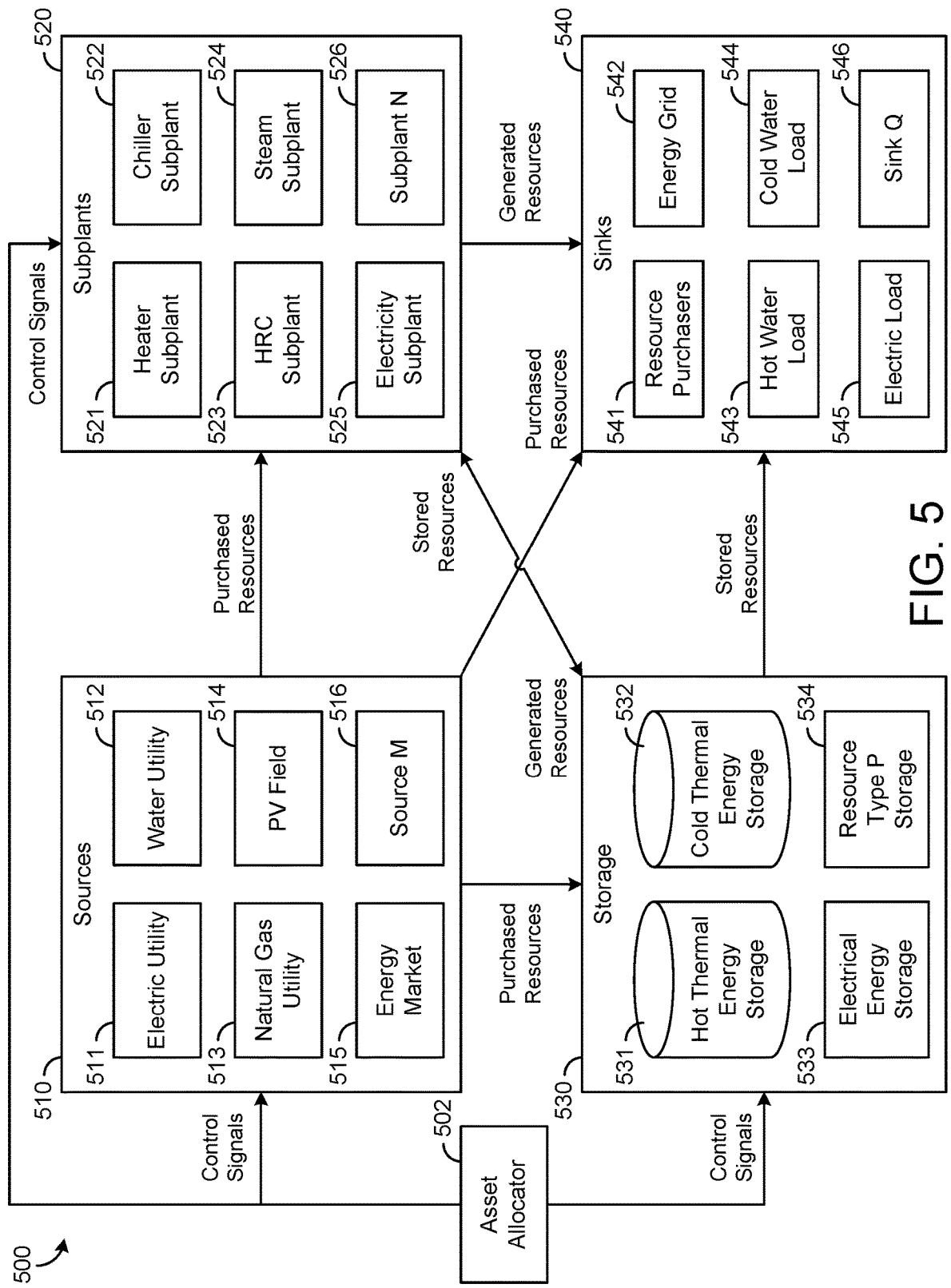
FIG. 5 is a block diagram of an asset allocation system including sources, subplants, storage, sinks, and an asset allocator configured to optimize the allocation of these assets, according to an exemplary embodiment.

Referring now to FIG. 5, a block diagram of an asset allocation system 500 is shown, according to an exemplary embodiment. Asset allocation system 500 can be configured to manage energy assets such as central plant equipment, battery storage, and other types of equipment configured to serve the energy loads of a building. Asset allocation system 500 can determine an optimal distribution of heating, cooling, electricity, and energy loads across different subplants (i.e., equipment groups) capable of producing that type of energy. In some embodiments, asset allocation system 500 is implemented as a component of central plant 200 and interacts with the equipment of central plant 200 in an online operational environment (e.g., performing real-time control of the central plant equipment). In other embodiments, asset allocation system 500 can be implemented as a component of a planning tool, and can be configured to simulate the operation of a central plant over a predetermined time period for planning, budgeting, and/or design considerations.

Asset allocation system 500 is shown to include sources 510, subplants 520, storage 530, and sinks 540. These four categories of objects define the assets of a central plant and their interaction with the outside world. Sources 510 may include commodity markets or other suppliers from which resources such as electricity, water, natural gas, and other resources can be purchased or obtained. Sources 510 may provide resources that can be used by asset allocation system 500 to satisfy the demand of a building or campus. For example, sources 510 are shown to include an electric utility 511, a water utility 512, a natural gas utility 513, a photovoltaic (PV) field (e.g., a collection of solar panels), an energy market 515, and source M 516, where M is the total number of sources 510. Resources purchased from sources 510 can be used by subplants 520 to produce generated resources (e.g., hot water, cold water, electricity, steam, etc.), stored in storage 530 for later use, or provided directly to sinks 540.

Subplants 520 are the main assets of a central plant. Subplants 520 are shown to include a heater subplant 521, a chiller subplant 522, a heat recovery chiller subplant 523, a steam subplant 524, an electricity subplant 525, and subplant N, where N is the total number of subplants 520. In some embodiments, subplants 520 include some or all of the subplants of central plant 200, as described with reference to FIG. 2. For example, subplants 520 can include heater subplant 202, heat recovery chiller subplant 204, chiller subplant 206, and/or cooling tower subplant 208.

Subplants 520 can be configured to convert resource types, making it possible to balance requested loads from the building or campus using resources purchased from sources 510. For example, heater subplant 521 may be configured to generate hot thermal energy (e.g., hot water) by heating water using electricity or natural gas. Chiller subplant 522 may be configured to generate cold thermal energy (e.g., cold water) by chilling water using electricity. Heat recovery chiller subplant 523 may be configured to generate hot thermal energy and cold thermal energy by removing heat from one water supply and adding the heat to another water supply. Steam subplant 524 may be configured to generate steam by boiling water using electricity or natural gas. Electricity subplant 525 may be configured to generate electricity using mechanical generators (e.g., a steam turbine, a gas-powered generator, etc.) or other types of electricity-generating equipment (e.g., photovoltaic equipment, hydroelectric equipment, etc.).

The input resources used by subplants 520 may be provided by sources 510, retrieved from storage 530, and/or generated by other subplants 520. For example, steam subplant 524 may produce steam as an output resource. Electricity subplant 525 may include a steam turbine that uses the steam generated by steam subplant 524 as an input resource to generate electricity. The output resources produced by subplants 520 may be stored in storage 530, provided to sinks 540, and/or used by other subplants 520. For example, the electricity generated by electricity subplant 525 may be stored in electrical energy storage 533, used by chiller subplant 522 to generate cold thermal energy, used to satisfy the electric load 545 of a building, or sold to resource purchasers 541.

Storage 530 can be configured to store energy or other types of resources for later use. Each type of storage within storage 530 may be configured to store a different type of resource. For example, storage 530 is shown to include hot thermal energy storage 531 (e.g., one or more hot water storage tanks), cold thermal energy storage 532 (e.g., one or more cold thermal energy storage tanks), electrical energy storage 533 (e.g., one or more batteries), and resource type P storage 534, where P is the total number of storage 530. In some embodiments, storage 530 include some or all of the storage of central plant 200, as described with reference to FIG. 2. In some embodiments, storage 530 includes the heat capacity of the building served by the central plant. The resources stored in storage 530 may be purchased directly from sources or generated by subplants 520.

In some embodiments, storage 530 is used by asset allocation system 500 to take advantage of price-based demand response (PBDR) programs. PBDR programs encourage consumers to reduce consumption when generation, transmission, and distribution costs are high. PBDR programs are typically implemented (e.g., by sources 510) in the form of energy prices that vary as a function of time. For example, some utilities may increase the price per unit of electricity during peak usage hours to encourage customers to reduce electricity consumption during peak times. Some utilities also charge consumers a separate demand charge based on the maximum rate of electricity consumption at any time during a predetermined demand charge period.

Advantageously, storing energy and other types of resources in storage 530 allows for the resources to be purchased at times when the resources are relatively less expensive (e.g., during non-peak electricity hours) and stored for use at times when the resources are relatively more expensive (e.g., during peak electricity hours). Storing resources in storage 530 also allows the resource demand of the building or campus to be shifted in time. For example, resources can be purchased from sources 510 at times when the demand for heating or cooling is low and immediately converted into hot or cold thermal energy by subplants 520. The thermal energy can be stored in storage 530 and retrieved at times when the demand for heating or cooling is high. This allows asset allocation system 500 to smooth the resource demand of the building or campus and reduces the maximum required capacity of subplants 520. Smoothing the demand also asset allocation system 500 to reduce the peak electricity consumption, which results in a lower demand charge.

In some embodiments, storage 530 is used by asset allocation system 500 to take advantage of incentive-based demand response (IBDR) programs. IBDR programs provide incentives to customers who have the capability to store energy, generate energy, or curtail energy usage upon request. Incentives are typically provided in the form of monetary revenue paid by sources 510 or by an independent service operator (ISO). IBDR programs supplement traditional utility-owned generation, transmission, and distribution assets with additional options for modifying demand load curves. For example, stored energy can be sold to resource purchasers 541 or an energy grid 542 to supplement the energy generated by sources 510. In some instances, incentives for participating in an IBDR program vary based on how quickly a system can respond to a request to change power output/consumption. Faster responses may be compensated at a higher level. Advantageously, electrical energy storage 533 allows system 500 to quickly respond to a request for electric power by rapidly discharging stored electrical energy to energy grid 542.

Sinks 540 may include the requested loads of a building or campus as well as other types of resource consumers. For example, sinks 540 are shown to include resource purchasers 541, an energy grid 542, a hot water load 543, a cold water load 544, an electric load 545, and sink Q, where Q is the total number of sinks 540. A building may consume various resources including, for example, hot thermal energy (e.g., hot water), cold thermal energy (e.g., cold water), and/or electrical energy. In some embodiments, the resources are consumed by equipment or subsystems within the building (e.g., HVAC equipment, lighting, computers and other electronics, etc.). The consumption of each sink 540 over the optimization period can be supplied as an input to asset allocation system 500 or predicted by asset allocation system 500. Sinks 540 can receive resources directly from sources 510, from subplants 520, and/or from storage 530.

Still referring to FIG. 5, asset allocation system 500 is shown to include an asset allocator 502. Asset allocator 502 may be configured to control the distribution, production, storage, and usage of resources in asset allocation system 500. In some embodiments, asset allocator 502 performs an optimization process determine an optimal set of control decisions for each time step within an optimization period. The control decisions may include, for example, an optimal amount of each resource to purchase from sources 510, an optimal amount of each resource to produce or convert using subplants 520, an optimal amount of each resource to store or remove from storage 530, an optimal amount of each resource to sell to resources purchasers 541 or energy grid 540, and/or an optimal amount of each resource to provide to other sinks 540. In some embodiments, the control decisions include an optimal amount of each input resource and output resource for each of subplants 520.

In some embodiments, asset allocator 502 is configured to optimally dispatch all campus energy assets in order to meet the requested heating, cooling, and electrical loads of the campus for each time step within an optimization horizon or optimization period of duration h. Instead of focusing on only the typical HVAC energy loads, the concept is extended to the concept of resource. Throughout this disclosure, the term "resource" is used to describe any type of commodity purchased from sources 510, used or produced by subplants 520, stored or discharged by storage 530, or consumed by sinks 540. For example, water may be considered a resource that is consumed by chillers, heaters, or cooling towers during operation. This general concept of a resource can be extended to chemical processing plants where one of the resources is the product that is being produced by the chemical processing plat.

Asset allocator 502 can be configured to operate the equipment of asset allocation system 500 to ensure that a resource balance is maintained at each time step of the optimization period. This resource balance is shown in the following equation:

$$\Sigma x_{time} = 0 \forall resources, \forall time \in horizon$$

where the sum is taken over all producers and consumers of a given resource (i.e., all of sources 510, subplants 520, storage 530, and sinks 540) and time is the time index. Each time element represents a period of time during which the resource productions, requests, purchases, etc. are assumed constant. Asset allocator 502 may ensure that this equation is satisfied for all resources regardless of whether that resource is required by the building or campus. For example, some of the resources produced by subplants 520 may be intermediate resources that function only as inputs to other subplants 520.

In some embodiments, the resources balanced by asset allocator 502 include multiple resources of the same type (e.g., multiple chilled water resources, multiple electricity resources, etc.). Defining multiple resources of the same type may allow asset allocator 502 to satisfy the resource balance given the physical constraints and connections of the central plant equipment. For example, suppose a central plant has multiple chillers and multiple cold water storage tanks, with each chiller physically connected to a different cold water storage tank (i.e., chiller A is connected to cold water storage tank A, chiller B is connected to cold water storage tank B, etc.). Given that only one chiller can supply cold water to each cold water storage tank, a different cold water resource can be defined for the output of each chiller. This allows asset allocator 502 to ensure that the resource balance is satisfied for each cold water resource without attempting to allocate resources in a way that is physically impossible (e.g., storing the output of chiller A in cold water storage tank B, etc.).

Asset allocator 502 may be configured to minimize the economic cost (or maximize the economic value) of operating asset allocation system 500 over the duration of the optimization period. The economic cost may be defined by a cost function J(x) that expresses economic cost as a function of the control decisions made by asset allocator 502. The cost function J(x) may account for the cost of resources purchased from sources 510, as well as the revenue generated by selling resources to resource purchasers 541 or energy grid 542 or participating in incentive programs. The cost optimization performed by asset allocator 502 can be expressed as:

$$\arg\min_x J(x)$$

where J(x) is defined as follows:

$$J(x) = \sum_{sources} \sum_{horizon} \text{cost}(purchase_{resource,time}, \text{time}) - \sum_{incentives} \sum_{horizon} \text{revenue}(ReservationAmount)$$

The first term in the cost function J(x) represents the total cost of all resources purchased over the optimization horizon. Resources can include, for example, water, electricity, natural gas, or other types of resources purchased from a utility or other source 510. The second term in the cost function J(x) represents the total revenue generated by participating in incentive programs (e.g., IBDR programs) over the optimization horizon. The revenue may be based on the amount of power reserved for participating in the incentive programs. Accordingly, the total cost function represents the total cost of resources purchased minus any revenue generated from participating in incentive programs.

Each of subplants 520 and storage 530 may include equipment that can be controlled by asset allocator 502 to optimize the performance of asset allocation system 500. Subplant equipment may include, for example, heating devices, chillers, heat recovery heat exchangers, cooling towers, energy storage devices, pumps, valves, and/or other devices of subplants 520 and storage 530. Individual devices of subplants 520 can be turned on or off to adjust the resource production of each subplant 520. In some embodiments, individual devices of subplants 520 can be operated at variable capacities (e.g., operating a chiller at 10% capacity or 60% capacity) according to an operating setpoint received from asset allocator 502. Asset allocator 502 can control the equipment of subplants 520 and storage 530 to adjust the amount of each resource purchased, consumed, and/or produced by system 500.

In some embodiments, asset allocator 502 minimizes the cost function while participating in PBDR programs, IBDR programs, or simultaneously in both PBDR and IBDR programs. For the IBDR programs, asset allocator 502 may use statistical estimates of past clearing prices, mileage ratios, and event probabilities to determine the revenue generation potential of selling stored energy to resource purchasers 541 or energy grid 542. For the PBDR programs, asset allocator 502 may use predictions of ambient conditions, facility thermal loads, and thermodynamic models of installed equipment to estimate the resource consumption of subplants 520. Asset allocator 502 may use predictions of the resource consumption to monetize the costs of running the equipment.

Asset allocator 502 may automatically determine (e.g., without human intervention) a combination of PBDR and/or IBDR programs in which to participate over the optimization horizon in order to maximize economic value. For example, asset allocator 502 may consider the revenue generation potential of IBDR programs, the cost reduction potential of PBDR programs, and the equipment maintenance/replacement costs that would result from participating in various combinations of the IBDR programs and PBDR programs. Asset allocator 502 may weigh the benefits of participation against the costs of participation to determine an optimal combination of programs in which to participate. Advantageously, this allows asset allocator 502 to determine an optimal set of control decisions that maximize the overall value of operating asset allocation system 500.

In some embodiments, asset allocator 502 optimizes the cost function J(x) subject to the following constraint, which guarantees the balance between resources purchased, produced, discharged, consumed, and requested over the optimization horizon:

$$\sum_{sources} purchase_{resource,time} +$$
$$\sum_{subplants} produces(x_{internal,time}, x_{external,time}, v_{uncontrolled,time}) -$$
$$\sum_{subplants} consumes(x_{internal,time}, x_{external,time}, v_{uncontrolled,time}) +$$
$$\sum_{storages} discharges(x_{internal,time}, x_{external,time}) -$$
$$\sum_{sinks} requests_{resouce} = 0 \ \forall \text{ resources}, \forall \text{ time} \in \text{horizon}$$

where $x_{internal,time}$ includes internal decision variables (e.g., load allocated to each component of asset allocation system 500), $x_{external,time}$ includes external decision variables (e.g., condenser water return temperature or other shared variables across subplants 520), and $v_{uncontrolled,time}$ includes uncontrolled variables (e.g., weather conditions).

The first term in the previous equation represents the total amount of each resource (e.g., electricity, water, natural gas, etc.) purchased from each source 510 over the optimization horizon. The second and third terms represent the total production and consumption of each resource by subplants 520 over the optimization horizon. The fourth term represents the total amount of each resource discharged from storage 530 over the optimization horizon. Positive values indicate that the resource is discharged from storage 530, whereas negative values indicate that the resource is charged or stored. The fifth term represents the total amount of each resource requested by sinks 540 over the optimization horizon. Accordingly, this constraint ensures that the total amount of each resource purchased, produced, or discharged from storage 530 is equal to the amount of each resource consumed, stored, or provided to sinks 540.

In some embodiments, additional constraints exist on the regions in which subplants 520 can operate. Examples of such additional constraints include the acceptable space (i.e., the feasible region) for the decision variables given the uncontrolled conditions, the maximum amount of a resource that can be purchased from a given source 510, and any number of plant-specific constraints that result from the mechanical design of the plant.

Asset allocator 502 may include a variety of features that enable the application of asset allocator 502 to nearly any central plant, central energy facility, combined heating and cooling facility, or combined heat and power facility. These features include broadly applicable definitions for subplants 520, sinks 540, storage 530, and sources 510; multiples of the same type of subplant 520 or sink 540; subplant resource connections that describe which subplants 520 can send resources to which sinks 540 and at what efficiency; subplant minimum turndown into the asset allocation optimization; treating electrical energy as any other resource that must be balanced; constraints that can be commissioned during runtime; different levels of accuracy at different points in the horizon; setpoints (or other decisions) that are shared between multiple subplants included in the decision vector; disjoint subplant operation regions; incentive based electrical energy programs; and high level airside models. Incorporation of these features may allow asset allocator 502 to support a majority of the central energy facilities that will be seen in the future. Additionally, it will be possible to rapidly adapt to the inclusion of new subplant types. Some of these features are described in greater detail below.

Broadly applicable definitions for subplants 520, sinks 540, storage 530, and sources 510 allow each of these components to be described by the mapping from decision variables to resources consume and resources produced. Resources and other components of system 500 do not need to be "typed," but rather can be defined generally. The mapping from decision variables to resource consumption and production can change based on extrinsic conditions. Asset allocator 502 can solve the optimization problem by simply balancing resource use and can be configured to solve in terms of consumed resource 1, consumed resource 2, produced resource 1, etc., rather than electricity consumed, water consumed, and chilled water produced. Such an interface at the high level allows for the mappings to be injected into asset allocation system 500 rather than needing them hard coded. Of course, "typed" resources and other components of system 500 can still exist in order to generate the mapping at run time, based on equipment out of service.

Incorporating multiple subplants 520 or sinks 540 of the same type allows for modeling the interconnections between subplants 520, sources 510, storage 530, and sinks 540. This type of modeling describes which subplants 520 can use resource from which sources 510 and which subplants 520 can send resources to which sinks 540. This can be visualized as a resource connection matrix (i.e., a directed graph) between the subplants 520, sources 510, sinks 540, and storage 530. Examples of such directed graphs are described in greater detail with reference to FIGS. 6A-6B. Extending this concept, it is possible to include costs for delivering the resource along a connection and also, efficiencies of the transmission (e.g., amount of energy that makes it to the other side of the connection).

In some instances, constraints arise due to mechanical problems after an energy facility has been built. Accordingly, these constraints are site specific and are often not incorporated into the main code for any of subplants 520 or the high level problem itself. Commissioned constraints allow for such constraints to be added without software updates during the commissioning phase of the project. Furthermore, if these additional constraints are known prior to the plant build, they can be added to the design tool run. This would allow the user to determine the cost of making certain design decisions.

Incorporating minimum turndown and allowing disjoint operating regions may greatly enhance the accuracy of the asset allocation problem solution as well as decrease the number of modifications to solution of the asset allocation by the low level optimization or another post-processing technique. It may be beneficial to allow for certain features to change as a function of time into the horizon. One could use the full disjoint range (most accurate) for the first four hours, then switch to only incorporating the minimum turndown for the next two days, and finally using to the linear relaxation with no binary constraints for the rest of the horizon. For example, asset allocator 502 can be given the operational domain that correctly allocates three chillers with a range of 1800 to 2500 tons. The true subplant range is then the union of [1800, 2500], [3600, 5000], and [5400, 7500]. If the range were approximated as [1800, 7500] the low level optimization or other post-processing technique would have to rebalance any solution between 2500 and 3600 or between 5000 and 5400 tons. Rebalancing is typically done heuristically and is unlikely to be optimal. Incorporating these disjoint operational domains adds binary variables to the optimization problem.

Some decisions made by asset allocator 502 may be shared by multiple elements of system 500. The condenser water setpoint of cooling towers is an example. It is possible to assume that this variable is fixed and allow the low level optimization to decide on its value. However, this does not allow one to make a trade-off between the chiller's electrical use and the tower's electrical use, nor does it allow the optimization to exceed the chiller's design load by feeding it cooler condenser water. Incorporating these extrinsic decisions into asset allocator 502 allows for a more accurate solution at the cost of computational time.

Incentive programs often require the reservation of one or more assets for a period of time. In traditional systems, these assets are typically turned over to alternative control, different than the typical resource price based optimization. Advantageously, asset allocator 502 can be configured to add revenue to the cost function per amount of resource reserved. Asset allocator 502 can then make the reserved portion of the resource unavailable for typical price based cost optimization. For example, asset allocator 502 can reserve a portion of a battery asset for frequency response. In this case, the battery can be used to move the load or shave the peak demand, but can also be reserved to participate in the frequency response program.

Plant Resource Diagrams

Figure 6A:
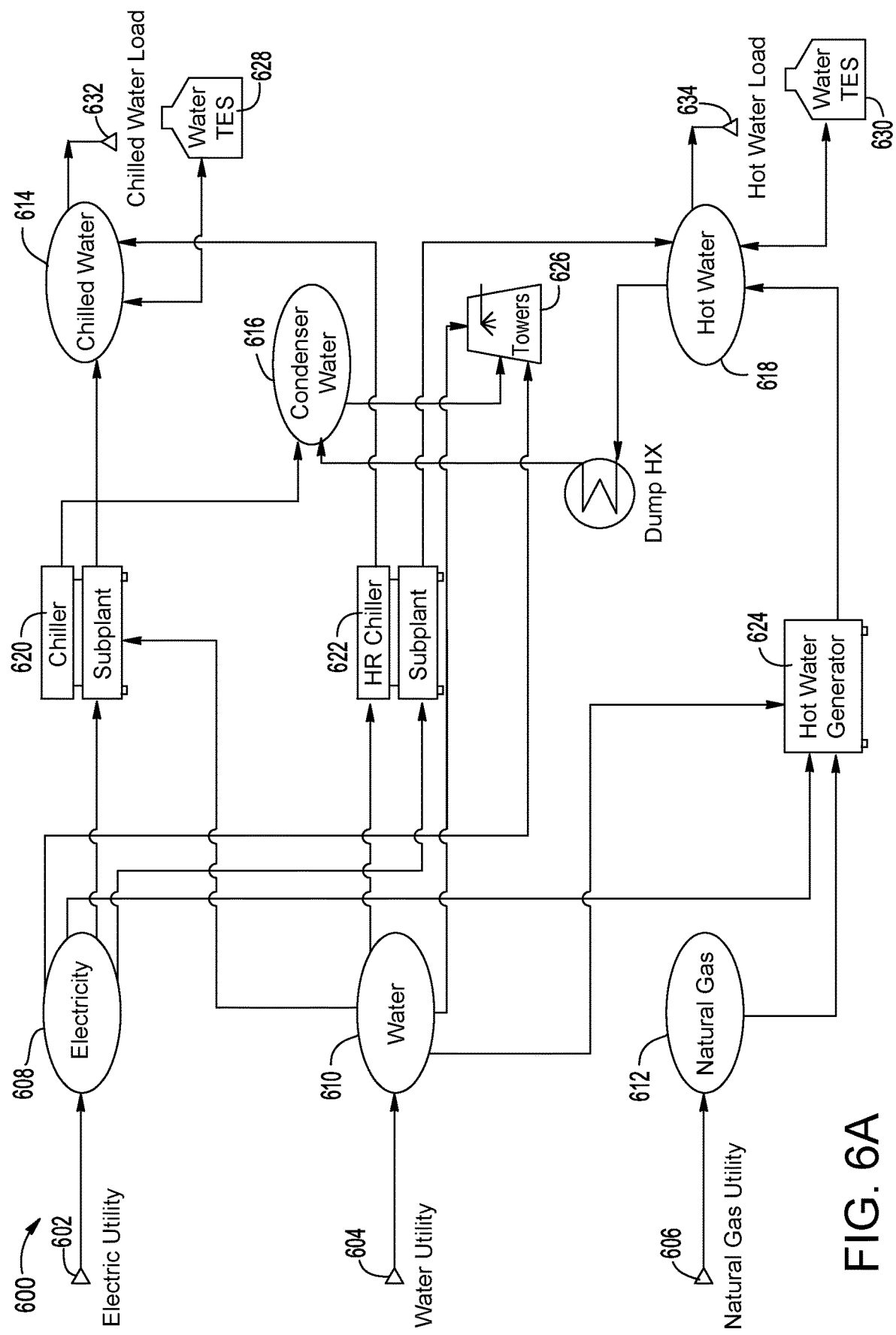
FIG. 6A is a plant resource diagram illustrating the elements of a central plant and the connections between such elements, according to an exemplary embodiment.

Referring now to FIG. 6A, a plant resource diagram 600 is shown, according to an exemplary embodiment. Plant resource diagram 600 represents a particular implementation of a central plant and indicates how the equipment of the central plant are connected to each other and to external systems or devices. Asset allocator 502 can use plant resource diagram 600 to identify the interconnections between various sources 510, subplants 520, storage 530, and sinks 540 in the central plant. In some instances, the interconnections defined by diagram 600 are not capable of being inferred based on the type of resource produced. For this reason, plant resource diagram 600 may provide asset allocator 502 with new information that can be used to establish constraints on the asset allocation problem.

Plant resource diagram 600 is shown to include an electric utility 602, a water utility 604, and a natural gas utility 606. Utilities 602-606 are examples of sources 510 that provide resources to the central plant. For example, electric utility 602 may provide an electricity resource 608, water utility 604 may provide a water resource 610, and natural gas utility 606 may provide a natural gas resource 612. The lines connecting utilities 602-606 to resources 608-612 along with the directions of the lines (i.e., pointing toward resources 608-612) indicate that resources purchased from utilities 602-606 add to resources 608-612. As shown and described herein, energy resources should be interpreted as electric utilities such as electric utility 602, water utilities such as water utilities 604, and natural gas utilities such as natural gas utility 606, as well as other possible utilities that may be received by one or more subplants of a central plant facility or one or more buildings.

Plant resource diagram 600 is shown to include a chiller subplant 620, a heat recovery (HR) chiller subplant 622, a hot water generator subplant 624, and a cooling tower subplant 626. Subplants 620-626 are examples of subplants 520 that convert resource types (i.e., convert input resources to output resources). For example, the lines connecting electricity resource 608 and water resource 610 to chiller subplant 620 indicate that chiller subplant 620 receives electricity resource 608 and water resource 610 as input resources. The lines connecting chiller subplant 620 to chilled water resource 614 and condenser water resource 616 indicate that chiller subplant 620 produces chilled water resource 614 and condenser water resource 616. Similarly, the lines connecting electricity resource 608 and water resource 610 to HR chiller subplant 622 indicate that HR chiller subplant 622 receives electricity resource 608 and water resource 610 as input resources. The lines connecting HR chiller subplant 622 to chilled water resource 614 and hot water resource 618 indicate that HR chiller subplant 622 produces chilled water resource 614 and hot water resource 618.

Plant resource diagram 600 is shown to include water TES 628 and 630. Water TES 628-630 are examples of storage 630 that can be used to store and discharge resources. The line connecting chilled water resource 614 to water TES 628 indicates that water TES 628 stores and discharges chilled water resource 614. Similarly, the line connecting hot water resource 618 to water TES 630 indicates that water TES 630 stores and discharges hot water resource 618. In diagram 600, water TES 628 is connected to only chilled water resource 614 and not to any of the other water resources 616 or 618. This indicates that water TES 628 can be used by asset allocator 502 to store and discharge only chilled water resource 614 and not the other water resources 616 or 618. Similarly, water TES 630 is connected to only hot water resource 618 and not to any of the other water resources 614 or 616. This indicates that water TES 630 can be used by asset allocator 502 to store and discharge only hot water resource 618 and not the other water resources 614 or 616.

Plant resource diagram 600 is shown to include a chilled water load 632 and a hot water load 634. Loads 632-534 are examples of sinks 440 that consume resources. The line connecting chilled water load 632 to chilled water resource 614 indicates that chilled water resource 614 can be used to satisfy chilled water load 632. Similarly, the line connecting hot water load 634 to hot water resource 618 indicates that hot water resource 618 can be used to satisfy hot water load 634. Asset allocator 502 can use the interconnections and limitations defined by plant resource diagram 600 to establish appropriate constraints on the optimization problem.

Figure 6B:
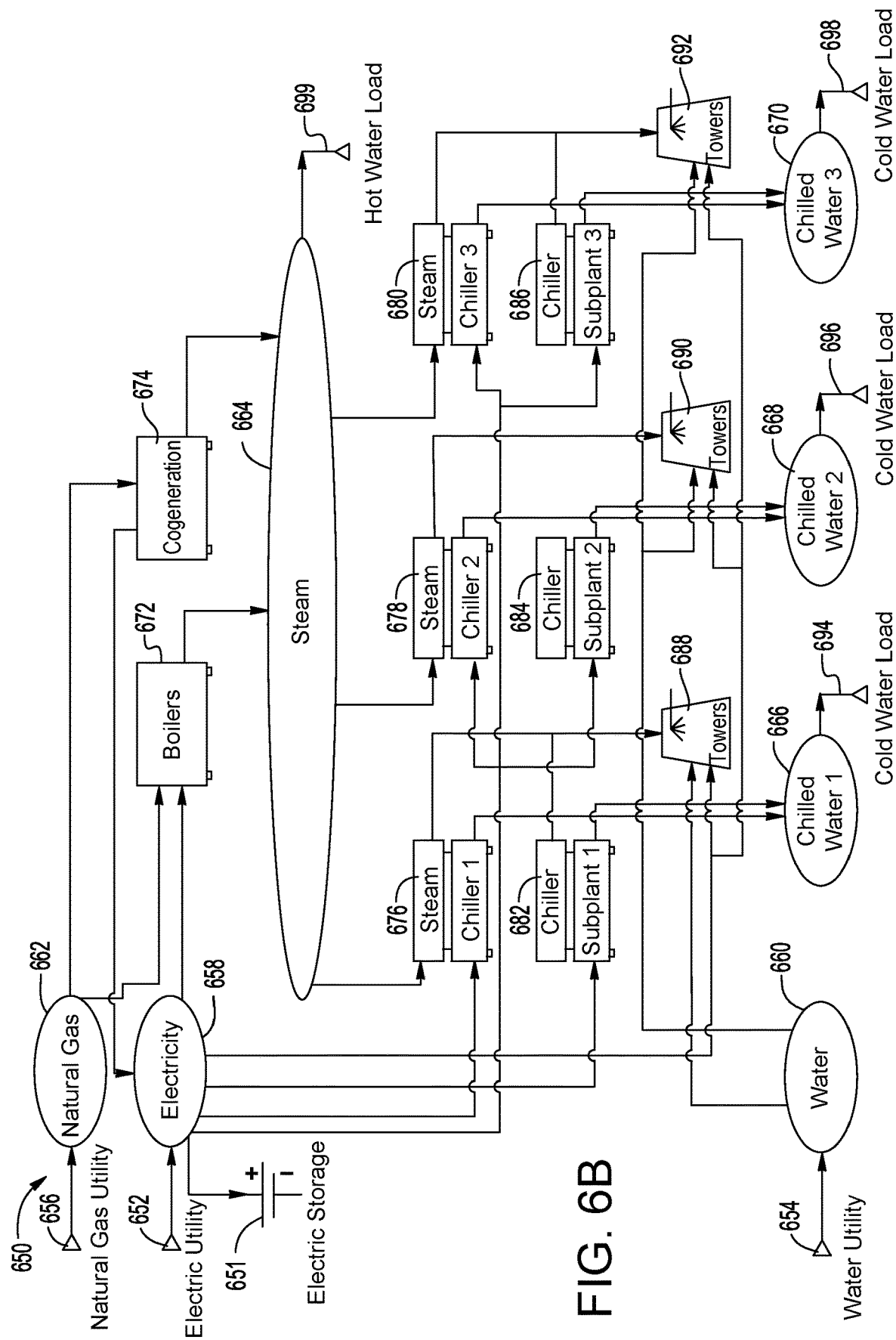
FIG. 6B is another plant resource diagram illustrating the elements of a central plant and the connections between such elements, according to an exemplary embodiment.

Referring now to FIG. 6B, another plant resource diagram 650 is shown, according to an exemplary embodiment. Plant resource diagram 650 represents another implementation of a central plant and indicates how the equipment of the central plant are connected to each other and to external systems or devices. Asset allocator 502 can use plant resource diagram 650 to identify the interconnections between various sources 510, subplants 520, storage 530, and sinks 540 in the central plant. In some instances, the interconnections defined by diagram 650 are not capable of being inferred based on the type of resource produced. For this reason, plant resource diagram 650 may provide asset allocator 502 with new information that can be used to establish constraints on the asset allocation problem.

Plant resource diagram 650 is shown to include an electric utility 652, a water utility 654, and a natural gas utility 656. Utilities 652-656 are examples of sources 510 that provide resources to the central plant. For example, electric utility 652 may provide an electricity resource 658, water utility 654 may provide a water resource 660, and natural gas utility 656 may provide a natural gas resource 662. The lines connecting utilities 652-656 to resources 658-662 along with the directions of the lines (i.e., pointing toward resources 658-662) indicate that resources purchased from utilities 652-656 add to resources 658-662. The line connecting electricity resource 658 to electrical storage 651 indicates that electrical storage 651 can store and discharge electricity resource 658.

Plant resource diagram 650 is shown to include a boiler subplant 672, a cogeneration subplant 674, several steam chiller subplants 676-580, several chiller subplants 682-586, and several cooling tower subplants 688-592. Subplants 672-592 are examples of subplants 420 that convert resource types (i.e., convert input resources to output resources). For example, the lines connecting boiler subplant 672 and cogeneration subplant 674 to natural gas resource 662, electricity resource 658, and steam resource 664 indicate that both boiler subplant 672 and cogeneration subplant 674 consume natural gas resource 662 and electricity resource 658 to produce steam resource 664.

The lines connecting steam resource 664 and electricity resource 658 to steam chiller subplants 676-680 indicate that each of steam chiller subplants 676-680 receives steam resource 664 and electricity resource 658 as input resources. However, each of steam chiller subplants 676-680 produces a different output resource. For example, steam chiller subplant 676 produces chilled water resource 666, steam chiller subplant 678 produces chilled water resource 668, and steam chiller subplant 680 produces chilled water resource 670. Similarly, the lines connecting electricity resource 658 to chiller subplants 682-686 indicate that each of chiller subplants 682-686 receives electricity resource 658 as an input. However, each of chiller subplants 682-686 produces a different output resource. For example, chiller subplant 682 produces chilled water resource 666, chiller subplant 684 produces chilled water resource 668, and chiller subplant 686 produces chilled water resource 670.

Chilled water resources 666-670 have the same general type (i.e., chilled water) but can be defined as separate resources by asset allocator 502. The lines connecting chilled water resources 666-670 to subplants 676-686 indicate which of subplants 676-686 can produce each chilled water resource 666-670. For example, plant resource diagram 650 indicates that chilled water resource 666 can only be produced by steam chiller subplant 676 and chiller subplant 682. Similarly, chilled water resource 668 can only be produced by steam chiller subplant 678 and chiller subplant 684, and chilled water resource 670 can only be produced by steam chiller subplant 680 and chiller subplant 686.

Plant resource diagram 650 is shown to include a hot water load 699 and several cold water loads 694-698. Loads 694-699 are examples of sinks 540 that consume resources. The line connecting hot water load 699 to steam resource 664 indicates that steam resource 664 can be used to satisfy hot water load 699. Similarly, the lines connecting chilled water resources 666-670 to cold water loads 694-698 indicate which of chilled water resources 666-670 can be used to satisfy each of cold water loads 694-698. For example, only chilled water resource 666 can be used to satisfy cold water load 694, only chilled water resource 668 can be used to satisfy cold water load 696, and only chilled water resource 670 can be used to satisfy cold water load 698. Asset allocator 502 can use the interconnections and limitations defined by plant resource diagram 650 to establish appropriate constraints on the optimization problem.

Central Plant Controller

Figure 7:
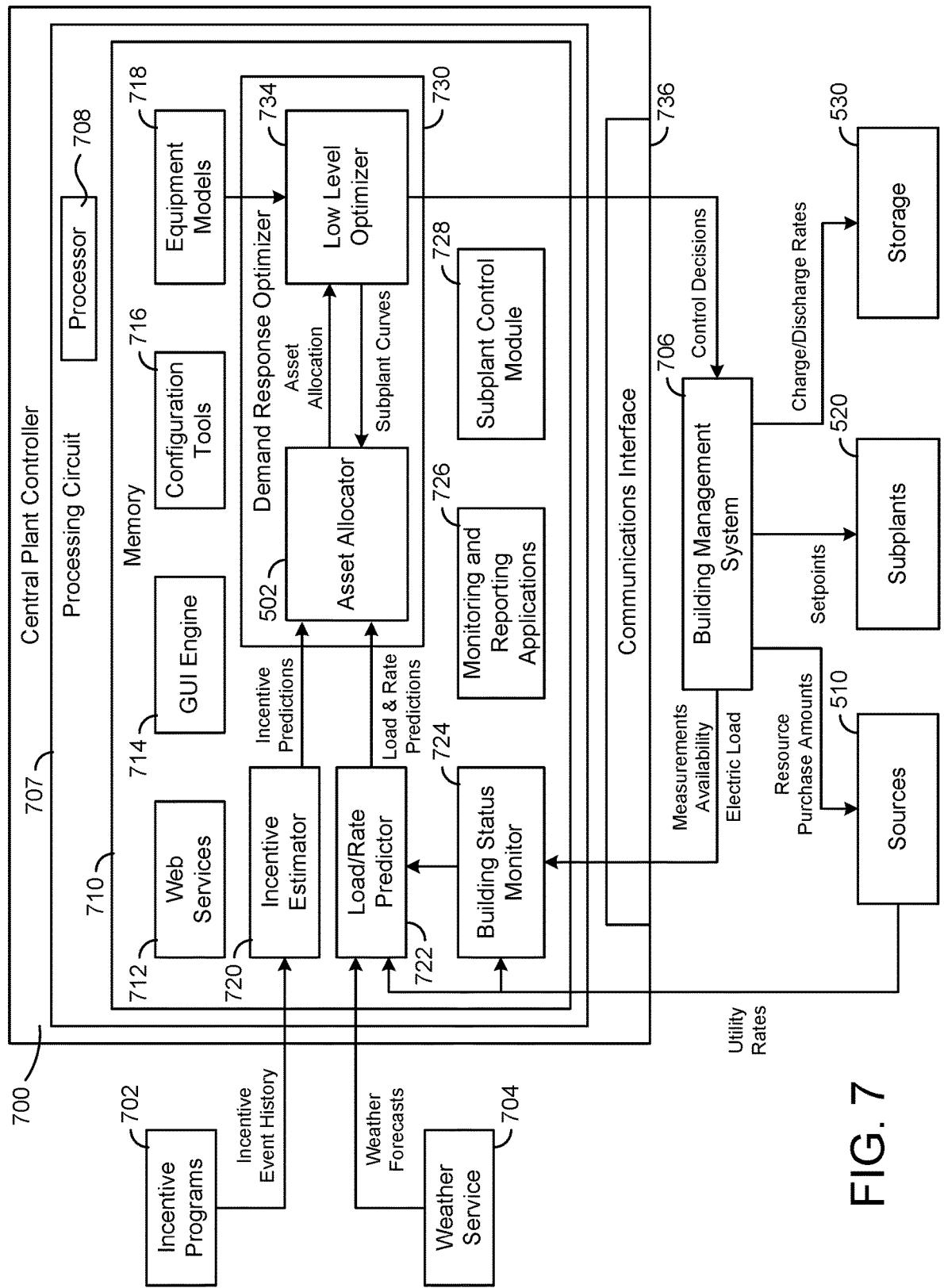
FIG. 7 is a block diagram of a central plant controller in which the asset allocator of FIG. 5 can be implemented, according to an exemplary embodiment.

Referring now to FIG. 7, a block diagram of a central plant controller 700 in which asset allocator 502 can be implemented is shown, according to an exemplary embodiment. In various embodiments, central plant controller 700 can be configured to monitor and control central plant 200, asset allocation system 500, and various components thereof (e.g., sources 510, subplants 520, storage 530, sinks 540, etc.). Central plant controller 700 is shown providing control decisions to a building management system (BMS) 706. The control decisions provided to BMS 706 may include resource purchase amounts for sources 510, setpoints for subplants 520, and/or charge/discharge rates for storage 530.

In some embodiments, BMS 706 is the same or similar to the BMS described with reference to FIG. 1. BMS 706 may be configured to monitor conditions within a controlled building or building zone. For example, BMS 706 may receive input from various sensors (e.g., temperature sensors, humidity sensors, airflow sensors, voltage sensors, etc.) distributed throughout the building and may report building conditions to central plant controller 700. Building conditions may include, for example, a temperature of the building or a zone of the building, a power consumption (e.g., electric load) of the building, a state of one or more actuators configured to affect a controlled state within the building, or other types of information relating to the controlled building. BMS 706 may operate subplants 520 and storage 530 to affect the monitored conditions within the building and to serve the thermal energy loads of the building.

BMS 706 may receive control signals from central plant controller 700 specifying on/off states, charge/discharge rates, and/or setpoints for the subplant equipment. BMS 706 may control the equipment (e.g., via actuators, power relays, etc.) in accordance with the control signals provided by central plant controller 700. For example, BMS 706 may operate the equipment using closed loop control to achieve the setpoints specified by central plant controller 700. In various embodiments, BMS 706 may be combined with central plant controller 700 or may be part of a separate building management system. According to an exemplary embodiment, BMS 706 is a METASYS® brand building management system, as sold by Johnson Controls, Inc.

Central plant controller 700 may monitor the status of the controlled building using information received from BMS 706. Central plant controller 700 may be configured to predict the thermal energy loads (e.g., heating loads, cooling loads, etc.) of the building for plurality of time steps in an optimization period (e.g., using weather forecasts from a weather service 704). Central plant controller 700 may also predict the revenue generation potential of incentive based demand response (IBDR) programs using an incentive event history (e.g., past clearing prices, mileage ratios, event probabilities, etc.) from incentive programs 702. Central plant controller 700 may generate control decisions that optimize the economic value of operating central plant 200 over the duration of the optimization period subject to constraints on the optimization process (e.g., energy balance constraints, load satisfaction constraints, etc.). The optimization process performed by central plant controller 700 is described in greater detail below.

In some embodiments, central plant controller 700 is integrated within a single computer (e.g., one server, one housing, etc.). In various other exemplary embodiments, central plant controller 700 can be distributed across multiple servers or computers (e.g., that can exist in distributed locations). In another exemplary embodiment, central plant controller 700 may integrated with a smart building manager that manages multiple building systems and/or combined with BMS 706.

Central plant controller 700 is shown to include a communications interface 736 and a processing circuit 707. Communications interface 736 may include wired or wireless interfaces (e.g., jacks, antennas, transmitters, receivers, transceivers, wire terminals, etc.) for conducting data communications with various systems, devices, or networks. For example, communications interface 736 may include an Ethernet card and port for sending and receiving data via an Ethernet-based communications network and/or a WiFi transceiver for communicating via a wireless communications network. Communications interface 736 may be configured to communicate via local area networks or wide area networks (e.g., the Internet, a building WAN, etc.) and may use a variety of communications protocols (e.g., BACnet, IP, LON, etc.).

Communications interface 736 may be a network interface configured to facilitate electronic data communications between central plant controller 700 and various external systems or devices (e.g., BMS 706, subplants 520, storage 530, sources 510, etc.). For example, central plant controller 700 may receive information from BMS 706 indicating one or more measured states of the controlled building (e.g., temperature, humidity, electric loads, etc.) and one or more states of subplants 520 and/or storage 530 (e.g., equipment status, power consumption, equipment availability, etc.). Communications interface 736 may receive inputs from BMS 706, subplants 520, and/or storage 530 and may provide operating parameters (e.g., on/off decisions, setpoints, etc.) to subplants 520 and storage 530 via BMS 706. The operating parameters may cause subplants 520 and storage 530 to activate, deactivate, or adjust a setpoint for various devices thereof.

Still referring to FIG. 7, processing circuit 707 is shown to include a processor 708 and memory 710. Processor 708 may be a general purpose or specific purpose processor, an application specific integrated circuit (ASIC), one or more field programmable gate arrays (FPGAs), a group of processing components, or other suitable processing components. Processor 708 may be configured to execute computer code or instructions stored in memory 710 or received from other computer readable media (e.g., CDROM, network storage, a remote server, etc.).

Memory 710 may include one or more devices (e.g., memory units, memory devices, storage devices, etc.) for storing data and/or computer code for completing and/or facilitating the various processes described in the present disclosure. Memory 710 may include random access memory (RAM), read-only memory (ROM), hard drive storage, temporary storage, non-volatile memory, flash memory, optical memory, or any other suitable memory for storing software objects and/or computer instructions. Memory 710 may include database components, object code components, script components, or any other type of information structure for supporting the various activities and information structures described in the present disclosure. Memory 710 may be communicably connected to processor 708 via processing circuit 707 and may include computer code for executing (e.g., by processor 708) one or more processes described herein.

Memory 710 is shown to include a building status monitor 724. Central plant controller 700 may receive data regarding the overall building or building space to be heated or cooled by system 500 via building status monitor 724. In an exemplary embodiment, building status monitor 724 may include a graphical user interface component configured to provide graphical user interfaces to a user for selecting building requirements (e.g., overall temperature parameters, selecting schedules for the building, selecting different temperature levels for different building zones, etc.).

Central plant controller 700 may determine on/off configurations and operating setpoints to satisfy the building requirements received from building status monitor 724. In some embodiments, building status monitor 724 receives, collects, stores, and/or transmits cooling load requirements, building temperature setpoints, occupancy data, weather data, energy data, schedule data, and other building parameters. In some embodiments, building status monitor 724 stores data regarding energy costs, such as pricing information available from sources 510 (energy charge, demand charge, etc.).

Still referring to FIG. 7, memory 710 is shown to include a load/rate predictor 722. Load/rate predictor 722 may be configured to predict the thermal energy loads ($\hat{l}_k$) of the building or campus for each time step k (e.g., k=1 . . . n) of an optimization period. Load/rate predictor 722 is shown receiving weather forecasts from a weather service 704. In some embodiments, load/rate predictor 722 predicts the thermal energy loads $\hat{l}_k$ as a function of the weather forecasts. In some embodiments, load/rate predictor 722 uses feedback from BMS 706 to predict loads $\hat{l}_k$. Feedback from BMS 706 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate predictor 722 receives a measured electric load and/or previous measured load data from BMS 706 (e.g., via building status monitor 724). Load/rate predictor 722 may predict loads $\hat{l}_k$ as a function of a given weather forecast ($\hat{\phi}_w$), a day type (day), the time of day (t), and previous measured load data ($Y_{k-1}$). Such a relationship is expressed in the following equation:

$$\hat{l}_k = f(\hat{\phi}_w, \text{day}, t | Y_{k-1})$$

In some embodiments, load/rate predictor 722 uses a deterministic plus stochastic model trained from historical load data to predict loads $\hat{l}_k$. Load/rate predictor 722 may use any of a variety of prediction methods to predict loads $\hat{l}_k$ (e.g., linear regression for the deterministic portion and an AR model for the stochastic portion). Load/rate predictor 722 may predict one or more different types of loads for the building or campus. For example, load/rate predictor 722 may predict a hot water load $\hat{l}_{Hot,k}$ and a cold water load $\hat{l}_{Cold,k}$ for each time step k within the prediction window. In some embodiments, load/rate predictor 722 makes load/rate predictions using the techniques described in U.S. patent application Ser. No. 14/717,593.

Load/rate predictor 722 is shown receiving utility rates from sources 410. Utility rates may indicate a cost or price per unit of a resource (e.g., electricity, natural gas, water, etc.) provided by sources 510 at each time step k in the prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from sources 510 or predicted utility rates estimated by load/rate predictor 722.

In some embodiments, the utility rates include demand charges for one or more resources provided by sources 510. A demand charge may define a separate cost imposed by sources 510 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, demand response optimizer 730 may be configured to account for demand charges in the high level optimization process performed by asset allocator 502. Sources 510 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period. Load/rate predictor 722 may store the predicted loads $\hat{l}_k$ and the utility rates in memory 710 and/or provide the predicted loads $\hat{l}_k$ and the utility rates to demand response optimizer 730.

Still referring to FIG. 7, memory 710 is shown to include an incentive estimator 720. Incentive estimator 720 may be configured to estimate the revenue generation potential of participating in various incentive-based demand response (IBDR) programs. In some embodiments, incentive estimator 720 receives an incentive event history from incentive programs 702. The incentive event history may include a history of past IBDR events from incentive programs 702. An IBDR event may include an invitation from incentive programs 702 to participate in an IBDR program in exchange for a monetary incentive. The incentive event history may indicate the times at which the past IBDR events occurred and attributes describing the IBDR events (e.g., clearing prices, mileage ratios, participation requirements, etc.). Incentive estimator 720 may use the incentive event history to estimate IBDR event probabilities during the optimization period.

Incentive estimator 720 is shown providing incentive predictions to demand response optimizer 730. The incentive predictions may include the estimated IBDR probabilities, estimated participation requirements, an estimated amount of revenue from participating in the estimated IBDR events, and/or any other attributes of the predicted IBDR events. Demand response optimizer 730 may use the incentive predictions along with the predicted loads $\hat{l}_k$ and utility rates from load/rate predictor 722 to determine an optimal set of control decisions for each time step within the optimization period.

Still referring to FIG. 7, memory 710 is shown to include a demand response optimizer 730. Demand response optimizer 730 may perform a cascaded optimization process to optimize the performance of asset allocation system 500. For example, demand response optimizer 730 is shown to include asset allocator 502 and a low level optimizer 734. Asset allocator 502 may control an outer (e.g., subplant level) loop of the cascaded optimization. Asset allocator 502 may determine an optimal set of control decisions for each time step in the prediction window in order to optimize (e.g., maximize) the value of operating asset allocation system 500. Control decisions made by asset allocator 502 may include, for example, load setpoints for each of subplants 520, charge/discharge rates for each of storage 530, resource purchase amounts for each type of resource purchased from sources 510, and/or an amount of each resource sold to energy purchasers 704. In other words, the control decisions may define resource allocation at each time step. The control decisions made by asset allocator 502 are based on the statistical estimates of incentive event probabilities and revenue generation potential for various IBDR events as well as the load and rate predictions.

Low level optimizer 734 may control an inner (e.g., equipment level) loop of the cascaded optimization. Low level optimizer 734 may determine how to best run each subplant at the load setpoint determined by asset allocator 502. For example, low level optimizer 734 may determine on/off states and/or operating setpoints for various devices of the subplant equipment in order to optimize (e.g., minimize) the energy consumption of each subplant while meeting the resource allocation setpoint for the subplant. In some embodiments, low level optimizer 734 receives actual incentive events from incentive programs 702. Low level optimizer 734 may determine whether to participate in the incentive events based on the resource allocation set by asset allocator 502. For example, if insufficient resources have been allocated to a particular IBDR program by asset allocator 502 or if the allocated resources have already been used, low level optimizer 734 may determine that asset allocation system 500 will not participate in the IBDR program and may ignore the IBDR event. However, if the required resources have been allocated to the IBDR program and are available in storage 530, low level optimizer 734 may determine that system 500 will participate in the IBDR program in response to the IBDR event. The cascaded optimization process performed by demand response optimizer 730 is described in greater detail in U.S. patent application Ser. No. 15/247,885.

In some embodiments, low level optimizer 734 generates and provides subplant curves to asset allocator 502. Each subplant curve may indicate an amount of resource consumption by a particular subplant (e.g., electricity use measured in kW, water use measured in L/s, etc.) as a function of the subplant load. In some embodiments, low level optimizer 734 generates the subplant curves by running the low level optimization process for various combinations of subplant loads and weather conditions to generate multiple data points. Low level optimizer 734 may fit a curve to the data points to generate the subplant curves. In other embodiments, low level optimizer 734 provides the data points asset allocator 502 and asset allocator 502 generates the subplant curves using the data points. Asset allocator 502 may store the subplant curves in memory for use in the high level (i.e., asset allocation) optimization process.

In some embodiments, the subplant curves are generated by combining efficiency curves for individual devices of a subplant. A device efficiency curve may indicate the amount of resource consumption by the device as a function of load. The device efficiency curves may be provided by a device manufacturer or generated using experimental data. In some embodiments, the device efficiency curves are based on an initial efficiency curve provided by a device manufacturer and updated using experimental data. The device efficiency curves may be stored in equipment models 718. For some devices, the device efficiency curves may indicate that resource consumption is a U-shaped function of load. Accordingly, when multiple device efficiency curves are combined into a subplant curve for the entire subplant, the resultant subplant curve may be a wavy curve. The waves are caused by a single device loading up before it is more efficient to turn on another device to satisfy the subplant load.

Still referring to FIG. 7, memory 710 is shown to include a subplant control module 728. Subplant control module 728 may store historical data regarding past operating statuses, past operating setpoints, and instructions for calculating and/or implementing control parameters for subplants 520 and storage 530. Subplant control module 728 may also receive, store, and/or transmit data regarding the conditions of individual devices of the subplant equipment, such as operating efficiency, equipment degradation, a date since last service, a lifespan parameter, a condition grade, or other device-specific data. Subplant control module 728 may receive data from subplants 520, storage 530, and/or BMS 706 via communications interface 736. Subplant control module 728 may also receive and store on/off statuses and operating setpoints from low level optimizer 734.

Data and processing results from demand response optimizer 730, subplant control module 728, or other modules of central plant controller 700 may be accessed by (or pushed to) monitoring and reporting applications 726. Monitoring and reporting applications 726 may be configured to generate real time "system health" dashboards that can be viewed and navigated by a user (e.g., a system engineer). For example, monitoring and reporting applications 726 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across energy storage systems in different buildings (real or modeled), different campuses, or the like. Other GUI elements or reports may be generated and shown based on available data that allow users to assess performance across one or more energy storage systems from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of the energy storage system.

Still referring to FIG. 7, central plant controller 700 may include one or more GUI servers, web services 712, or GUI engines 714 to support monitoring and reporting applications 726. In various embodiments, applications 726, web services 712, and GUI engine 714 may be provided as separate components outside of central plant controller 700 (e.g., as part of a smart building manager). Central plant controller 700 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. Central plant controller 700 may be configured to provide the results of any such processing to other databases, tables, XML files, or other data structures for further querying, calculation, or access by, for example, external monitoring and reporting applications.

Central plant controller 700 is shown to include configuration tools 716. Configuration tools 716 can allow a user to define (e.g., via graphical user interfaces, via prompt-driven "wizards," etc.) how central plant controller 700 should react to changing conditions in the energy storage subsystems. In an exemplary embodiment, configuration tools 716 allow a user to build and store condition-response scenarios that can cross multiple energy storage system devices, multiple building systems, and multiple enterprise control applications (e.g., work order management system applications, entity resource planning applications, etc.). For example, configuration tools 716 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 716 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Planning Tool

Figure 8:
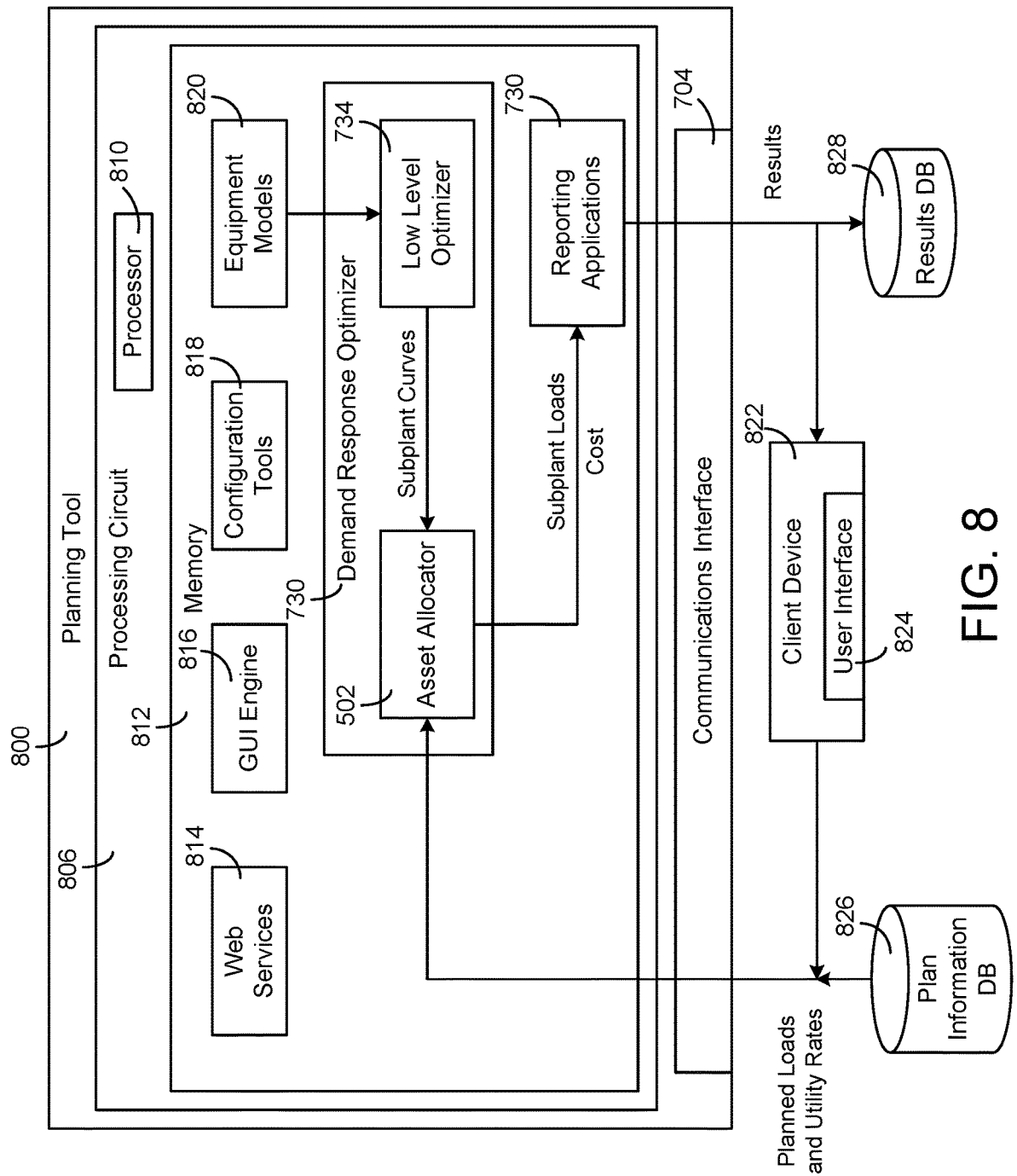
FIG. 8 is a block diagram of a planning tool in which the asset allocator of FIG. 5 can be implemented, according to an exemplary embodiment.

Referring now to FIG. 8, a block diagram of a planning tool 800 in which asset allocator 502 can be implemented is shown, according to an exemplary embodiment. Planning tool 800 may be configured to use demand response optimizer 730 to simulate the operation of a central plant over a predetermined time period (e.g., a day, a month, a week, a year, etc.) for planning, budgeting, and/or design considerations. When implemented in planning tool 800, demand response optimizer 730 may operate in a similar manner as described with reference to FIG. 7. For example, demand response optimizer 730 may use building loads and utility rates to determine an optimal resource allocation to minimize cost over a simulation period. However, planning tool 800 may not be responsible for real-time control of a building management system or central plant.

Planning tool 800 can be configured to determine the benefits of investing in a battery asset and the financial metrics associated with the investment. Such financial metrics can include, for example, the internal rate of return (IRR), net present value (NPV), and/or simple payback period (SPP). Planning tool 800 can also assist a user in determining the size of the battery which yields optimal financial metrics such as maximum NPV or a minimum SPP. In some embodiments, planning tool 800 allows a user to specify a battery size and automatically determines the benefits of the battery asset from participating in selected IBDR programs while performing PBDR. In some embodiments, planning tool 800 is configured to determine the battery size that minimizes SPP given the IBDR programs selected and the requirement of performing PBDR. In some embodiments, planning tool 800 is configured to determine the battery size that maximizes NPV given the IBDR programs selected and the requirement of performing PBDR.

In planning tool 800, asset allocator 502 may receive planned loads and utility rates for the entire simulation period. The planned loads and utility rates may be defined by input received from a user via a client device 822 (e.g., user-defined, user selected, etc.) and/or retrieved from a plan information database 826. Asset allocator 502 uses the planned loads and utility rates in conjunction with subplant curves from low level optimizer 734 to determine an optimal resource allocation (i.e., an optimal dispatch schedule) for a portion of the simulation period.

The portion of the simulation period over which asset allocator 502 optimizes the resource allocation may be defined by a prediction window ending at a time horizon. With each iteration of the optimization, the prediction window is shifted forward and the portion of the dispatch schedule no longer in the prediction window is accepted (e.g., stored or output as results of the simulation). Load and rate predictions may be predefined for the entire simulation and may not be subject to adjustments in each iteration. However, shifting the prediction window forward in time may introduce additional plan information (e.g., planned loads and/or utility rates) for the newly-added time slice at the end of the prediction window. The new plan information may not have a significant effect on the optimal dispatch schedule since only a small portion of the prediction window changes with each iteration.

In some embodiments, asset allocator 502 requests all of the subplant curves used in the simulation from low level optimizer 734 at the beginning of the simulation. Since the planned loads and environmental conditions are known for the entire simulation period, asset allocator 502 may retrieve all of the relevant subplant curves at the beginning of the simulation. In some embodiments, low level optimizer 734 generates functions that map subplant production to equipment level production and resource use when the subplant curves are provided to asset allocator 502. These subplant to equipment functions may be used to calculate the individual equipment production and resource use (e.g., in a post-processing module) based on the results of the simulation.

Still referring to FIG. 8, planning tool 800 is shown to include a communications interface 804 and a processing circuit 806. Communications interface 804 may include wired or wireless interfaces (e.g., jacks, antennas, transmitters, receivers, transceivers, wire terminals, etc.) for conducting data communications with various systems, devices, or networks. For example, communications interface 804 may include an Ethernet card and port for sending and receiving data via an Ethernet-based communications network and/or a WiFi transceiver for communicating via a wireless communications network. Communications interface 804 may be configured to communicate via local area networks or wide area networks (e.g., the Internet, a building WAN, etc.) and may use a variety of communications protocols (e.g., BACnet, IP, LON, etc.).

Communications interface 804 may be a network interface configured to facilitate electronic data communications between planning tool 800 and various external systems or devices (e.g., client device 822, results database 828, plan information database 826, etc.). For example, planning tool 800 may receive planned loads and utility rates from client device 822 and/or plan information database 826 via communications interface 804. Planning tool 800 may use communications interface 804 to output results of the simulation to client device 822 and/or to store the results in results database 828.

Still referring to FIG. 8, processing circuit 806 is shown to include a processor 810 and memory 812. Processor 810 may be a general purpose or specific purpose processor, an application specific integrated circuit (ASIC), one or more field programmable gate arrays (FPGAs), a group of processing components, or other suitable processing components. Processor 810 may be configured to execute computer code or instructions stored in memory 812 or received from other computer readable media (e.g., CDROM, network storage, a remote server, etc.).

Memory 812 may include one or more devices (e.g., memory units, memory devices, storage devices, etc.) for storing data and/or computer code for completing and/or facilitating the various processes described in the present disclosure. Memory 812 may include random access memory (RAM), read-only memory (ROM), hard drive storage, temporary storage, non-volatile memory, flash memory, optical memory, or any other suitable memory for storing software objects and/or computer instructions. Memory 812 may include database components, object code components, script components, or any other type of information structure for supporting the various activities and information structures described in the present disclosure. Memory 812 may be communicably connected to processor 810 via processing circuit 806 and may include computer code for executing (e.g., by processor 810) one or more processes described herein.

Still referring to FIG. 8, memory 812 is shown to include a GUI engine 816, web services 814, and configuration tools 818. In an exemplary embodiment, GUI engine 816 includes a graphical user interface component configured to provide graphical user interfaces to a user for selecting or defining plan information for the simulation (e.g., planned loads, utility rates, environmental conditions, etc.). Web services 814 may allow a user to interact with planning tool 800 via a web portal and/or from a remote system or device (e.g., an enterprise control application).

Configuration tools 818 can allow a user to define (e.g., via graphical user interfaces, via prompt-driven "wizards," etc.) various parameters of the simulation such as the number and type of subplants, the devices within each subplant, the subplant curves, device-specific efficiency curves, the duration of the simulation, the duration of the prediction window, the duration of each time step, and/or various other types of plan information related to the simulation. Configuration tools 818 can present user interfaces for building the simulation. The user interfaces may allow users to define simulation parameters graphically. In some embodiments, the user interfaces allow a user to select a pre-stored or pre-constructed simulated plant and/or plan information (e.g., from plan information database 826) and adapt it or enable it for use in the simulation.

Still referring to FIG. 8, memory 812 is shown to include demand response optimizer 630. Demand response optimizer 730 may use the planned loads and utility rates to determine an optimal resource allocation over a prediction window. The operation of demand response optimizer 730 may be the same or similar as previously described with reference to FIG. 7. With each iteration of the optimization process, demand response optimizer 730 may shift the prediction window forward and apply the optimal resource allocation for the portion of the simulation period no longer in the prediction window. Demand response optimizer 730 may use the new plan information at the end of the prediction window to perform the next iteration of the optimization process. Demand response optimizer 730 may output the applied resource allocation to reporting applications 830 for presentation to a client device 822 (e.g., via user interface 824) or storage in results database 828.

The planning tool 800 can be configured to identify one or more time steps within a simulation period for which corresponding planned load data and/or utility rate data is not present. The output of the applied resource allocation to reporting applications 830 for presentation to a client device 822 can be configured to include initiating an action that addresses any missing planned load data and/or utility rate data for the time steps of the simulation period. In some embodiments this may be an entirely automatic process in which the planning tool 800 and/or components thereof are in communication with one or more systems or databases and initiates a query for the missing data. The entirely automatic process can include communication with other systems or databases in order to identify and obtain data corresponding to the time steps of the simulation period for which the planned load and/or utility rate data is identified as being missing or absent.

In some embodiments, the action initiated by the planning tool 800 and/or components thereof may be a semi-automatic process. In such a semi-automatic process, the output of the applied resource allocation to reporting applications 830 for presentation to a client device 822 may include initiating an action that allows a user to provide an input. The input provided by the user can be configured to query one or more systems or databases for the missing data from one or more time steps, thus causing the planning tool 800 to access additional systems and/or databases in order to identify any possible data that corresponds to one or more time steps within a simulation period for which data is not currently found.

In some embodiments, the planning tool 800 and/or components thereof may be configured to initiate an action that allows a user to input data, such as planned load data and/or utility rate date, for one or more time steps of a simulation period for which the corresponding data is not currently entered. Contrary to the entirely automatic and semi-automatic processes described previously, a manual process may be initiated in which a user is allowed to provide an input of data that corresponds to the missing data for one or more time steps. Accordingly, via a user interface such as user interface 824 of FIG. 8, a user may input data that corresponds to the one or more time steps of the simulation period so as to satisfy each of the time steps of the simulation period.

Still referring to FIG. 8, memory 812 is shown to include reporting applications 830. Reporting applications 830 may receive the optimized resource allocations from demand response optimizer 730 and, in some embodiments, costs associated with the optimized resource allocations. Reporting applications 830 may include a web-based reporting application with several graphical user interface (GUI) elements (e.g., widgets, dashboard controls, windows, etc.) for displaying key performance indicators (KPI) or other information to users of a GUI. In addition, the GUI elements may summarize relative energy use and intensity across various plants, subplants, or the like. Other GUI elements or reports may be generated and shown based on available data that allow users to assess the results of the simulation. The user interface or report (or underlying data engine) may be configured to aggregate and categorize resource allocation and the costs associated therewith and provide the results to a user via a GUI. The GUI elements may include charts or histograms that allow the user to visually analyze the results of the simulation. An exemplary output that may be generated by reporting applications 830 is shown in FIG. 8.

Quantitative Monthly Visual Indicator

Figure 9:
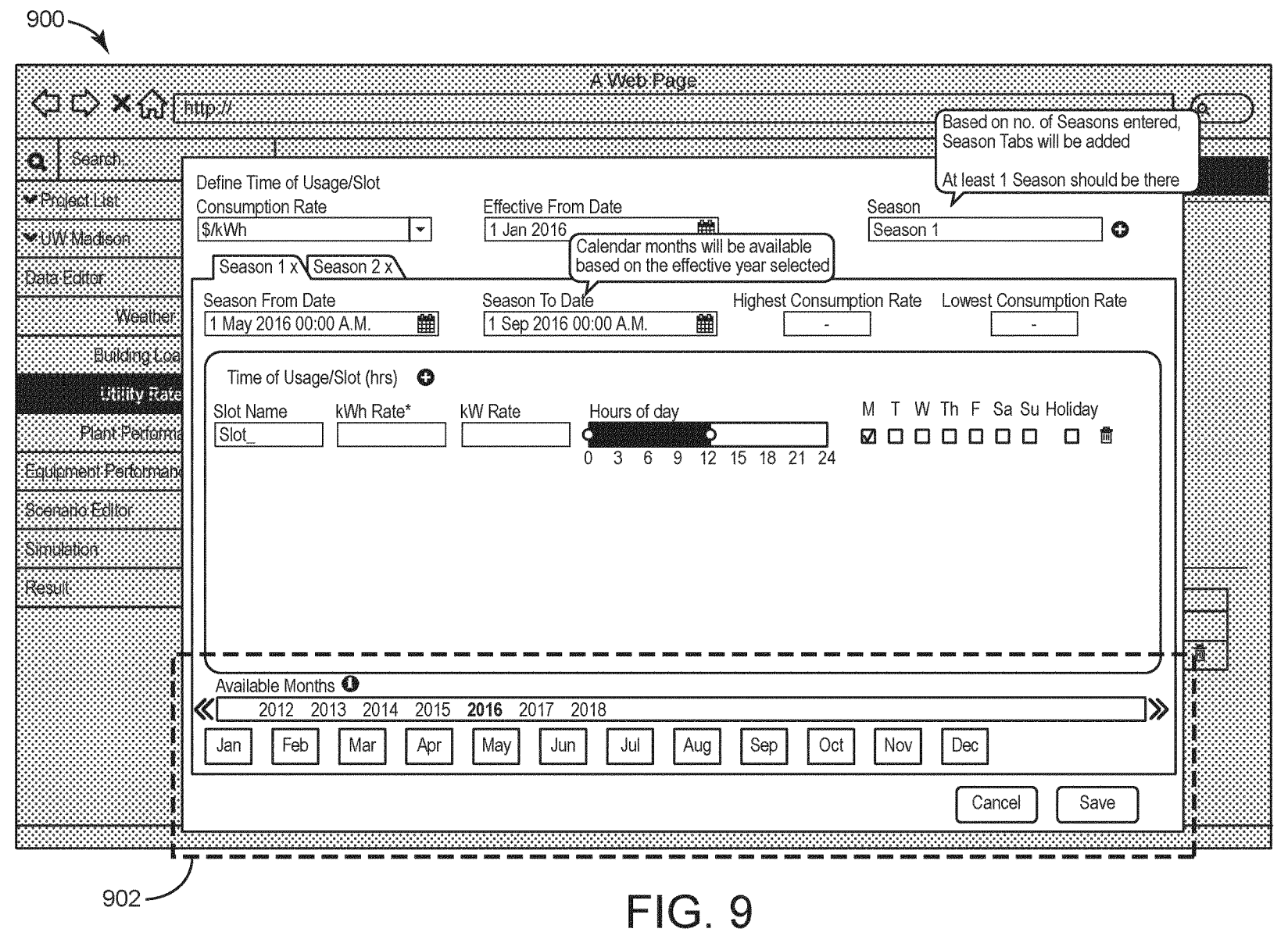

Referring now to FIG. 9, a user interface associated with planning tool 900 is shown, according to some embodiments. Planning tool 900 can include a monthly visual indicator 902. In some embodiments, planning tool 900 can include a visual indicator for a different time interval (e.g., days), and monthly visual indicator 902 is accordingly understood to be an example embodiment. As shown, planning tool 900 includes a dedicated window corresponding to "Data Editor—Utility Rates." This window can include monthly visual indicator 902, as well as tools and options related to monthly visual indicator 902.

In some embodiments, monthly visual indicator 902 can be used to indicate months having complete data, and/or available months based on incomplete data (e.g., missed hourly rates). As one example, months having complete data sets can be displayed in gray, and months having incomplete data sets can be displayed in green. Alternatively, a different visual indication (e.g., text, graphics, patterns, etc.) can be implemented to distinguish months having complete data versus incomplete data. Monthly visual indicator 902 can warn a user that specific months do not have sufficiently complete data (and accordingly, the months may be excluded in a subsequent simulation). In some embodiments, determining if a month has "complete" data can include determining if a threshold number of hours have data.

As shown by FIG. 9, monthly visual indicator 902 can provide data corresponding to the electricity rate data (e.g., consumption rate). In some embodiments, monthly visual indicator 902 can provide data corresponding to any other utility rate data (e.g., water, steam, gas, etc.). Accordingly, description herein corresponding to electricity consumption is understood to be an example embodiment.

Still referring to FIG. 9, a user can set a customized "season" (i.e., a season start date and a season end date). Further, a user can set custom hours for each day of the week, corresponding to a time period of interest. As shown, the user has selected Mondays (step 8) from May 1, 2016 (step 6) to Sep. 1, 2016 (step 7), between the hours of 0 and 14. Further, a user can add seasons as desired. Based on the number of seasons entered by the user (step 5), additional seasons tabs (see, e.g., "Season 1" and "Season 2" tabs and step 5) can be added. Once a user has configured the time slot with their desired preferences, they can save the time slot (step 9). Further embodiments of planning tool 900 are described in detail with respect to FIGS. 11-41.

Figure 10:
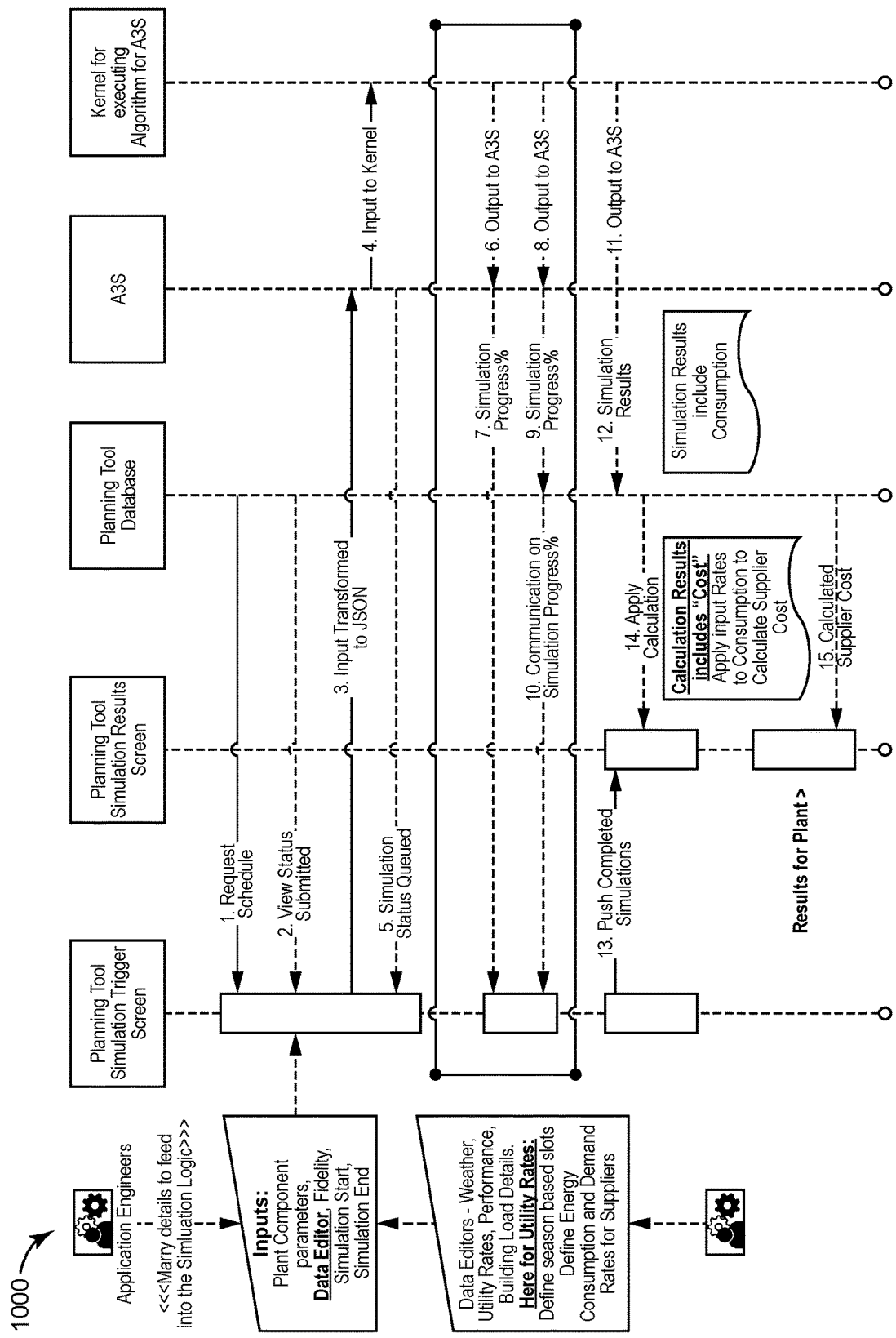
FIG. 10 is a flowchart showing the communication of data corresponding to the planning tool of FIG. 8, according to an exemplary embodiment.

Referring now to FIG. 10, a flowchart 1000 illustrating the communication of data corresponding to a planning tool (e.g., planning tool 900) is shown, according to some embodiments. As shown, flowchart 1000 provides end-to-end data flow corresponding to utility consumption. Once a user has defined parameters within the data editor, the parameters can be paired with appropriate component information (in this case, the electricity supplier). Next, the paired data can be sent from the planning tool to A3S. In some embodiments, the paired data is converted to a JSON format prior to being sent to A3S. A3S can be configured to analyze (e.g., via an algorithm) the paired data, and determine the corresponding utility consumption. At step 13, a total utility cost can be calculated from the utility consumption data. The planning tool can then display the total utility cost.

Figure 11:
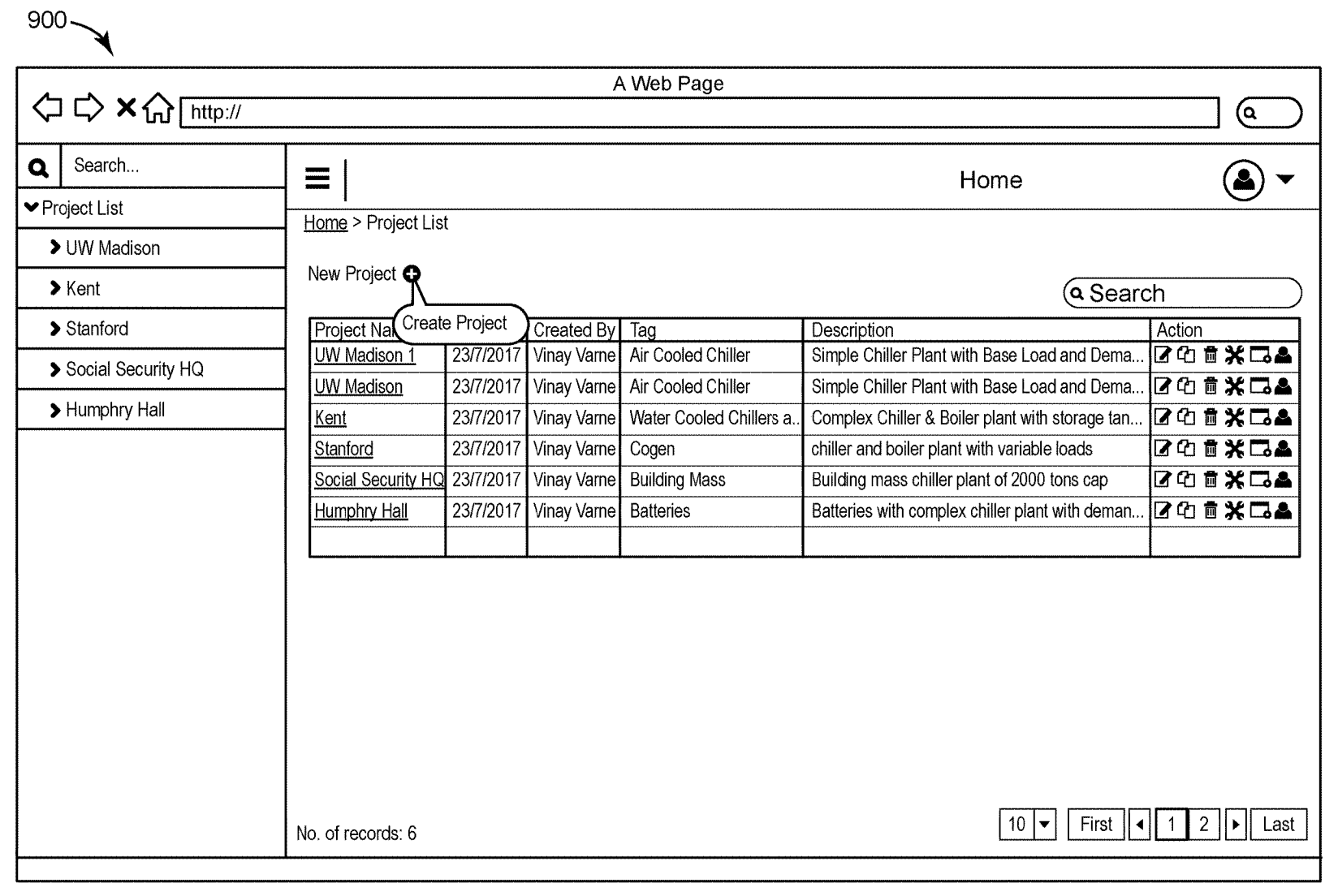
Figure 12:
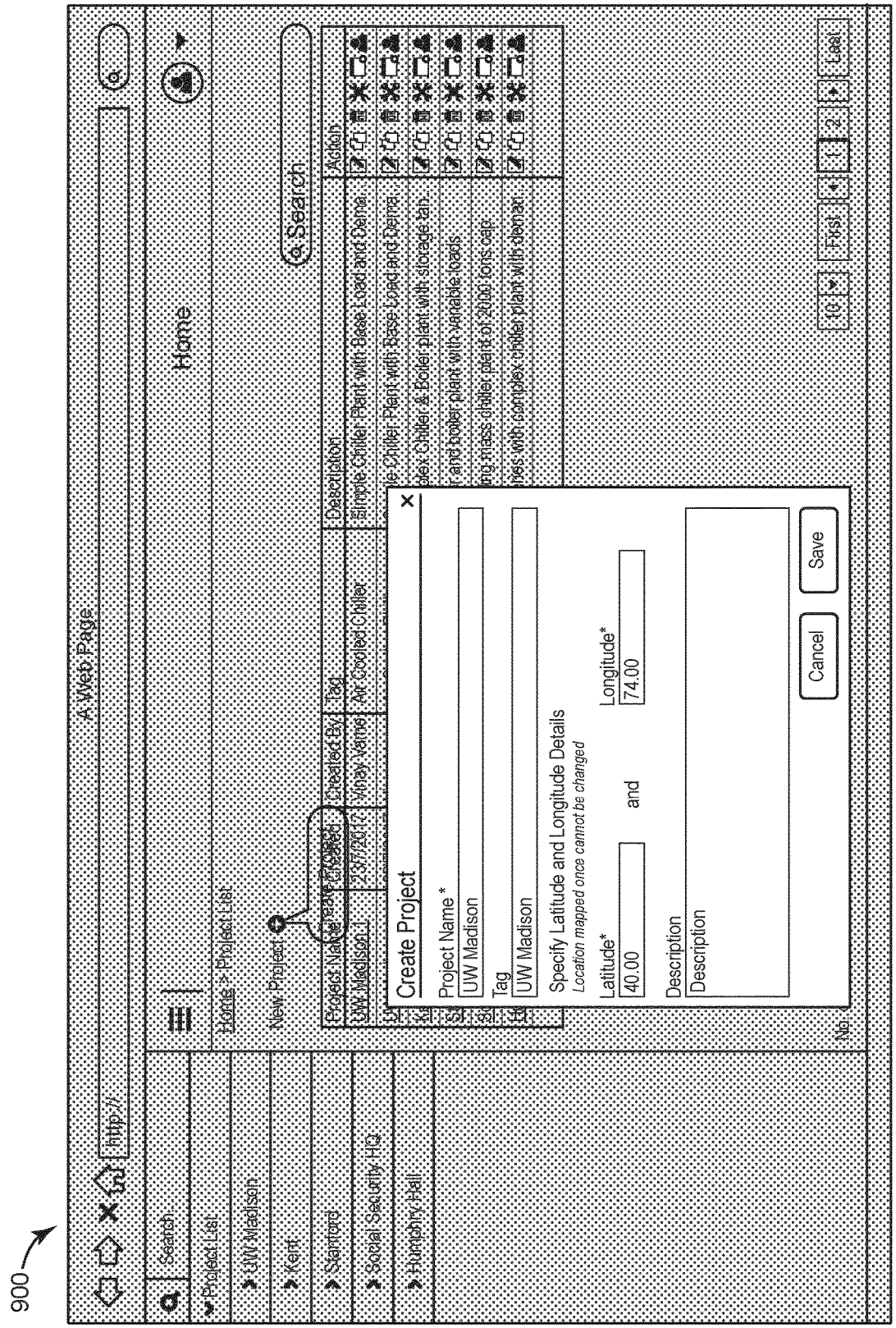
FIG. 12 is another user interface associated with the planning tool of FIG. 8, according to an exemplary embodiment.
Figure 13:
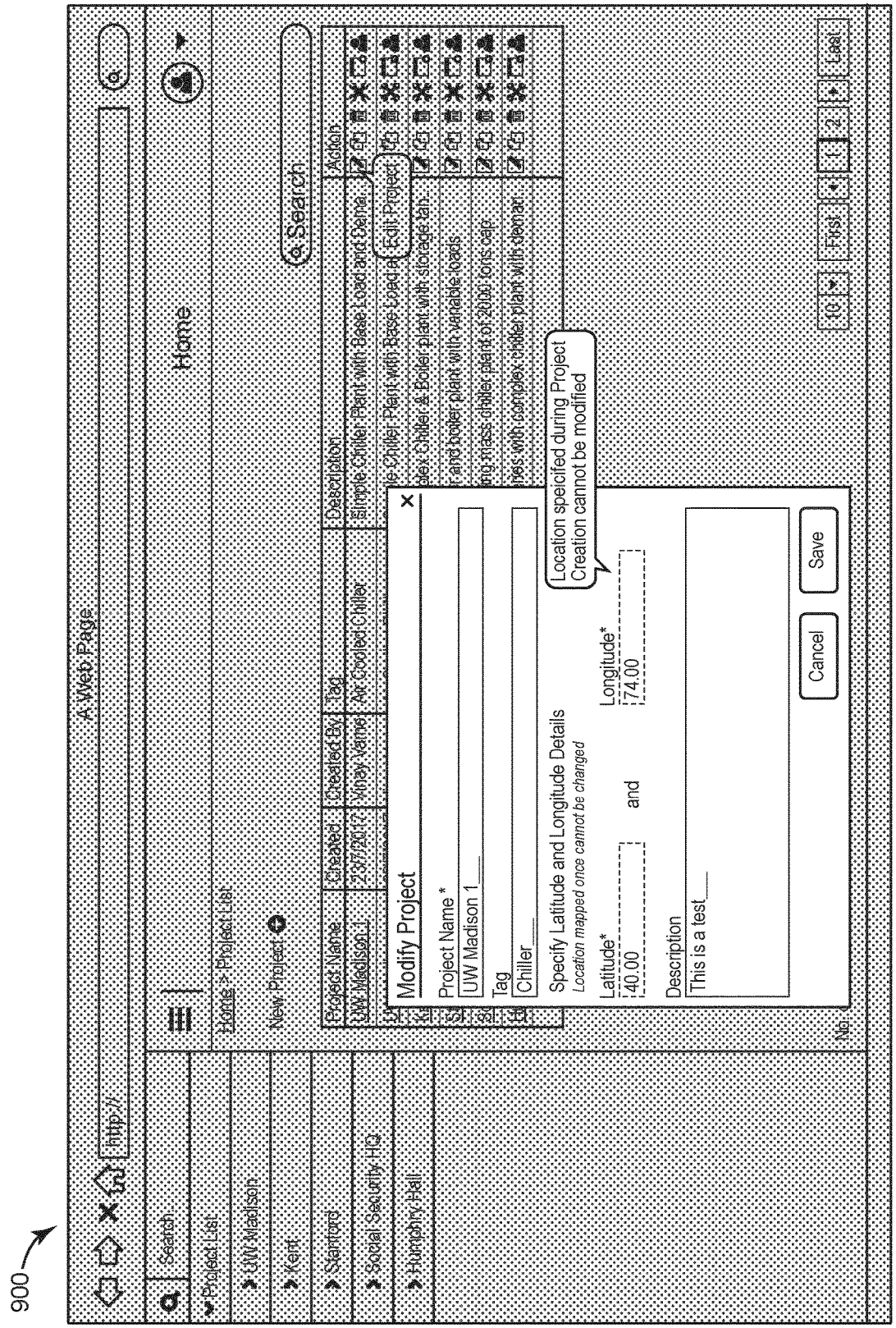
FIG. 13 is another user interface associated with the planning tool of FIG. 8, according to an exemplary embodiment.
Figure 15:
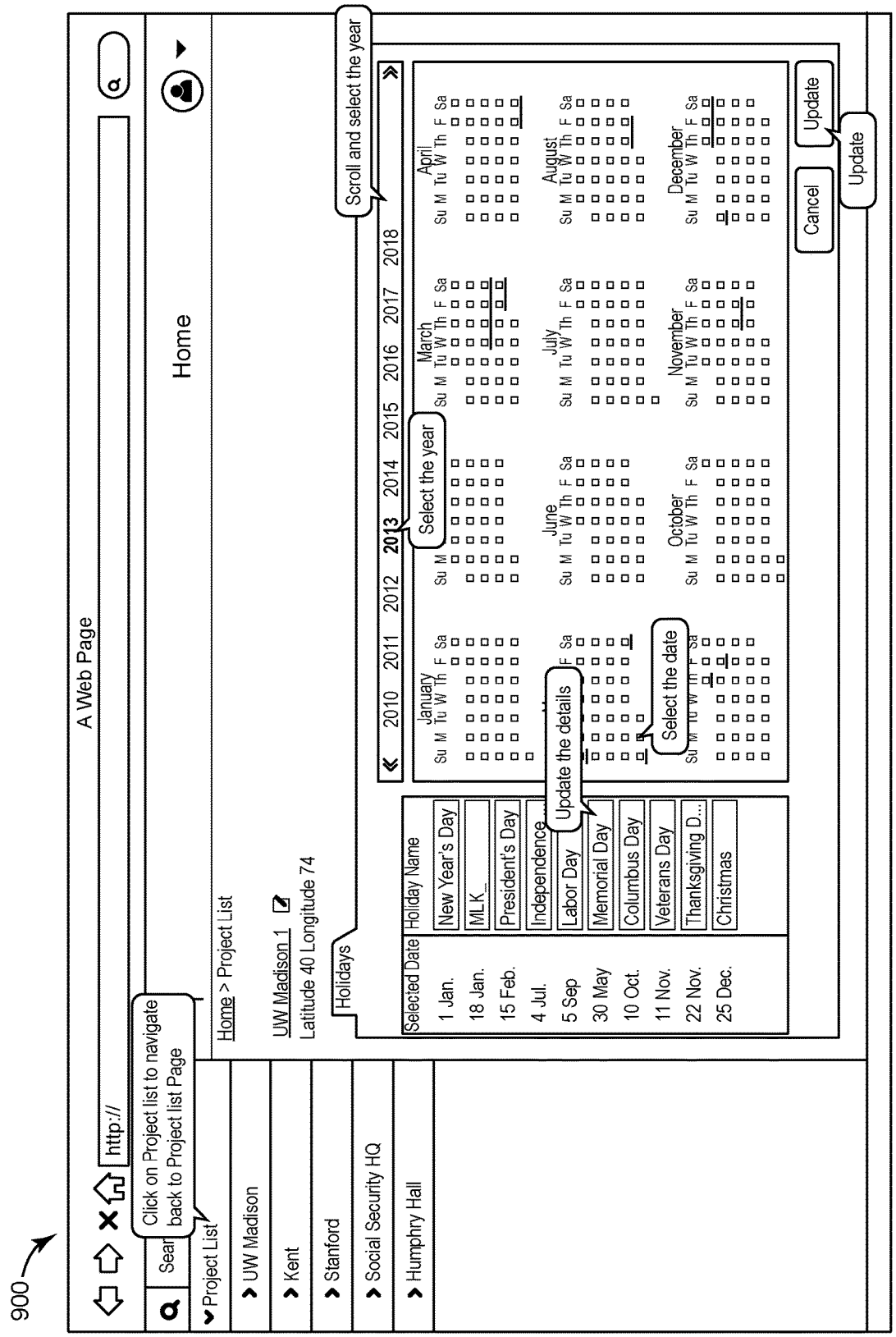
FIG. 15 is another user interface associated with the planning tool of FIG. 8, according to an exemplary embodiment.

Referring now to FIGS. 11-13, a user interface associated with planning tool 900 is shown, according to some embodiments. In some embodiments, a user can define a new project and provide location information for the project. As shown, a user can create a "new project" within planning tool 900 (step 1). Next, the user can be prompted to enter additional information corresponding to the project. As shown, for example, a user can enter a project name, a tag (step 2), a latitude and longitude (step 3), and description. In some embodiments, a user can specify a location using information other than latitude and longitude (e.g., address, facility name). Once location data has been specified for the project, a user can select "save" (step 4).

As shown by FIG. 13, a user can edit an existing project (step 1). A user can modify a project tag (step 2), and add a description. In some embodiments, a user can be prevented from modifying physical location data (e.g., latitude and longitude). Accordingly, the location data may appear grayed-out, and can prevent a user from selecting it for modification.

Figure 16:
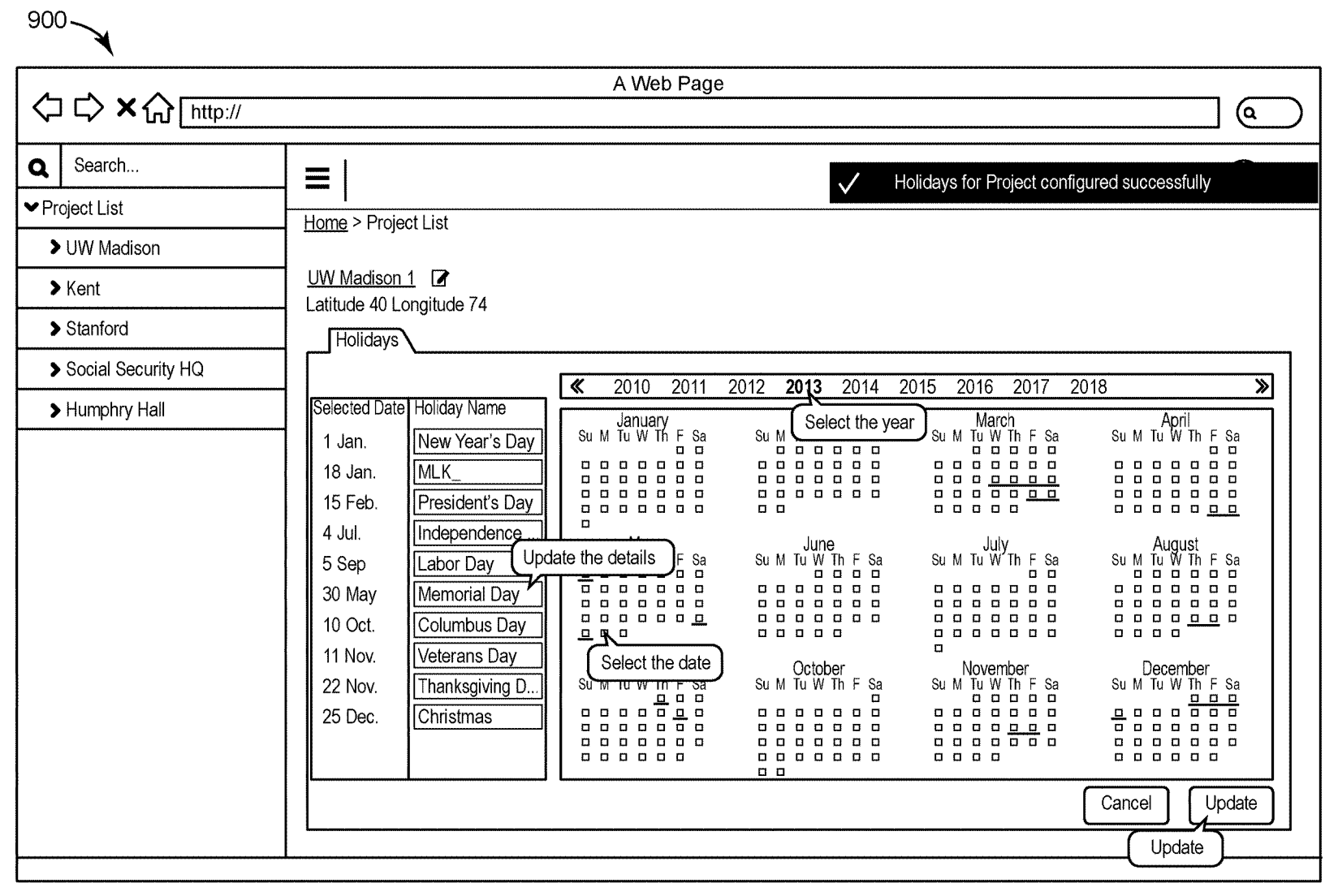

Referring now to FIGS. 14-18, a user interface associated with planning tool 900 is shown, according to some embodiments. In some embodiments, a user can define a schedule for a created project. As shown, a user can select an option to configure holidays (step 1). The schedule being configured can refer to the location specified in the creation of the project (as described above). The user can be redirected to a calendar view corresponding to the selected project (see FIG. 15). In some embodiments, a user can scroll to a desired year, and click the year to confirm. Next, a user can select a date (step 2) for a desired "holiday." Once a user has selected a date, they are able to update the details for that date (step 3). As shown, for example, the user is defining Jan. 18, 2013 as "MLK_." In some embodiments, the calendar view can highlight entered holidays via color, underline, or another method. Once the user has selected and named each desired holiday for the project, then can select "update" to have their holiday preferences saved (step 4). As shown in FIG. 16, a user can receive confirmation that their holiday preferences have been configured successfully (step 5).

Figure 17:
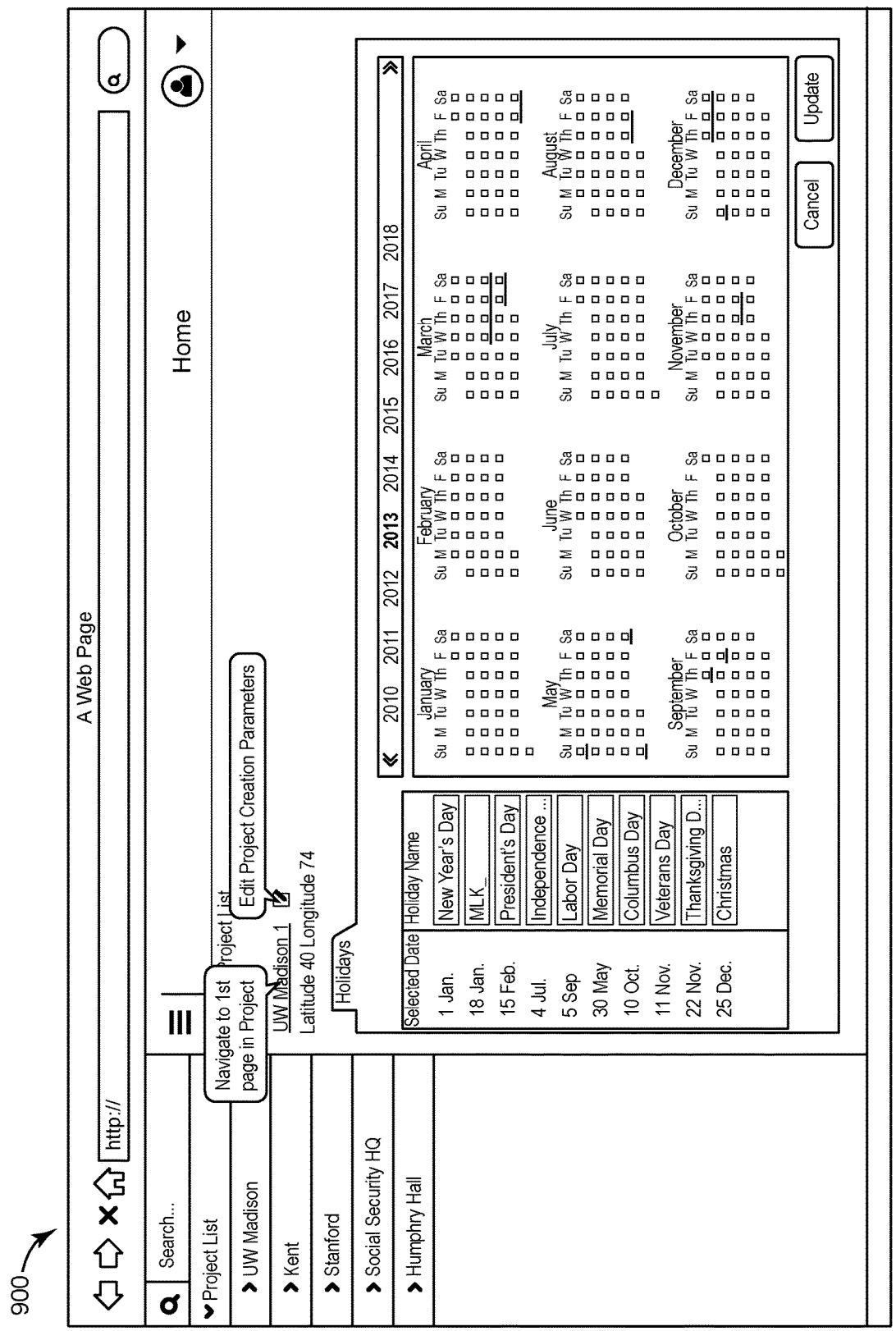
FIG. 17 is another user interface associated with the planning tool of FIG. 8, according to an exemplary embodiment.
Figure 18:
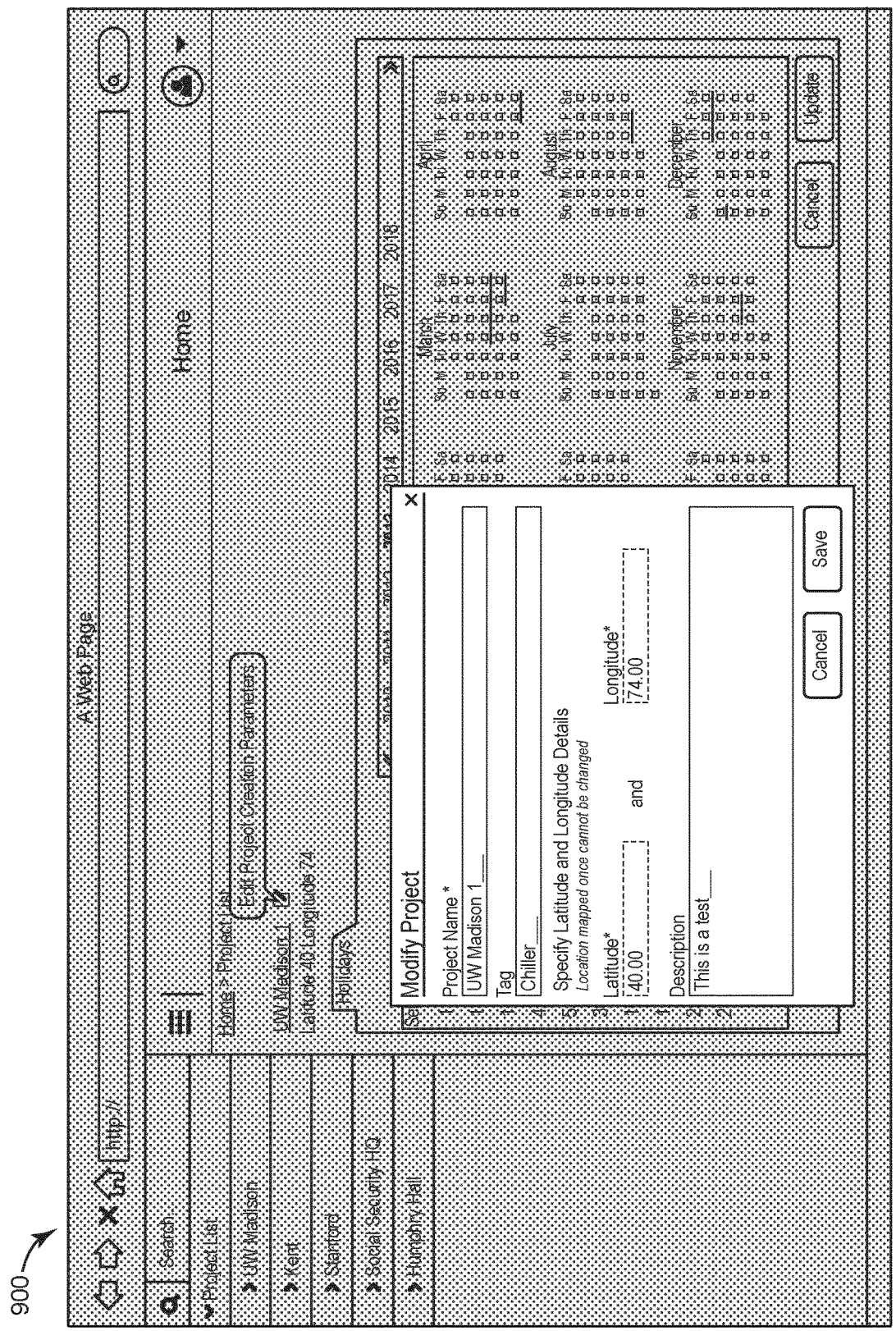
FIG. 18 is another user interface associated with the planning tool of FIG. 8, according to an exemplary embodiment.

As shown by FIG. 17, the calendar view can include further selectable options. As one example, a user can select the project name, which can redirect the window to a first page of the project. Further, a user can select the option to edit project creation parameters. FIG. 18 provides an example view corresponding to a selection to edit the project creation parameters. As shown, the user can modify the project tag (step 2) and/or the description. As previously described, a user may be prevented from modifying the project location. Once the user has modified any desired parameters, they can select "save" (step 3) to have the modifications applied to the project.

Figure 19:
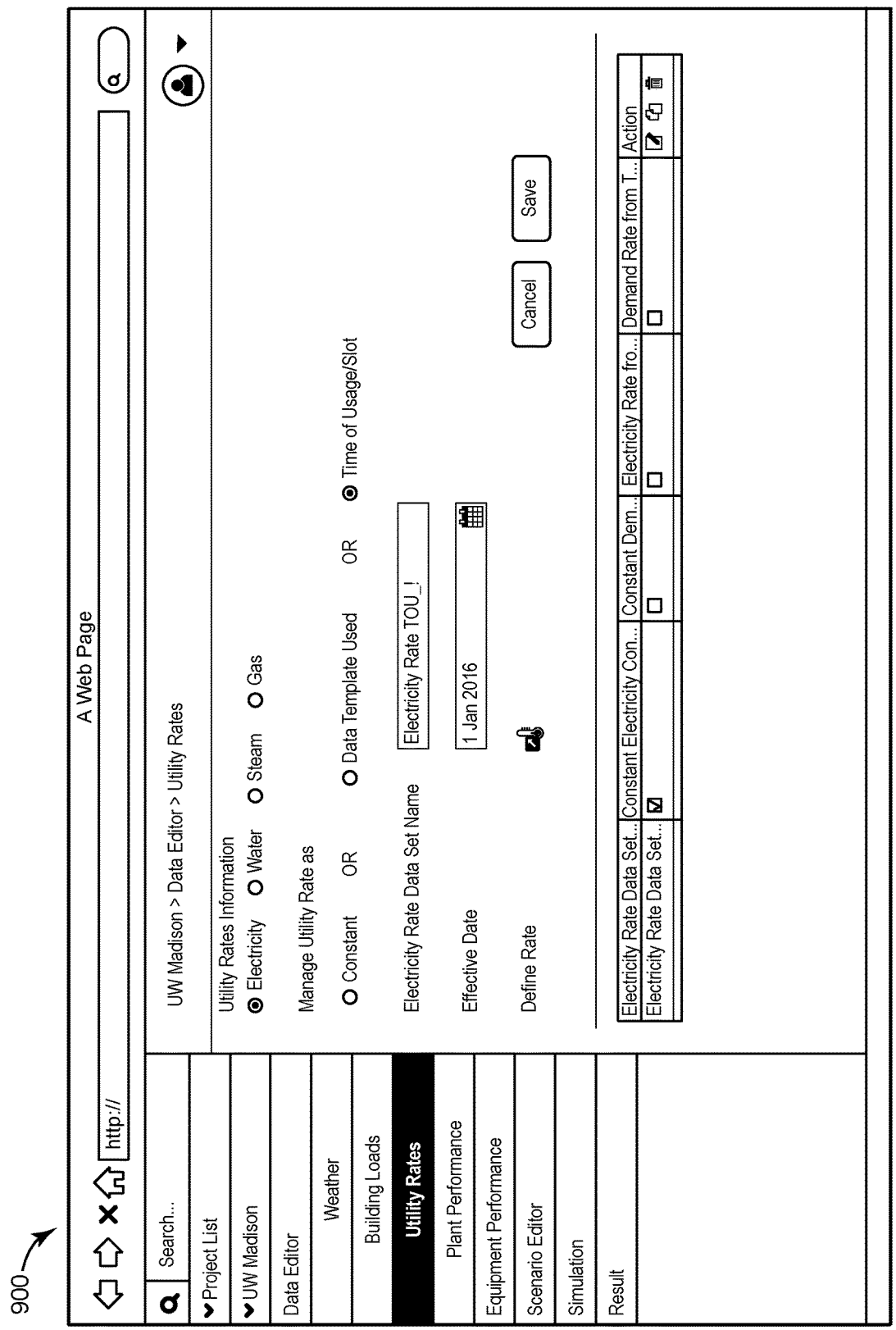
FIG. 19 is another user interface associated with the planning tool of FIG. 8, according to an exemplary embodiment.

Referring now to FIGS. 19-41, a user interface associated with planning tool 900 is shown, according to some embodiments. In some embodiments, a user can provide parameters to planning tool 900 to determine corresponding utility consumption data. FIG. 19 illustrates how a user can manage utility rates via time of usage (time slot). As shown, a user can select a utility type (electricity, water, steam, gas, etc.) in the data editor window. Next, a user can select the "time of usage/slot" option to view custom date ranges (step 1). A user can also enter a name corresponding to the data set (step 2). In some embodiments, a user can select an effective date corresponding to the start of the data set (step 3). Further, a user can define a utility rate for the time frame (step 4). FIGS. 20-41 depict how a user can create a data set via planning tool 900. Further, FIGS. 20-41 depict how planning tool 900 can provide an indication to the user of complete and/or incomplete months within the time frame.

Figure 20:
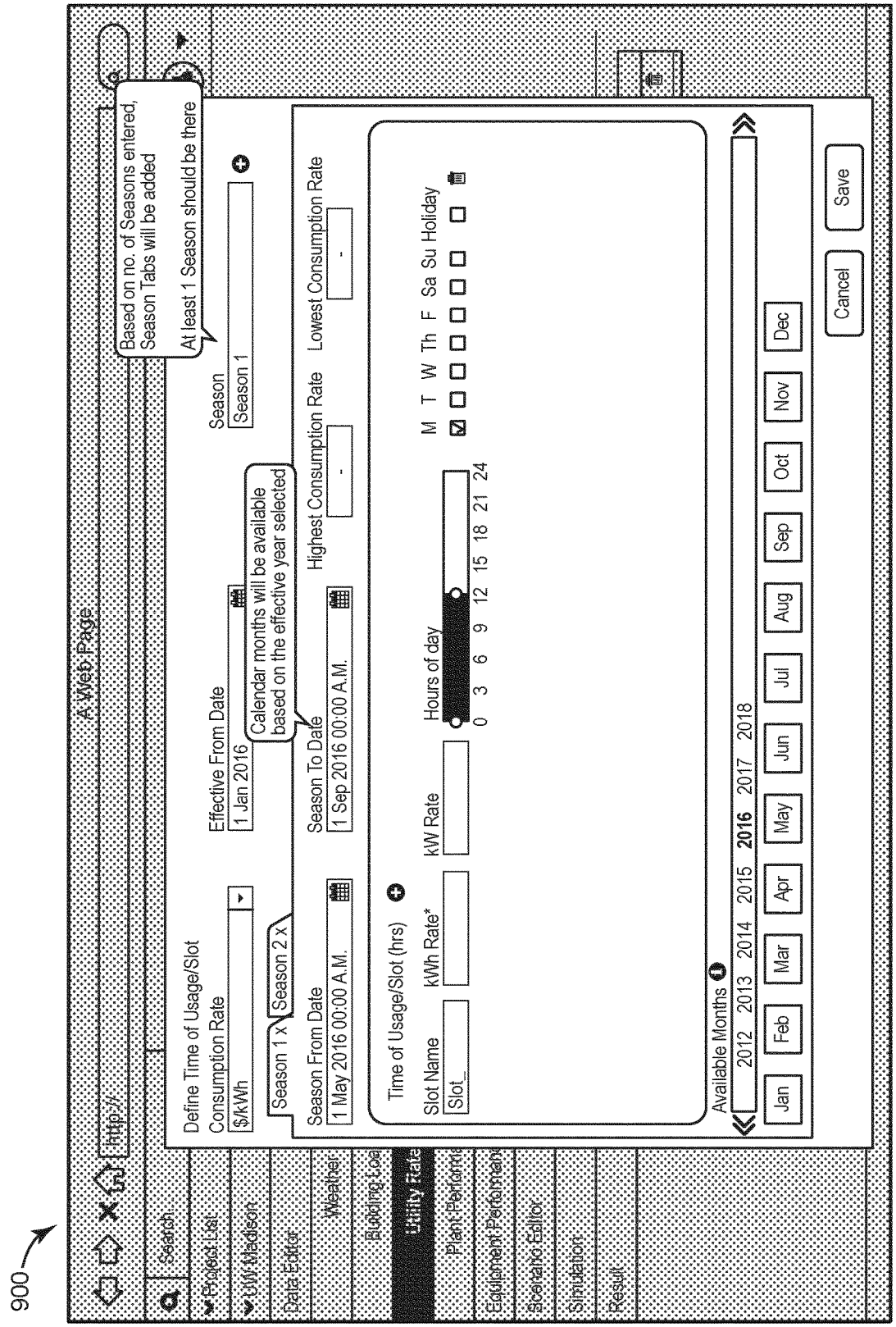
FIG. 20 is another user interface associated with the planning tool of FIG. 8, according to an exemplary embodiment.

FIG. 20 depicts a window within planning tool 900 that corresponds to defining the time of usage/slot. This window can be provided to the user once they have specified the utility rate information in the data editor (see, e.g., FIG. 19). As shown, since the user has selected electricity as the utility, the consumption rate is displayed as $/kWh. The consumption rate can be different depending upon the selected utility. The effective date selected on the previous screen (see FIG. 19), can define the limits for the season (e.g., the start and end dates, steps 6 and 7). A user can further specify which days to include (step 8). In some embodiments, a user can add additional seasons, which can result in additional season tabs (step 5). As shown, "Available Months" can be displayed via planning tool 900. Months with complete data sets can be displayed differently than months with incomplete data sets (e.g., via color).

Figure 21:
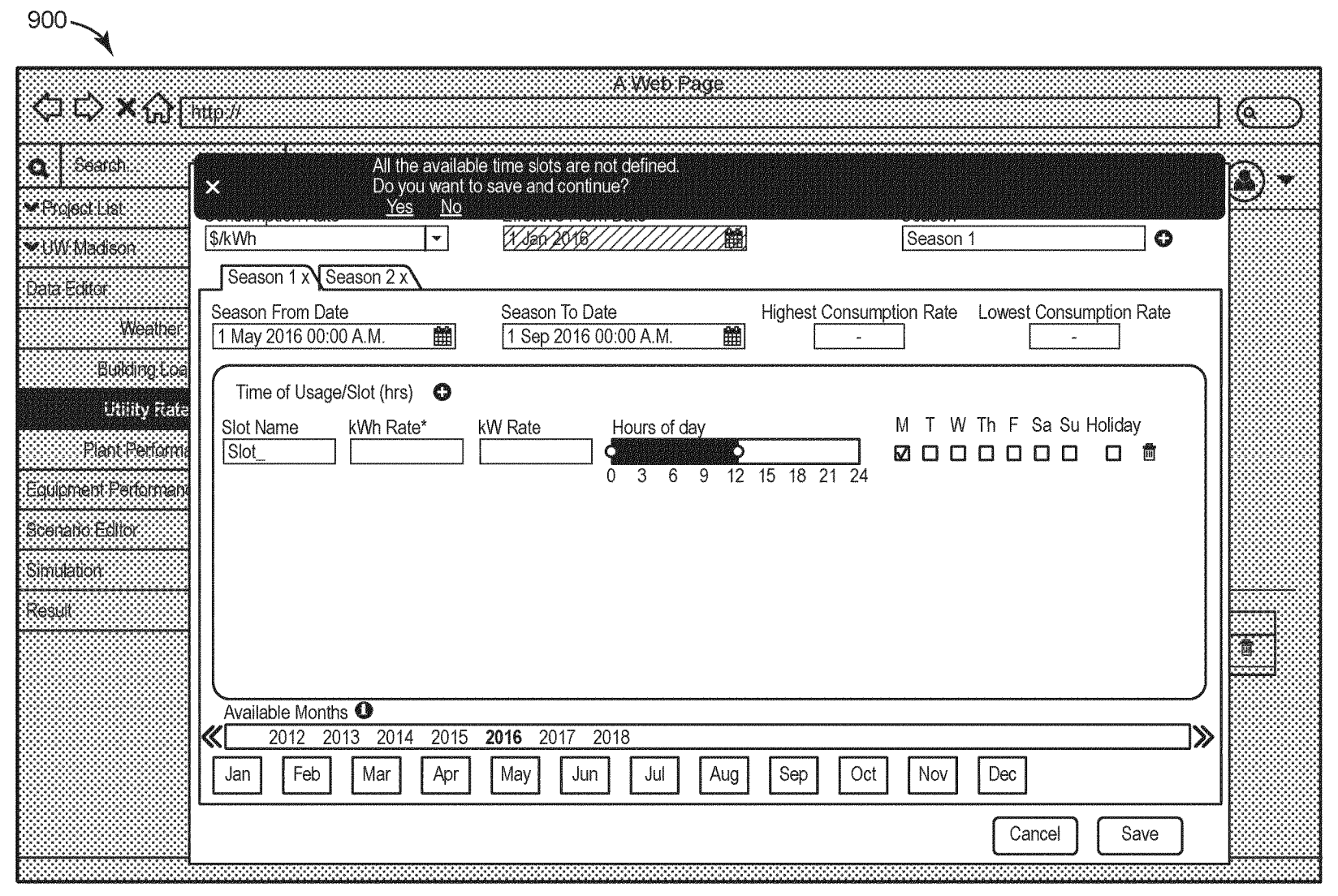
Figure 22:
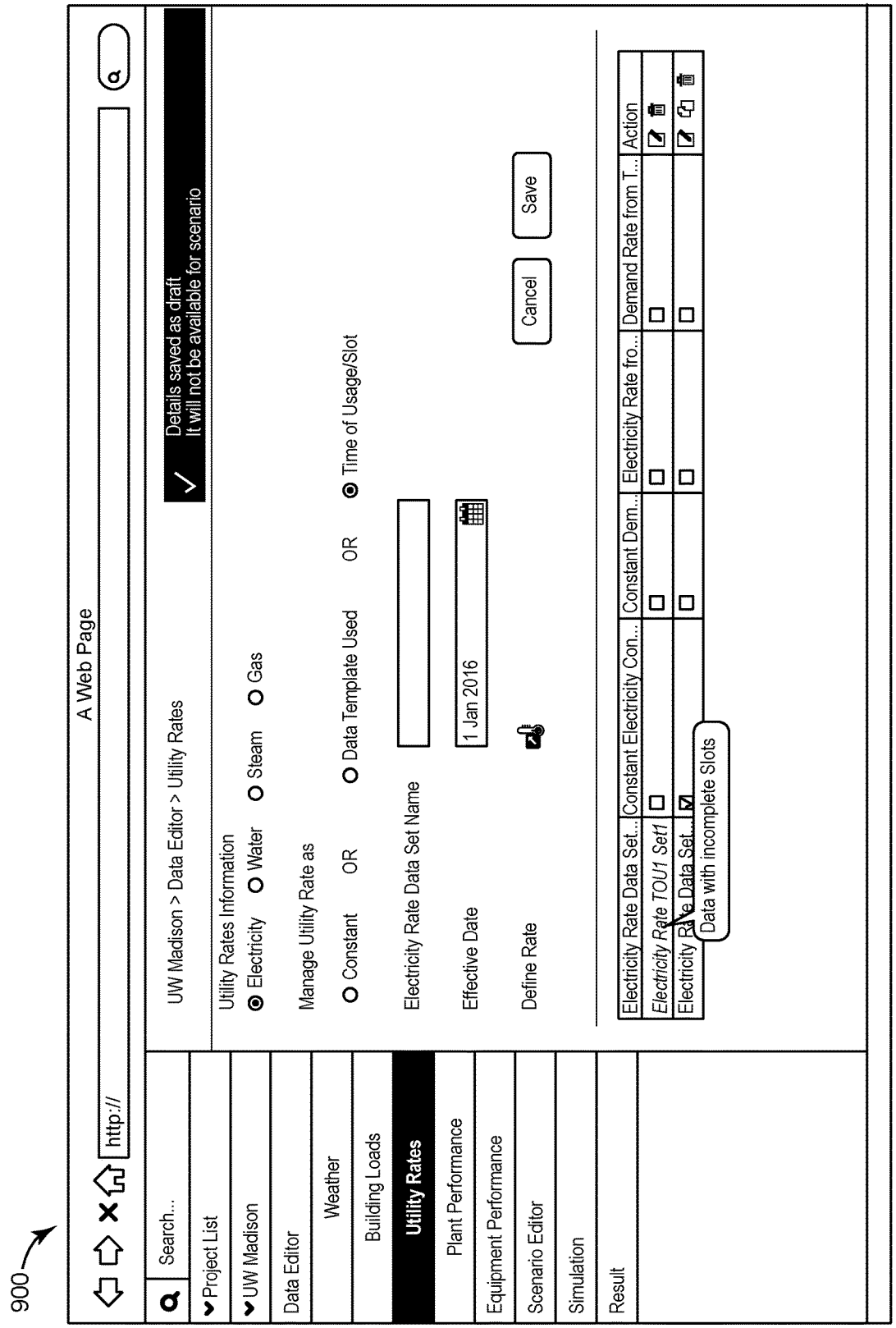
FIG. 22 is another user interface associated with the planning tool of FIG. 8, according to an exemplary embodiment.

As shown by FIG. 21, a user can be alerted when all available time slots have not been defined (step 10). For example, the user has only defined rates for hours 0 to 14 on Mondays. Planning tool 900 can alert the user, and provide the option to continue defining available time slots. Once the user has defined the desired time slots, they can save their settings (step 9). FIG. 22 shows the incomplete data set in red text (step 12), to further alert the user. In some embodiments, the time slot configurations can be saved as a draft (step 11) when the user has failed to define all necessary time slots.

Figure 23:
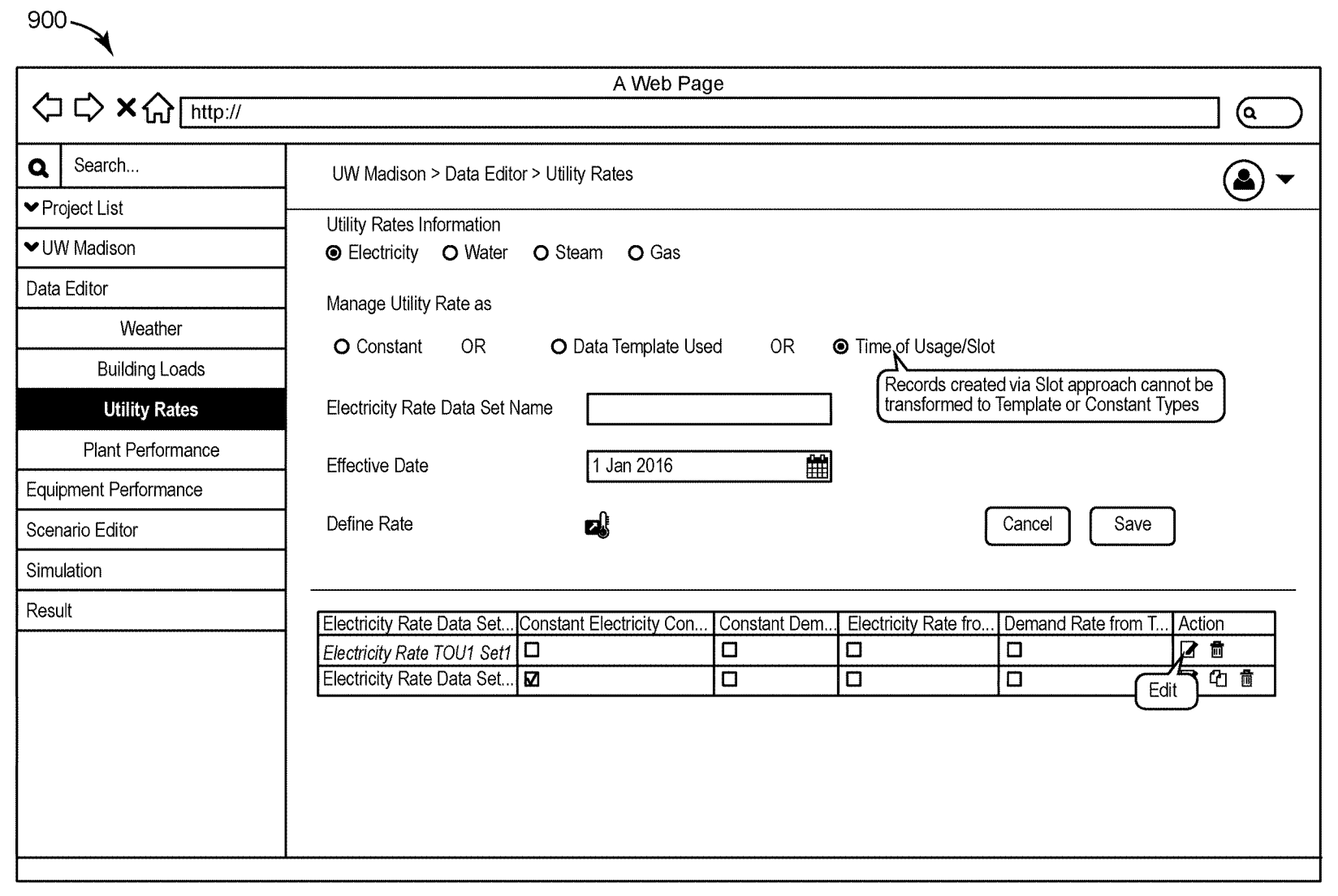
Figure 24:
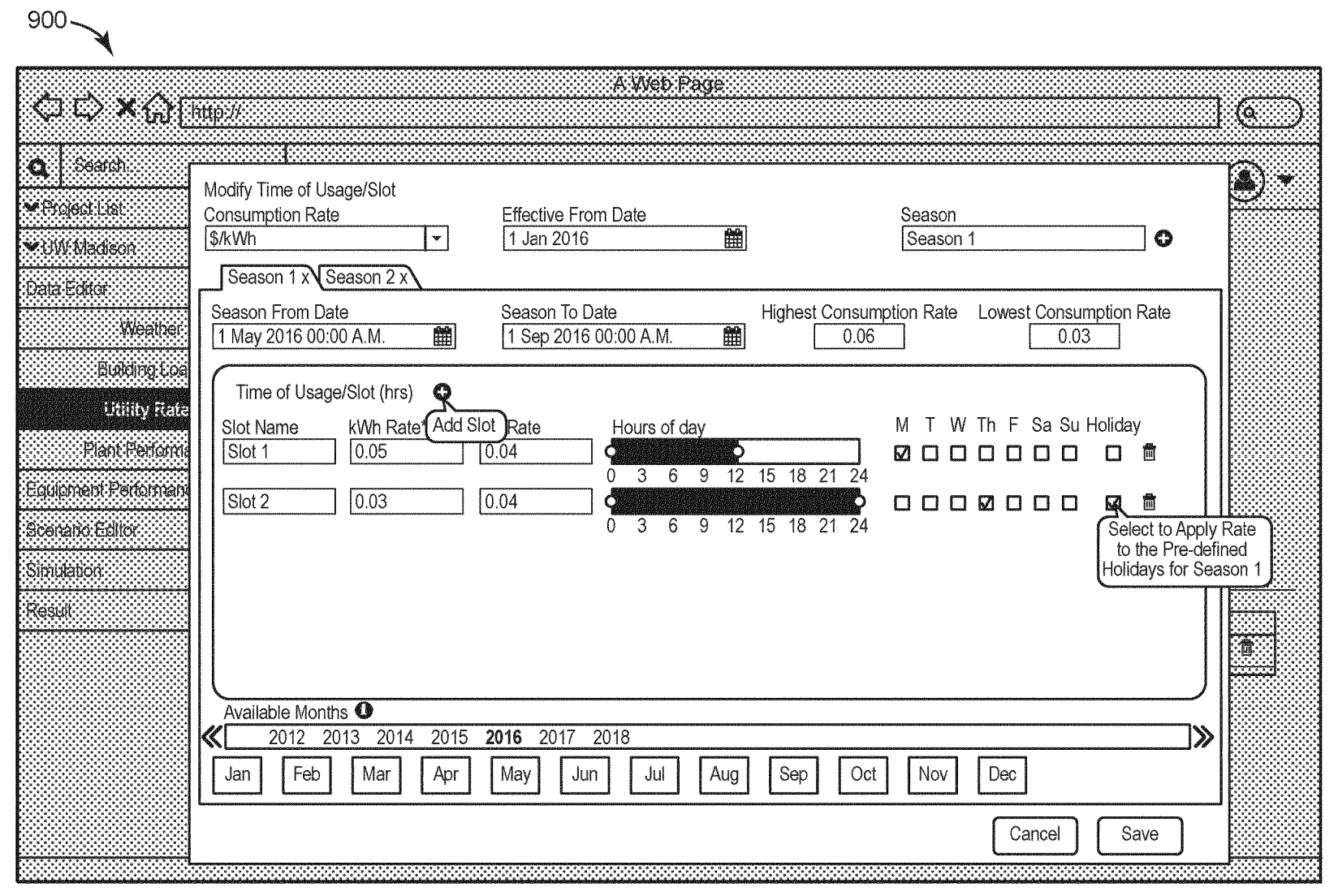

As shown by FIG. 23, a user can edit an incomplete data set by selecting the edit option (step 1). In some embodiments, once a user has created time slots within the data set, they can be prevented from changing the data input type. As shown, the "constant" and "data template upload" options are grayed out. FIG. 24 illustrates how a user can modify an existing data set (step 3). In some embodiments, a user can add additional slots (step 4). Each slot can have a different rate, if desired. As shown, a user can select "holiday" (step 5) if they would like the pre-defined holiday rates applied to any holidays within the time frame. Here, any holiday falling on a Thursday from May 1, 2016 to Sep. 1, 2016 can have the pre-defined holiday rate automatically applied to the range of hours. Once the user has finished adding slots, they can select "save" (step 6).

Figure 25:
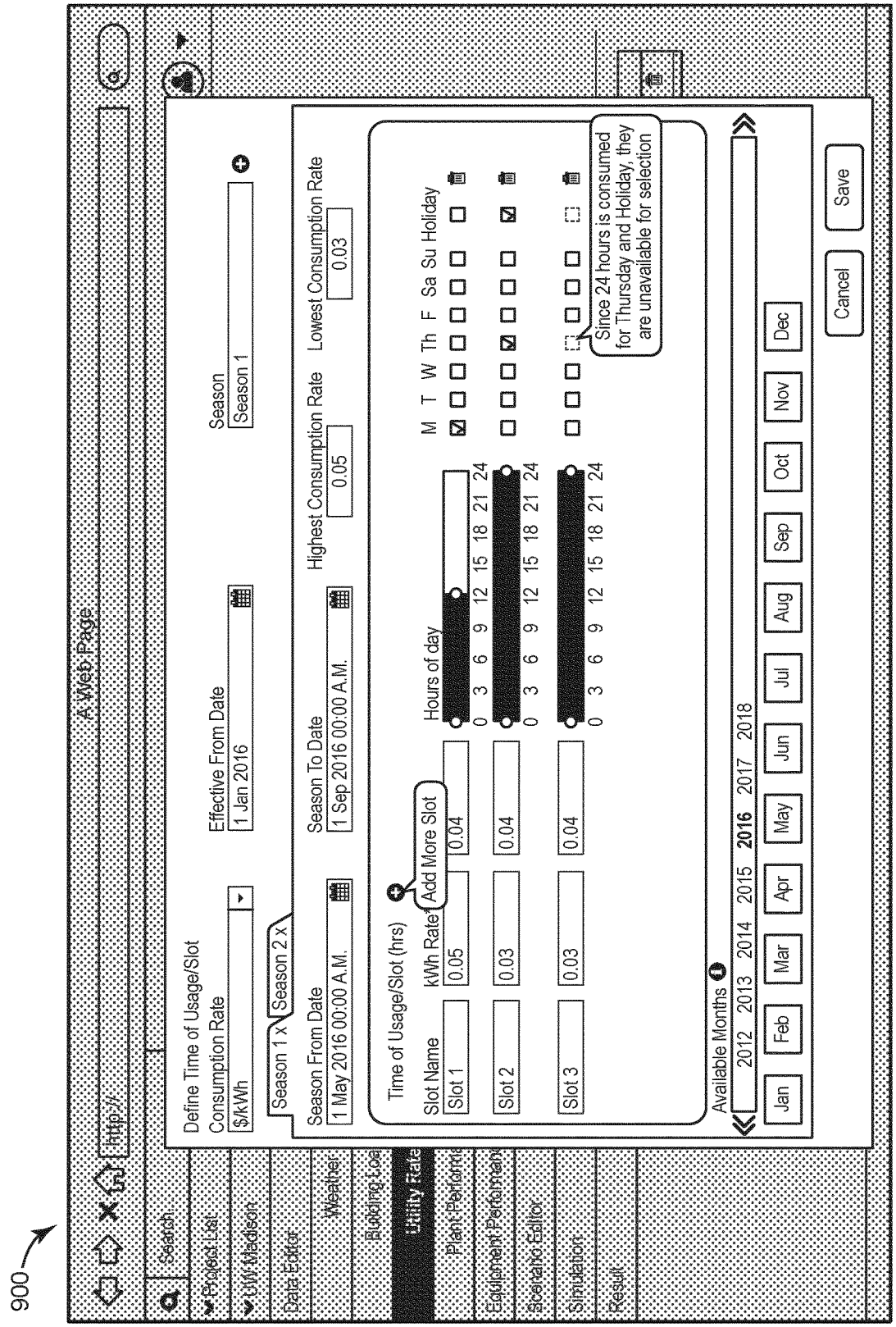
FIG. 25 is another user interface associated with the planning tool of FIG. 8, according to an exemplary embodiment.
Figure 33:
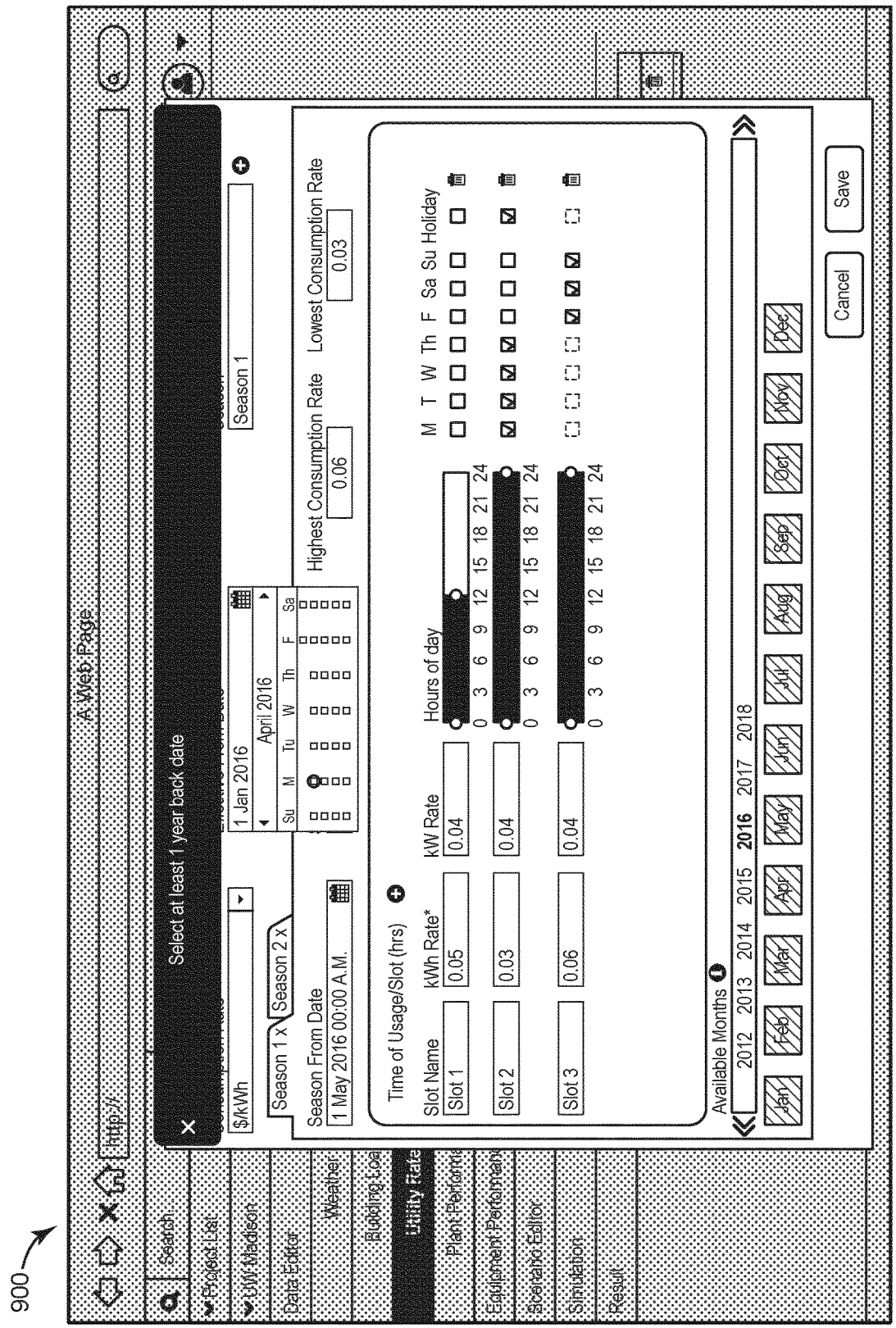
FIG. 33 is another user interface associated with the planning tool of FIG. 8, according to an exemplary embodiment.

As shown by FIG. 25, a user can continue to add slots (step 4). As each hour is configured and accounted for, it can become unavailable for selection in subsequent slots. For example, slot 3 is shown to include 24 hours. Since the user has previously defined a rate for 24 hours on Thursdays and Holidays, these options are no longer selectable for slot 3. Consequently, a single hour cannot be defined with two different rates. Using planning tool 900, a user can easily identify what time slots still may need data.

Figure 26:
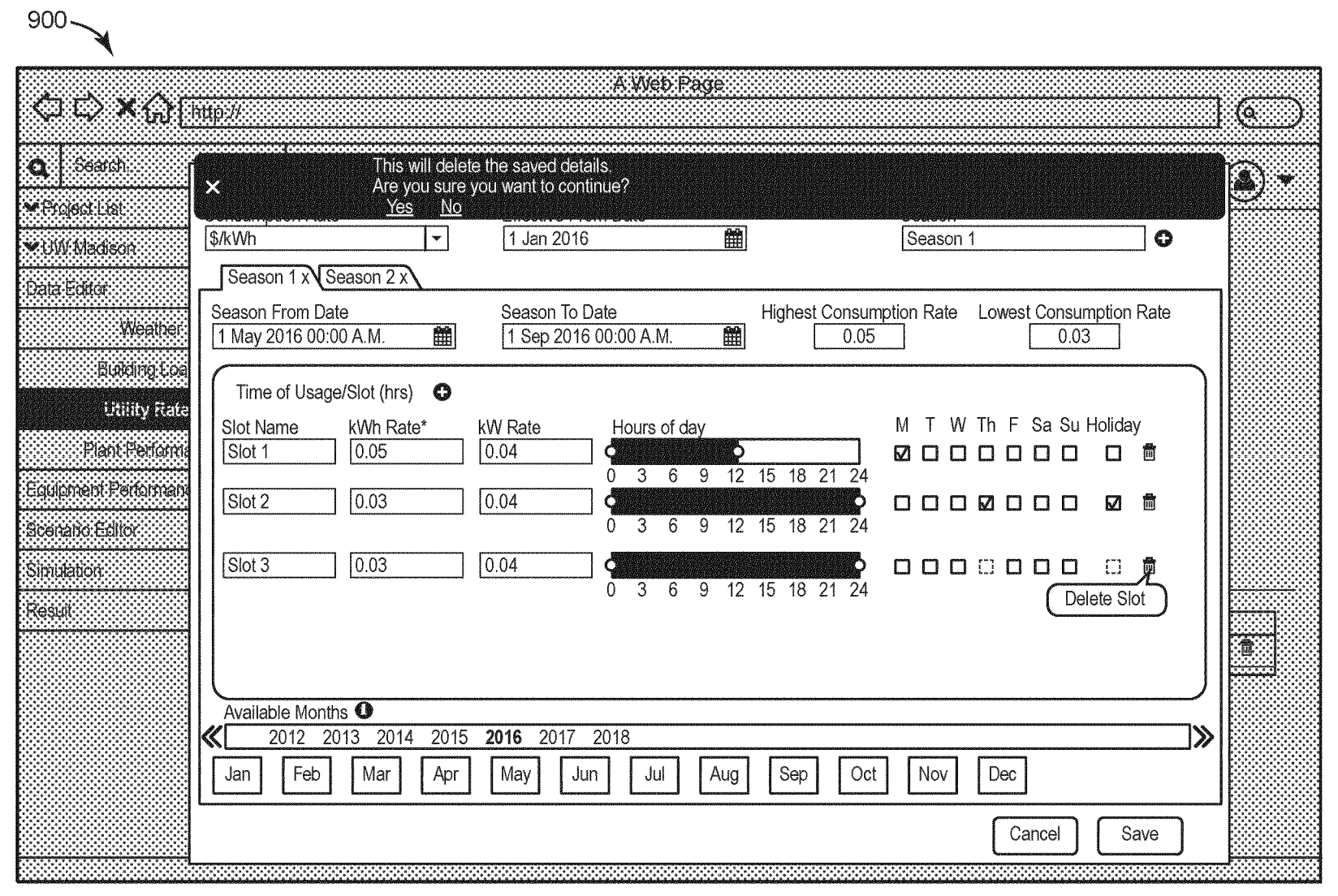
Figure 27:
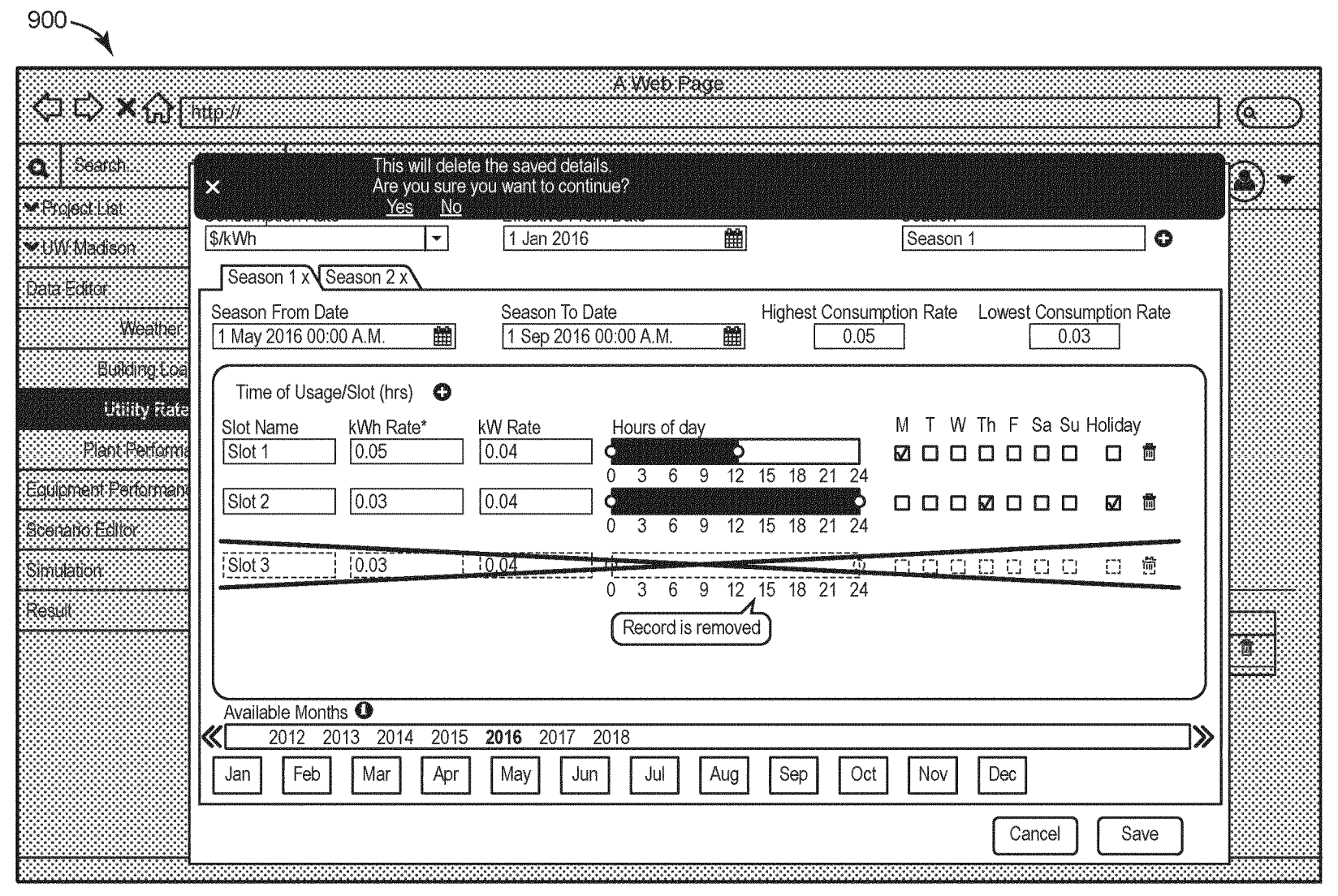

As shown by FIG. 26, a user can select a delete option if they would like to delete an existing slot (step 6). In some embodiments, when the user selects delete, an alert appears and asks the user to confirm the deletion (step 7). If the user confirms the deletion, the corresponding slot can be removed from the record (see FIG. 27).

Figure 28:
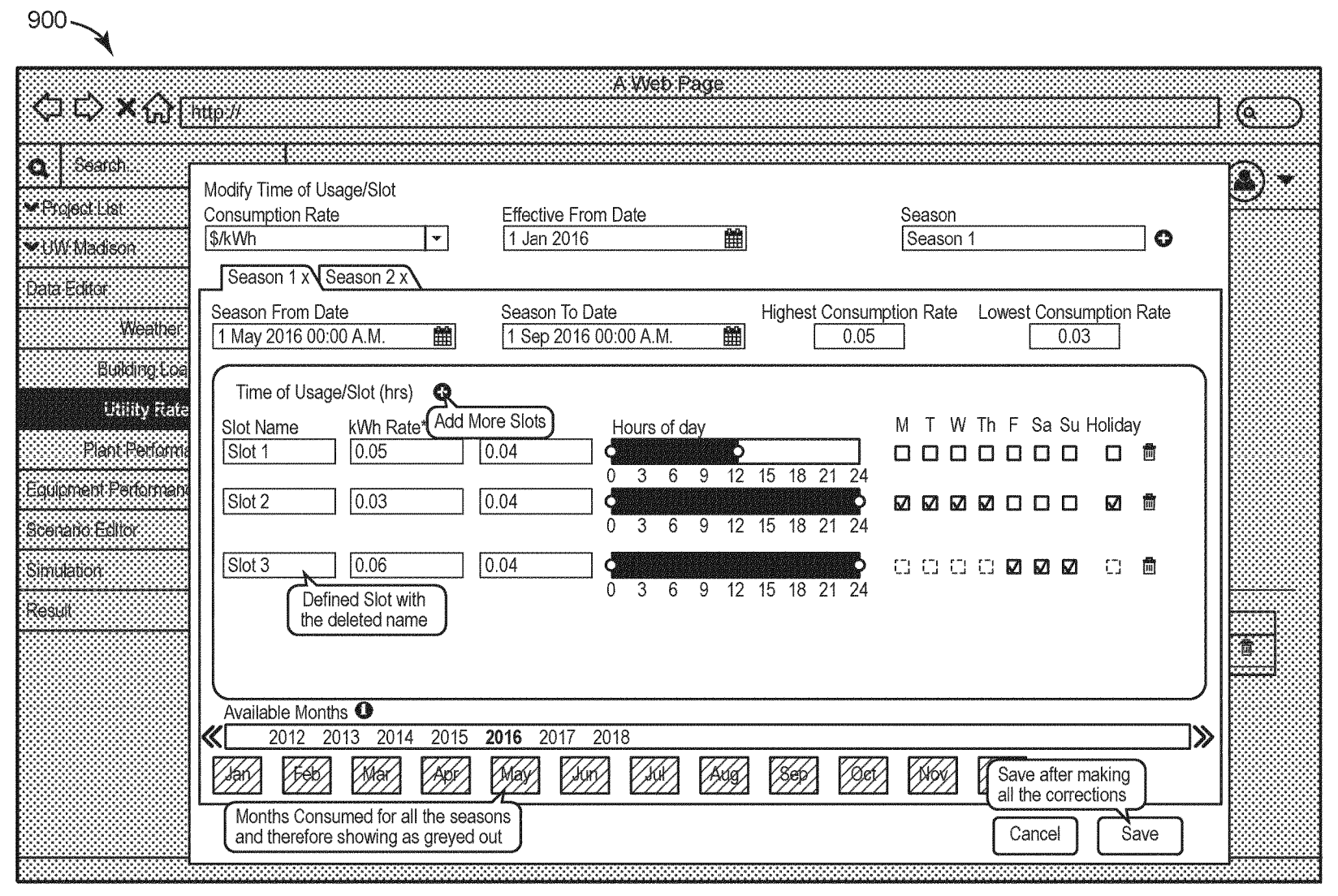
Figure 29:
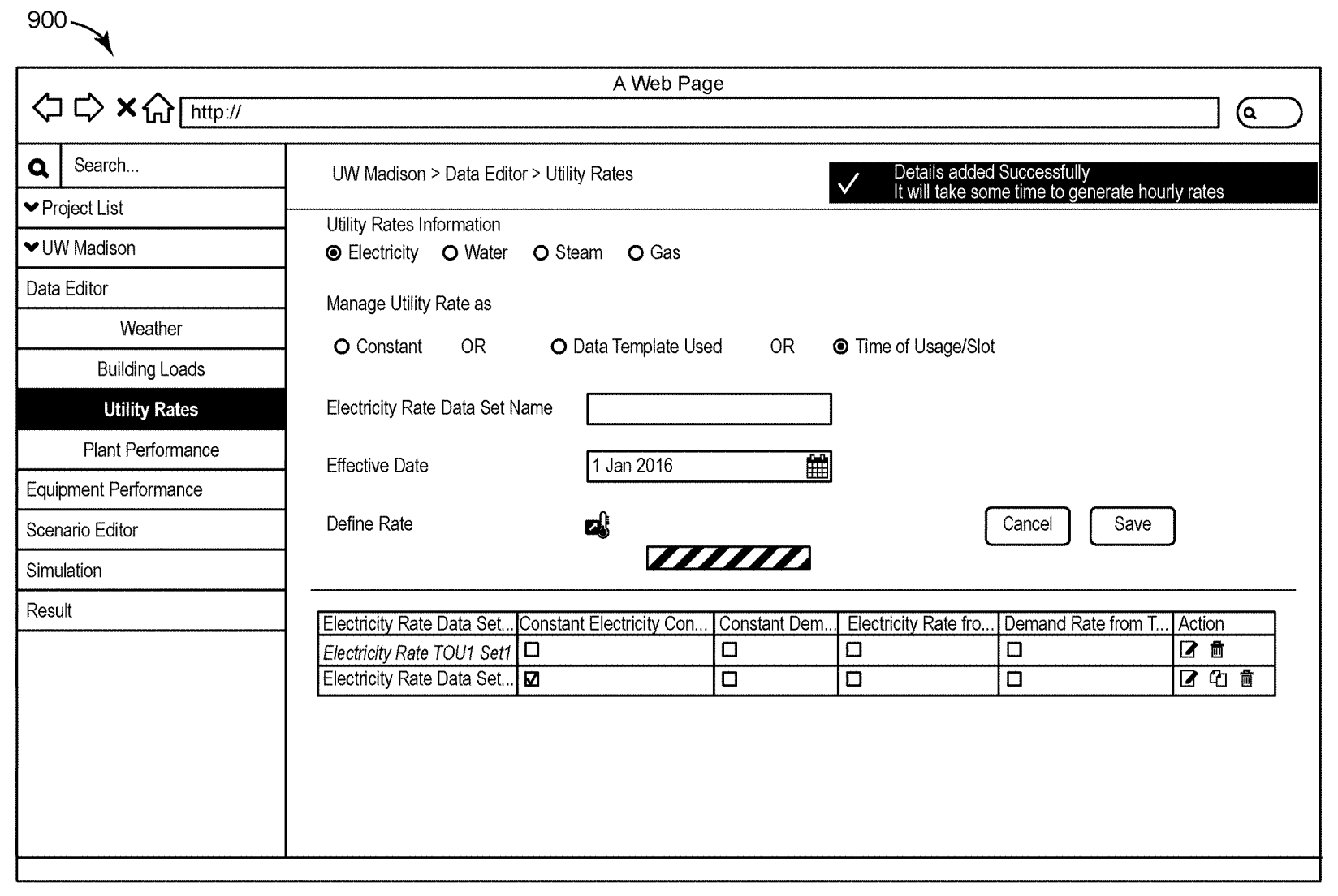

As shown by FIG. 28, a user can add back a previously deleted slot, if desired (step 2). Once the user has defined the total hours for a month, the month can be greyed out in the "available months" section. As shown by FIG. 28, the user has defined each hour for each day of the week via slot 2 and slot 3. Accordingly, all the months can appear grayed out within planning tool 900. Once a user saves the time slots, a confirmation can appear (see FIG. 29). Further, a progress bar can appear (step 4) while the hourly rate information is generated.

Figure 30:
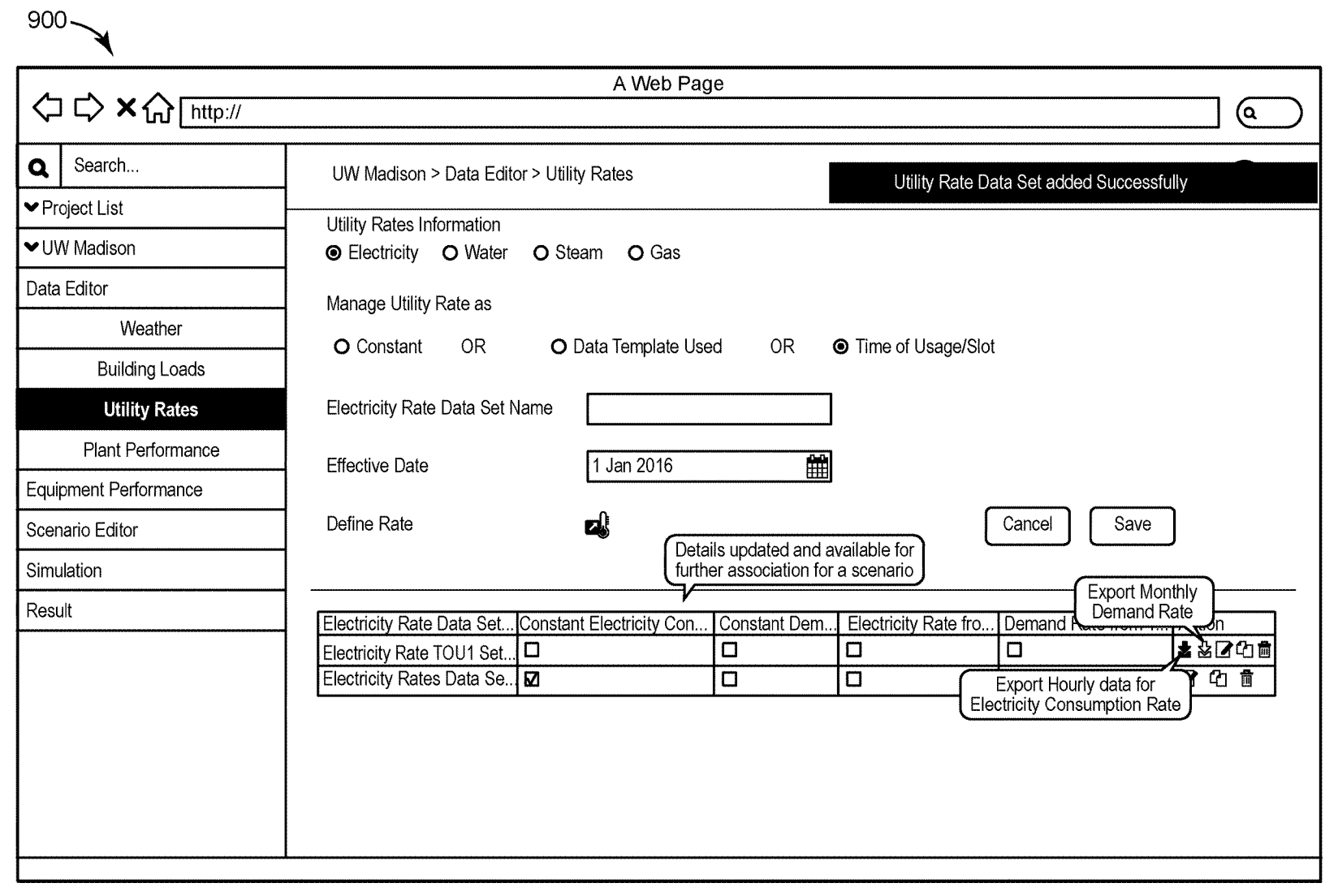
Figure 31:
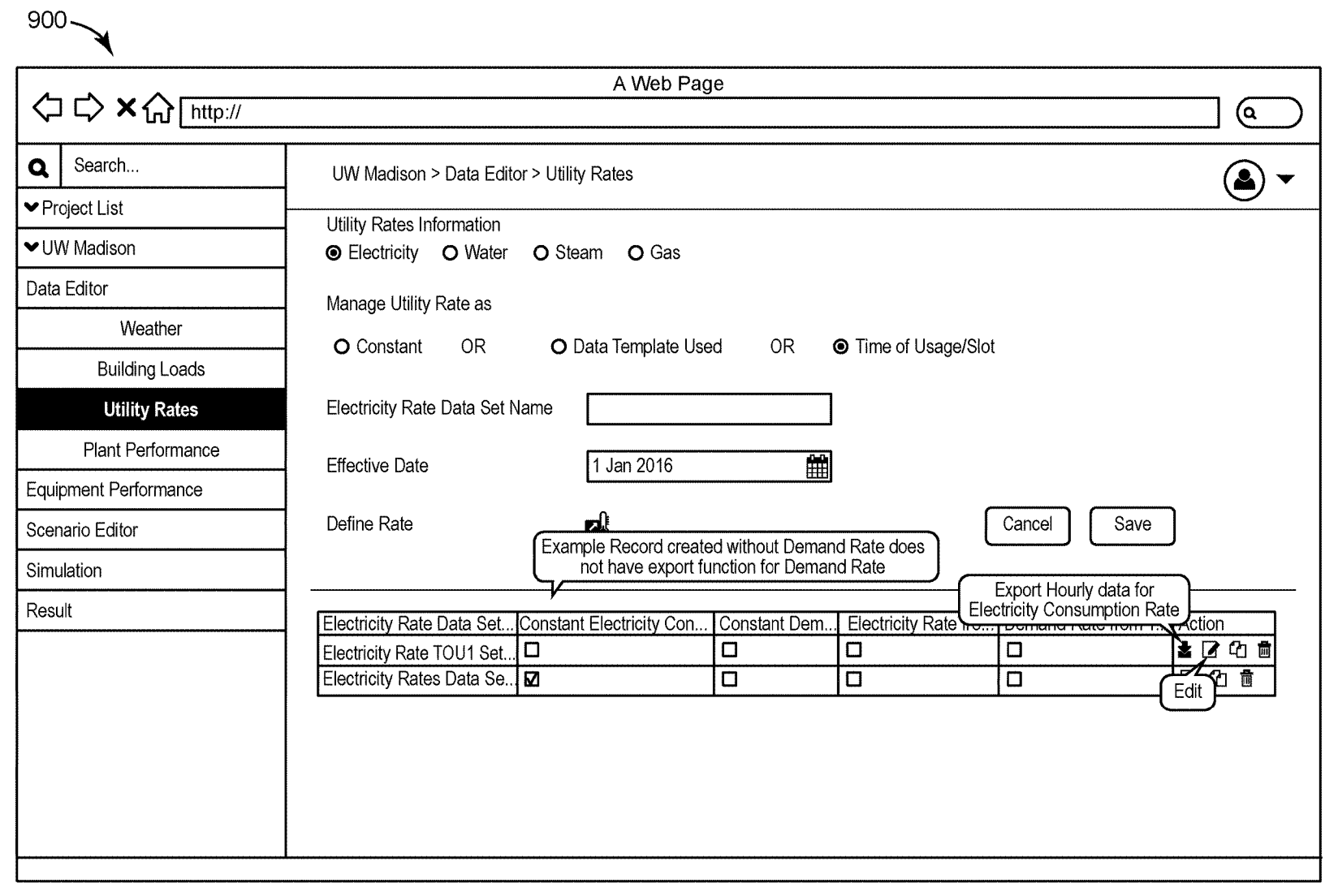

As shown by FIG. 30, a user can export monthly demand rate data and/or hourly data for the specified utility once the data set is successfully added (step 5). Additionally, FIG. 31 illustrates that, in some embodiments, only existing data can be exported from planning tool 900.

Figure 32:
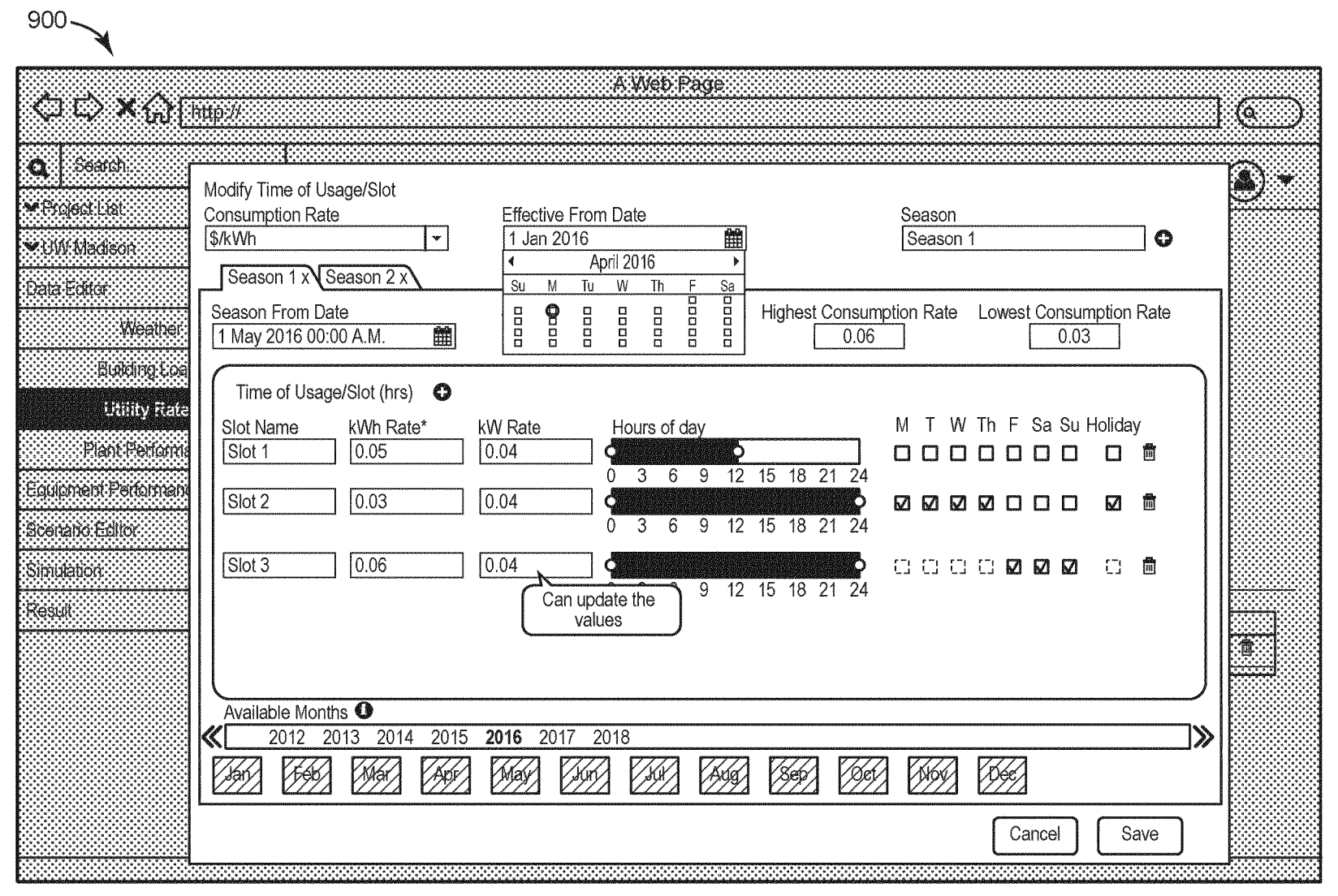
Figure 34:
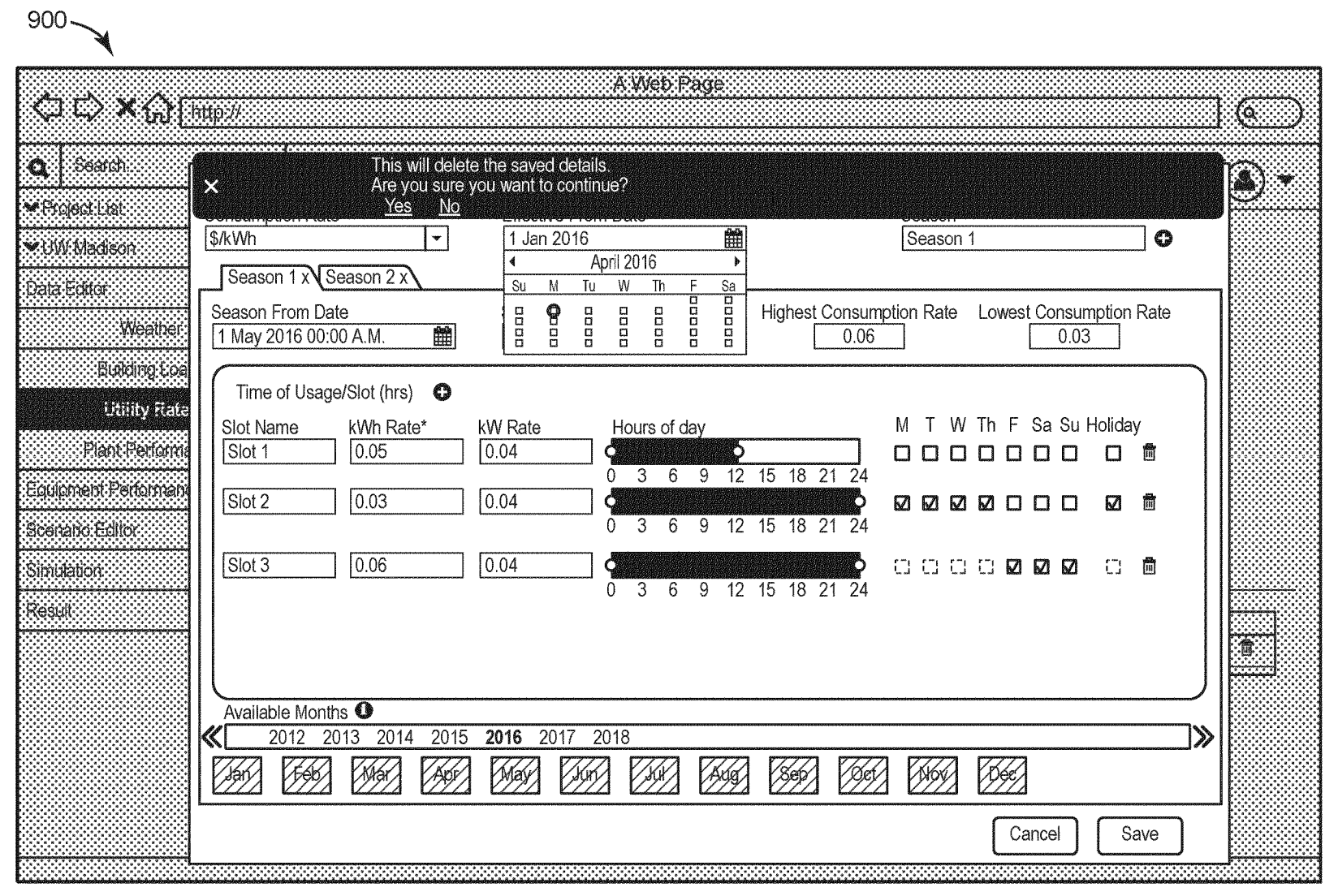
Figure 35:
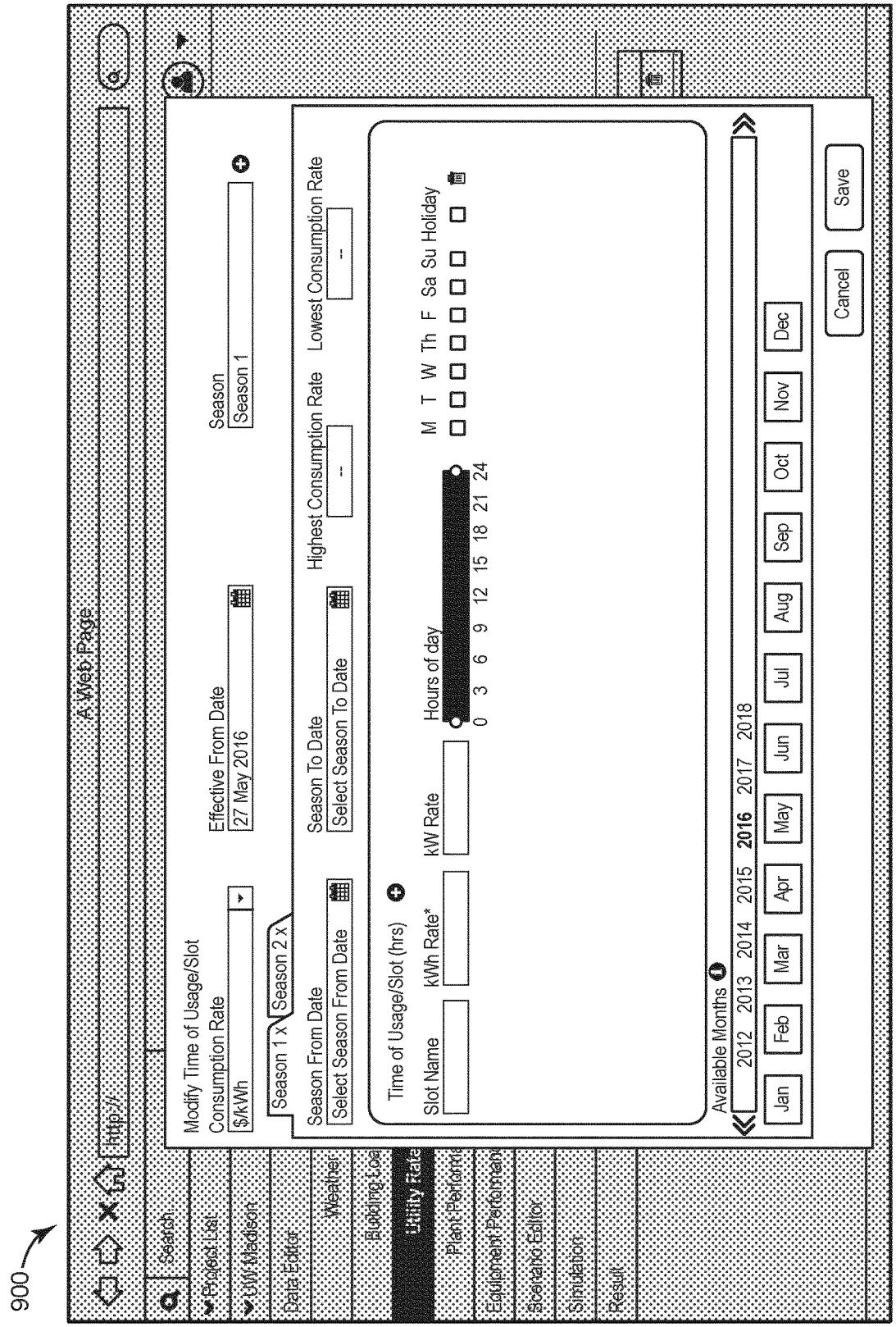
FIG. 35 is another user interface associated with the planning tool of FIG. 8, according to an exemplary embodiment.
Figure 36:
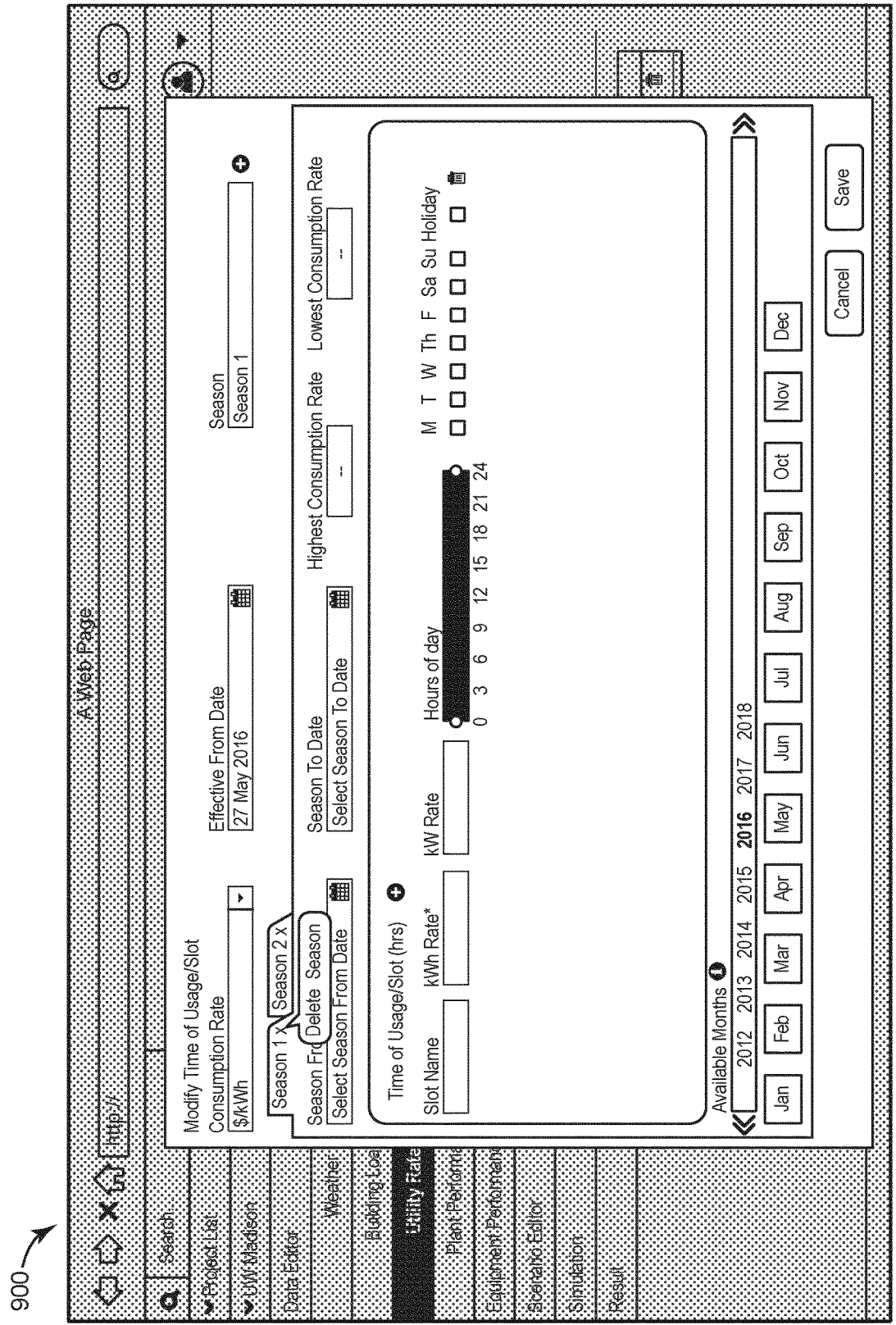
FIG. 36 is another user interface associated with the planning tool of FIG. 8, according to an exemplary embodiment.
Figure 37:
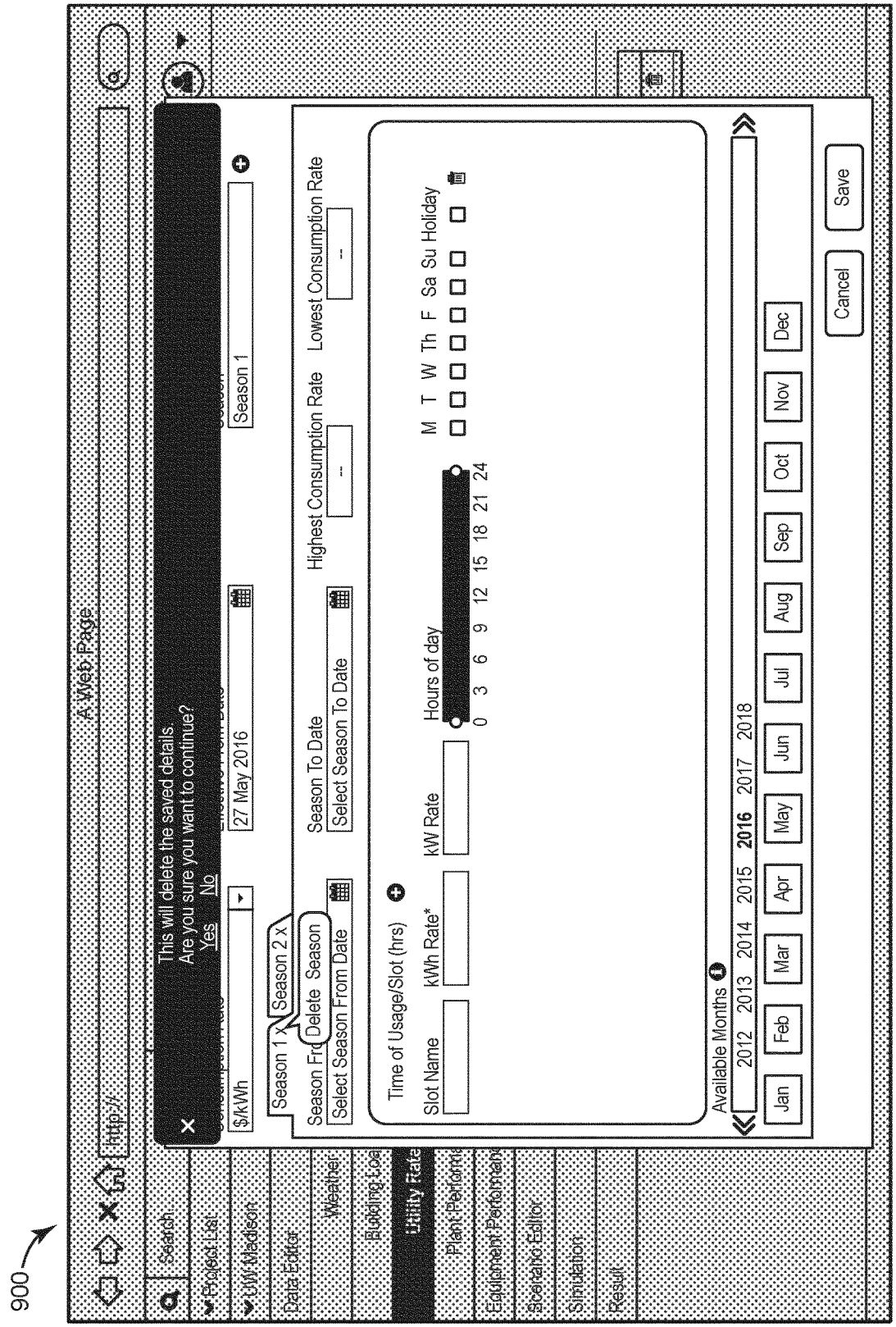
FIG. 37 is another user interface associated with the planning tool of FIG. 8, according to an exemplary embodiment.
Figure 38:
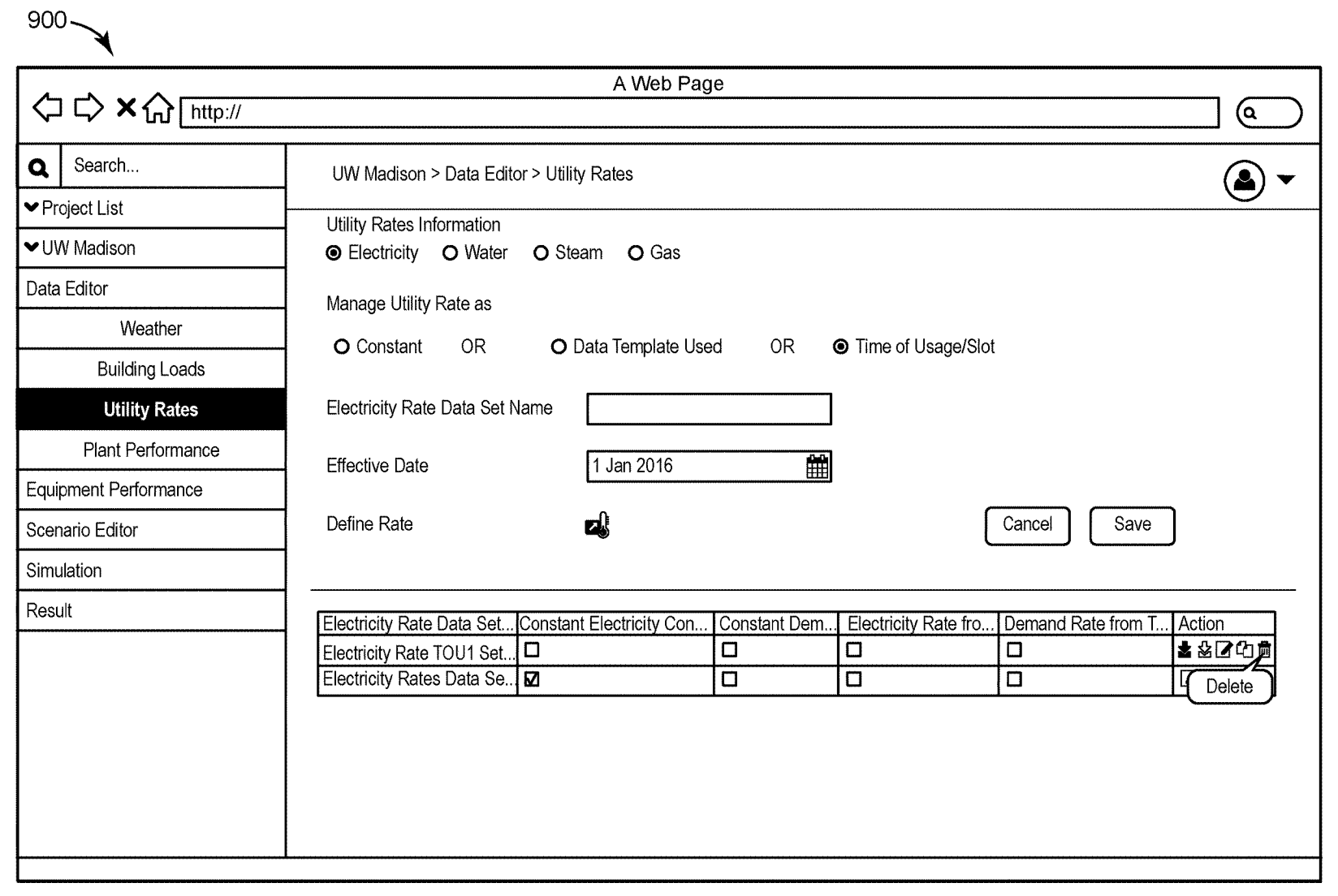
Figure 39:
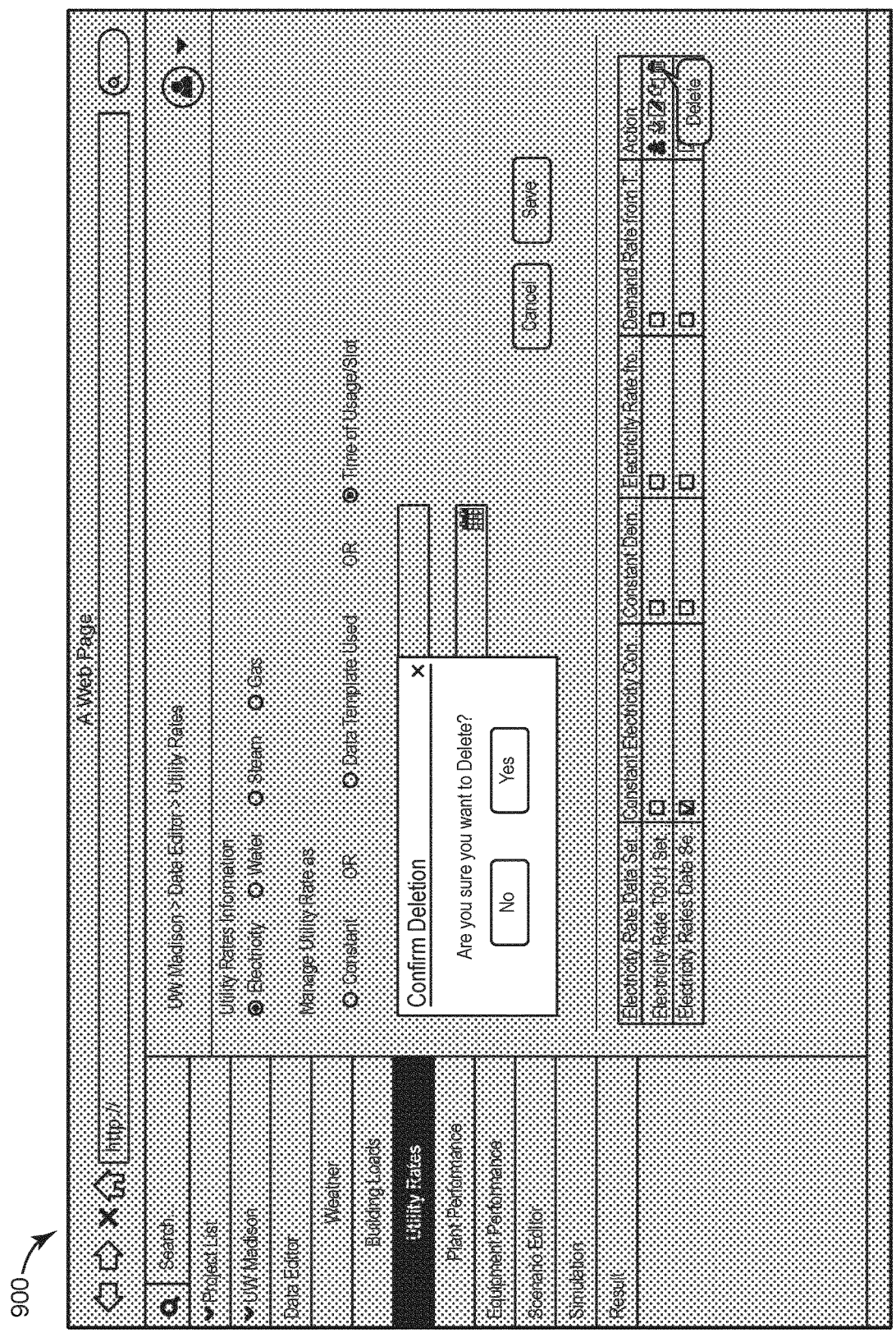
FIG. 39 is another user interface associated with the planning tool of FIG. 8, according to an exemplary embodiment.
Figure 40:
FIG. 40 is another user interface associated with the planning tool of FIG. 8, according to an exemplary embodiment.
Figure 41:
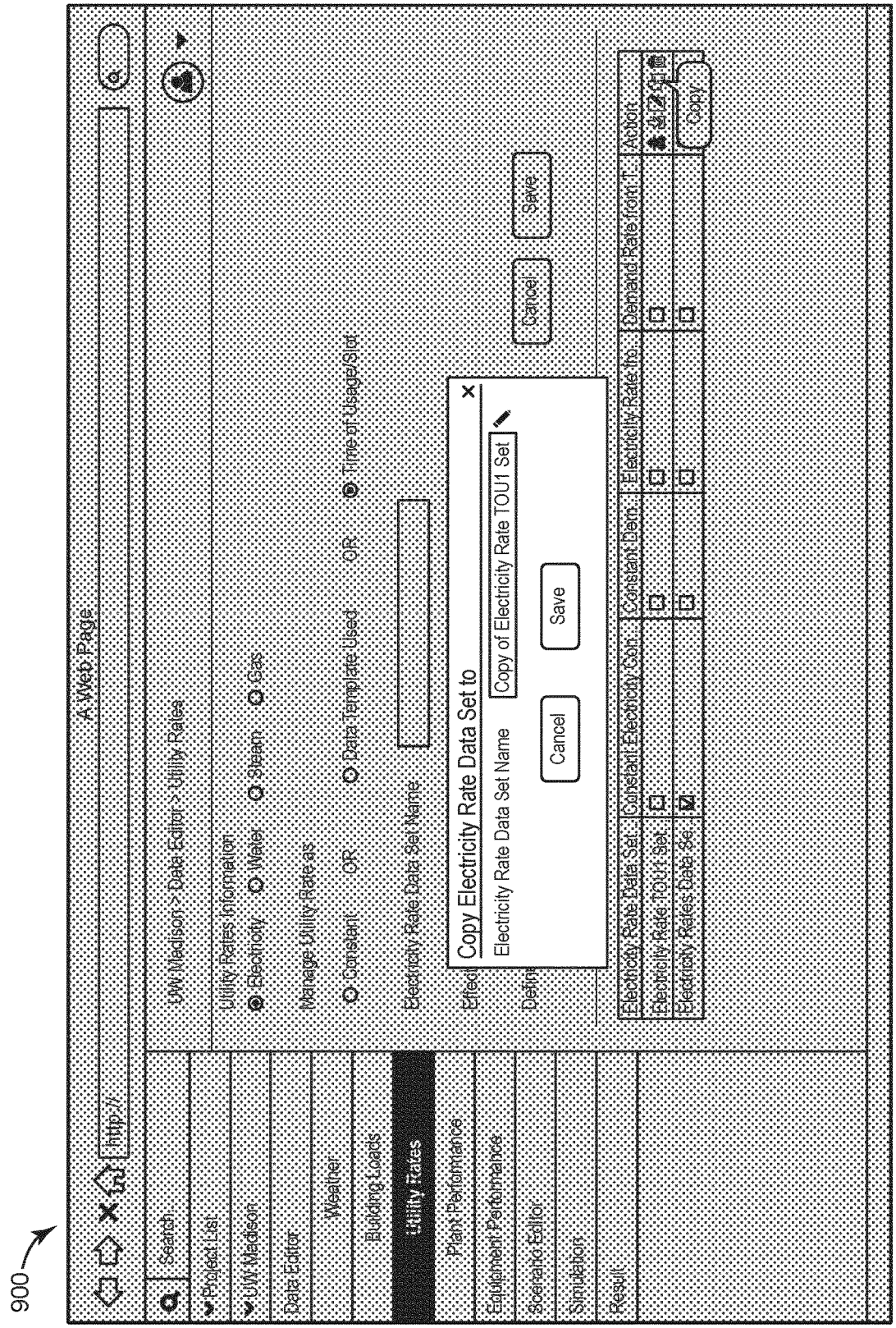
FIG. 41 is another user interface associated with the planning tool of FIG. 8, according to an exemplary embodiment.

As shown by FIG. 32, a user can modify an existing time frame (i.e., by changing the start date and/or end date). Additionally, a user can update rate values if desired. In some embodiments, planning tool 900 can prevent a user from setting an end date that is prior to the start date (see FIG. 33). Further, in some embodiments, planning tool 900 can alert a user that saved details will be deleted if the time frame is modified (see FIG. 34). The user can confirm the modification if needed. In some embodiments, if a user changes the "effective from" date, the data can be reset for all season tabs (FIG. 35). As shown by FIG. 36, a user can delete a season tab by selecting the delete option on the desired tab (step 1). In some embodiments, planning tool 900 can alert a user that saved details will be deleted if the season tab is deleted (see FIG. 37). The user can confirm the deletion if prompted. As shown by FIG. 38, a user can delete an entire data set, if desired (step 1). The user can select the delete option to remove a data set. In some embodiments, planning tool 900 can request that the user confirm a deletion of an entire data set (see FIG. 39). The user can select "yes" or "no" within the "confirm deletion" window. In some embodiments, a data set can only be deleted if it is not associated with a scenario or simulation. As shown by FIG. 40, a user can copy a data set by selecting "copy" (step 1). In some embodiments, if a user copies a data set, planning tool 900 can prompt the user to provide a name for the new set (see FIG. 41).

Referring now to FIGS. 42-43, two logic implementation examples are provided, according to some embodiments. In both examples, the year 2016 is selected. The effective date is from January-16, and the time frame extends 1 year from the effective data. A check of available hours for every day in the month can be performed, and any available month can be highlighted "green." In this case, April to December 2016 are available to further define the rates. In April, May, and June, 8 hours are available and Wednesday is the day that can be configured further. The cycle for validating the data can proceed until data is set for every hour, every day and every month. As each month is completed, it can become grayed out. FIG. 42 provides an example where January, February, and March are fully defined, and accordingly grayed out. FIG. 43 provides an example where January, February and March are fully defined (and grayed out), and April, May, and June are not fully defined (and remain green).

According to some embodiments, for an effective year, the planning tool can count the available hours for the selected year. If the number of hours are available for the year even after adding the season, the planning tool user can add seasons and define a season period. A user can define season months and a year time. The planning tool can again check the availability of months. Further, the system can check the available hours in the selected months for the season. If the number of hours are available for the selected available months, the user can add slots. The planning tool can check for the available weekdays and holiday counter. If a day is available, the user can make a selection. The user can slide to capture the hours for the slot and define kWh and kW and select the days. Upon saving the results, available hours for the weekdays will be updated resulting in updated available hours in the months. If available hours in the months are more than 0, those months can be highlighted "green" indicating availability, or else they will be grayed out and the user can be prevented from selecting them. The availability counter can be updated with the deletion of slots and seasons and modification of the selection of weekdays.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for allocating a plurality of resources across equipment that operate to serve one or more loads of a building, the system comprising one or more memory devices storing instructions that, when executed by one or more processors, cause the one or more processors to:
   receive operational data defining at least one of planned loads to be served by the equipment or utility rates for one or more time steps within a simulation period;
   verify whether the operational data exists for the planned loads or the utility rates for each time step within the simulation period; and
   in response to a determination that the operational data does not exist for the planned loads or the utility rates for each time step within the simulation period, identify one or more time steps for which the planned loads or the utility rates do not exist; and
   initiate an action to define the planned loads or the utility rates for the identified time steps.

2. The system of claim 1, wherein the simulation period comprises:
   a first subset of time for which the equipment is operating; and
   a second subset of time for which the equipment is not operating, wherein a sum of the first subset of time and the second subset of time is equal to the simulation period.

3. The system of claim 2, further comprising a data verification component configured to verify that data exists for the entirety of the first subset of time and the second subset of time.

4. The system of claim 1, further comprising a central energy plant in communication with the system.

5. The system of claim 4, wherein the central energy plant comprises one or more heating systems, one or more cooling systems, and one or more power systems.

6. The system of claim 1, wherein the operational data is validated based on historical data comprising loads previously applied to the equipment and past utility rates.

7. The system of claim 1, wherein availability of operational data is verified by calculating a total number of time steps within the simulation period and matching the operational data to the total number of time steps within the simulation period.

8. The system of claim 1, wherein the planned loads and the utility rates are received from a user device, wherein a user has provided the planned loads and the utility rates as an input.

9. The system of claim 1, wherein the operational data comprises a plurality of utility rates corresponding to a plurality of planned loads to be applied to the equipment of the building.

10. The system of claim 9, wherein the plurality of utility rates correspond to a plurality of utilities required by the equipment for execution of the planned loads.

11. A method of allocating a plurality of resources across equipment that operate to serve one or more loads of a building, the method comprising:
  receiving operational data defining at least one of planned loads to be served by the equipment or utility rates for one or more time steps within a simulation period;
  verifying whether the operational data exists for the planned loads or the utility rates for each time step within the simulation period; and
  identifying, in response to a determination that the operational data does not exist for the planned loads or the utility rates for each time step within the simulation period, one or more time steps for which the planned loads or the utility rates do not exist; and
  initiating an action to define the planned loads or the utility rates for the identified time steps.

12. The method of claim 11, wherein the simulation period comprises:
  a first subset of time for which the equipment is operating; and
  a second subset of time for which the equipment is not operating, wherein a sum of the first subset of time and the second subset of time is equal to the simulation period.

13. The method of claim 12, further comprising a data verification component configured to verify that data exists for the entirety of the first subset of time and the second subset of time.

14. The method of claim 11, further comprising a central energy plant having one or more heating systems, one or more cooling systems, and one or more power systems.

15. The method of claim 11, wherein the operational data is validated based on historical data comprising loads previously applied to the equipment and past utility rates.

16. The method of claim 11, wherein availability of operational data is verified by calculating a total number of time steps within the simulation period and matching the operational data to the total number of time steps within the simulation period.

17. The method of claim 11, wherein the planned loads and the utility rates are received from a user device, wherein a user has provided the planned loads and the utility rates as an input.

18. The method of claim 11, wherein the operational data comprises a plurality of utility rates and a plurality of planned loads to be applied to the equipment.

19. The method of claim 18, wherein the plurality of utility rates correspond to a plurality of utilities required by the equipment for execution of the planned loads.

20. One or more non-transitory computer-readable media storing instructions that, when executed by one or more processors, cause the one or more processors to perform operations comprising:
  receiving operational data defining at least one of planned loads to be served by equipment or utility rates for one or more time steps within a simulation period;
  verifying whether the operational data exists for the planned loads or the utility rates for each time step within the simulation period; and
  identifying, in response to a determination that the operational data does not exist for the planned loads or the utility rates for each time step within the simulation period, one or more time steps for which the planned loads or the utility rates do not exist; and
  initiating an action to define the planned loads or the utility rates for the identified time steps.

\* \* \* \* \*